US011778657B2

(12) United States Patent
Davydov et al.

(10) Patent No.: US 11,778,657 B2
(45) Date of Patent: Oct. 3, 2023

(54) CONTROL RESOURCE SET INFORMATION IN PHYSICAL BROADCAST CHANNEL

(71) Applicant: Apple Inc., Cupertino, CA (US)

(72) Inventors: Alexei Davydov, Nizhny Novgorod (RU); Seunghee Han, San Jose, CA (US); Gang Xiong, Portland, OR (US); Gregory V. Morozov, Nizhny Novgorod (RU); Yushu Zhang, Beijing (CN); Joonyoung Cho, Portland, OR (US); Dae Won Lee, Portland, OR (US); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 412 days.

(21) Appl. No.: 16/171,998

(22) Filed: Oct. 26, 2018

(65) Prior Publication Data

US 2019/0069322 A1  Feb. 28, 2019

Related U.S. Application Data

(60) Provisional application No. 62/588,246, filed on Nov. 17, 2017, provisional application No. 62/587,206, filed on Nov. 16, 2017, provisional application No. 62/578,203, filed on Oct. 27, 2017.

(51) Int. Cl.
*H04W 74/00* (2009.01)
*H04L 5/00* (2006.01)
*H04W 74/08* (2009.01)

(52) U.S. Cl.
CPC ......... *H04W 74/006* (2013.01); *H04L 5/0091* (2013.01); *H04W 74/0833* (2013.01)

(58) Field of Classification Search
CPC . H04W 74/00; H04W 74/002; H04W 74/008; H04W 74/08; H04W 74/0833; H04W 74/0841; H04W 74/085; H04W 74/0858; H04W 74/0866; H04W 74/0883; H04W 74/006; H04L 5/0091
See application file for complete search history.

(56) References Cited

U.S. PATENT DOCUMENTS

| | | | |
|---|---|---|---|
| 2015/0085689 A1* | 3/2015 | Vos | H04W 4/18 370/252 |
| 2017/0280484 A1* | 9/2017 | Awad | H04W 52/143 |
| 2017/0367046 A1* | 12/2017 | Papasakellariou | H04L 5/0048 |
| 2018/0206263 A1* | 7/2018 | Lin | H04W 56/003 |

(Continued)

OTHER PUBLICATIONS

Office Action, dated Jul. 20, 2023, from related U.S. Appl. No. 17/950,266, 17 pages.

*Primary Examiner* — Yu-Wen Chang
(74) *Attorney, Agent, or Firm* — Sterne, Kessler, Goldstein & Fox P.L.L.C.

(57) ABSTRACT

Described is an apparatus of a User Equipment (UE) operable to communicate with a fifth-generation Evolved Node-B (gNB) on a wireless network. The apparatus may comprise a first circuitry and a second circuitry. The first circuitry may be operable to process a message comprising an indicator to indicate a number of contention based physical random access channel (PRACH) preambles within a PRACH occasion per Synchronization Signal Block (SSB). The second circuitry may be operable to generate a first PRACH occasion, based on the indicator.

16 Claims, 47 Drawing Sheets

700

(56) References Cited

U.S. PATENT DOCUMENTS

| | | | |
|---|---|---|---|
| 2018/0368186 A1* | 12/2018 | Gu | H04W 56/001 |
| 2019/0037586 A1* | 1/2019 | Park | H04L 1/0057 |
| 2019/0068268 A1* | 2/2019 | Zhang | H04W 76/27 |
| 2019/0069322 A1* | 2/2019 | Davydov | H04W 74/006 |
| 2019/0090273 A1* | 3/2019 | Yoo | H01Q 1/246 |
| 2019/0104534 A1* | 4/2019 | Tsai | H04L 5/006 |
| 2019/0109626 A1* | 4/2019 | Park | H04L 5/0048 |
| 2019/0132170 A1 | 5/2019 | Si et al. | |
| 2019/0150190 A1* | 5/2019 | Kim | H04W 56/0015 370/329 |
| 2019/0182817 A1* | 6/2019 | Agiwal | H04W 72/0406 |
| 2019/0199477 A1* | 6/2019 | Park | H04W 72/1268 |
| 2019/0215864 A1* | 7/2019 | Yang | H04W 72/0446 |
| 2019/0223157 A1* | 7/2019 | Hwang | H04W 74/0833 |
| 2020/0092062 A1* | 3/2020 | Yum | H04L 1/00 |
| 2020/0112355 A1* | 4/2020 | Park | H04B 7/0626 |
| 2020/0162124 A1* | 5/2020 | Yamamoto | H04B 1/713 |
| 2020/0229236 A1* | 7/2020 | Ohara | H04W 74/00 |
| 2020/0359384 A1 | 11/2020 | Da et al. | |
| 2020/0403748 A1* | 12/2020 | Yokomakura | H04L 5/0051 |
| 2021/0176687 A1 | 6/2021 | Ko et al. | |
| 2021/0297969 A1 | 9/2021 | Myung et al. | |
| 2021/0337597 A1* | 10/2021 | Yoshimura | H04W 72/23 |
| 2021/0352513 A1* | 11/2021 | Rahman | H04W 72/56 |
| 2021/0377950 A1 | 12/2021 | Takahashi et al. | |
| 2023/0036711 A1 | 2/2023 | Davydov et al. | |

* cited by examiner

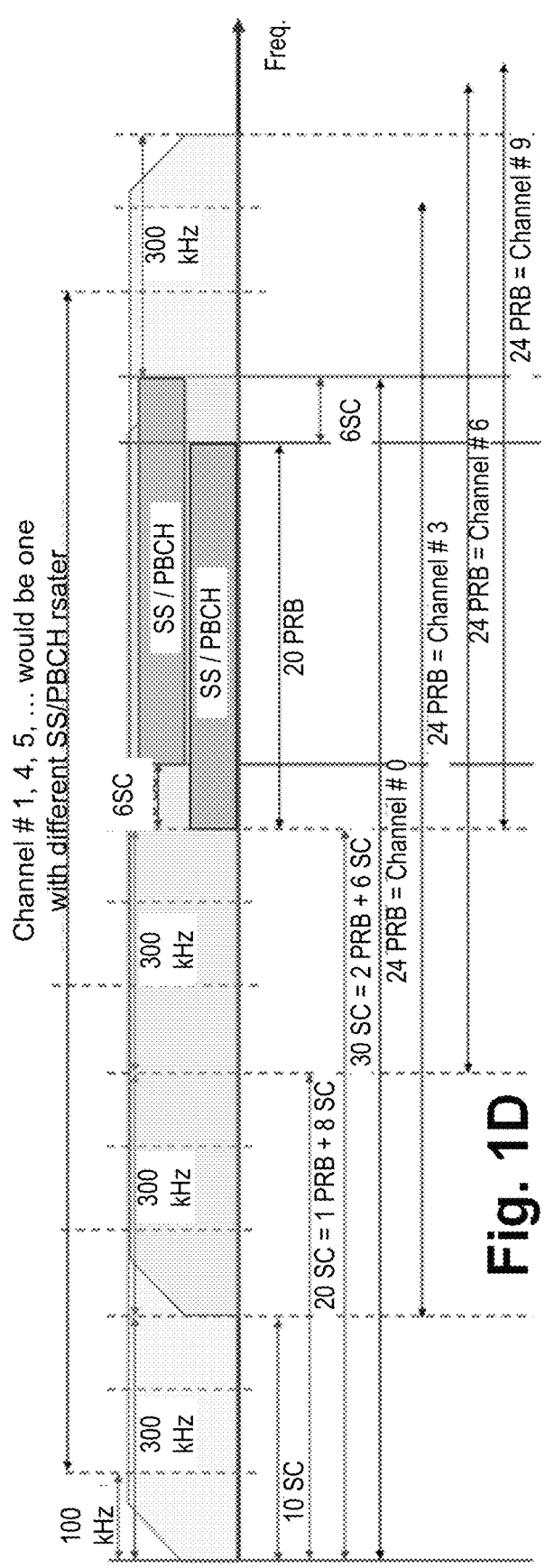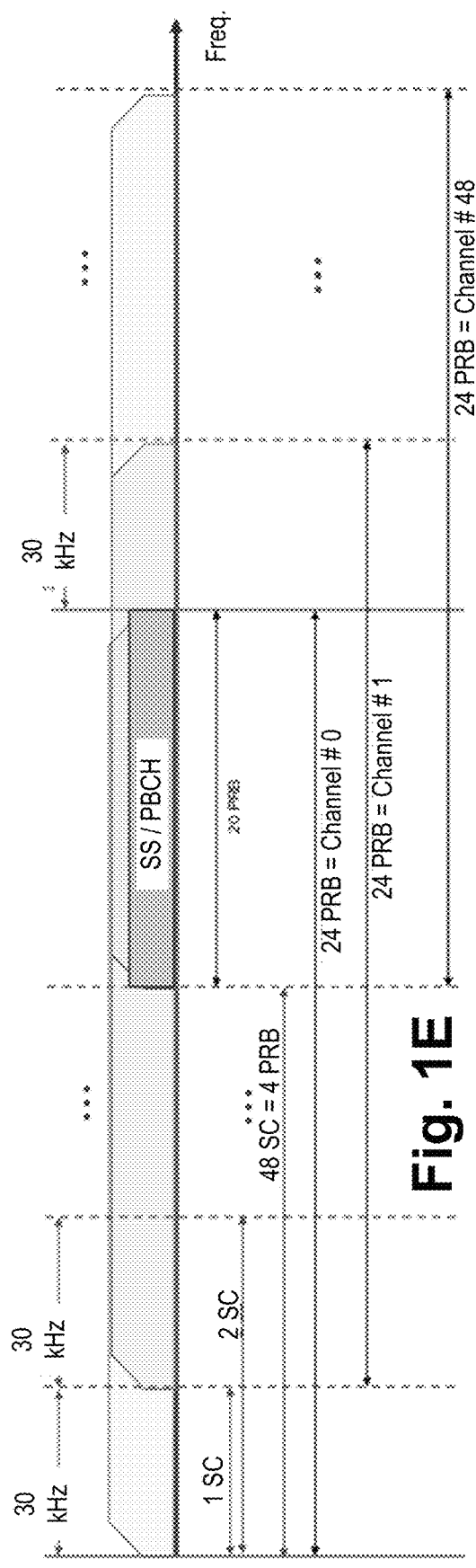

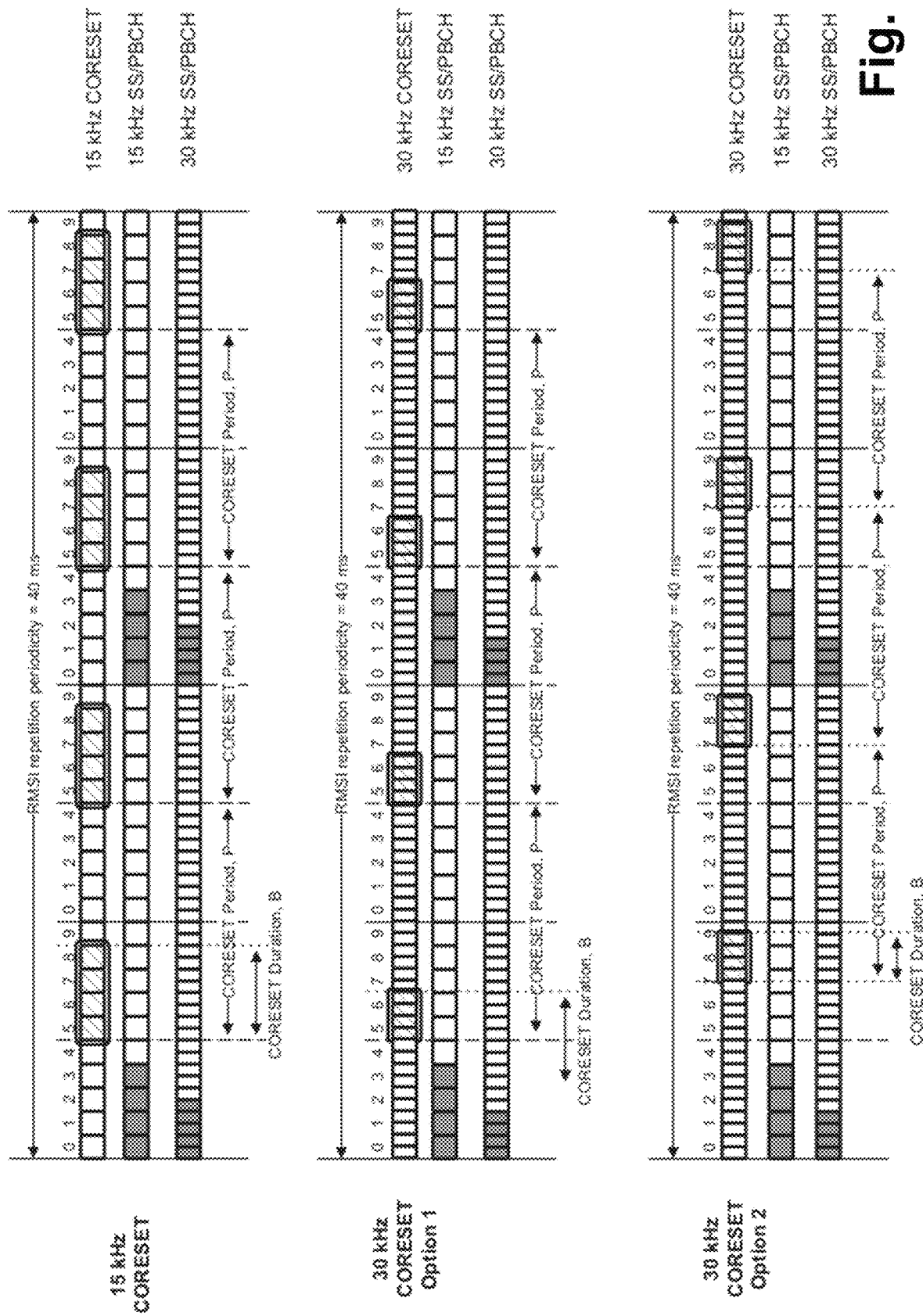

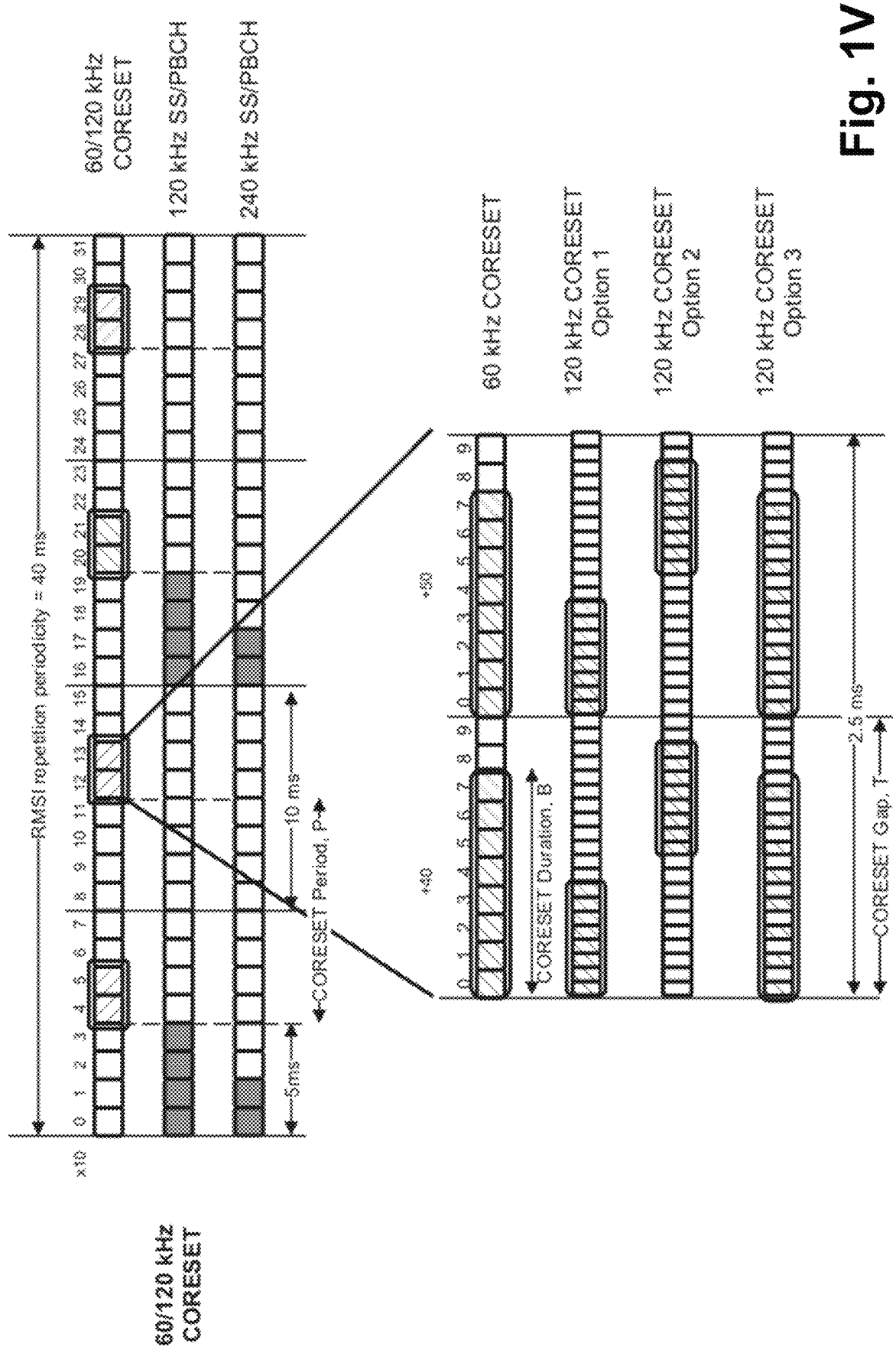

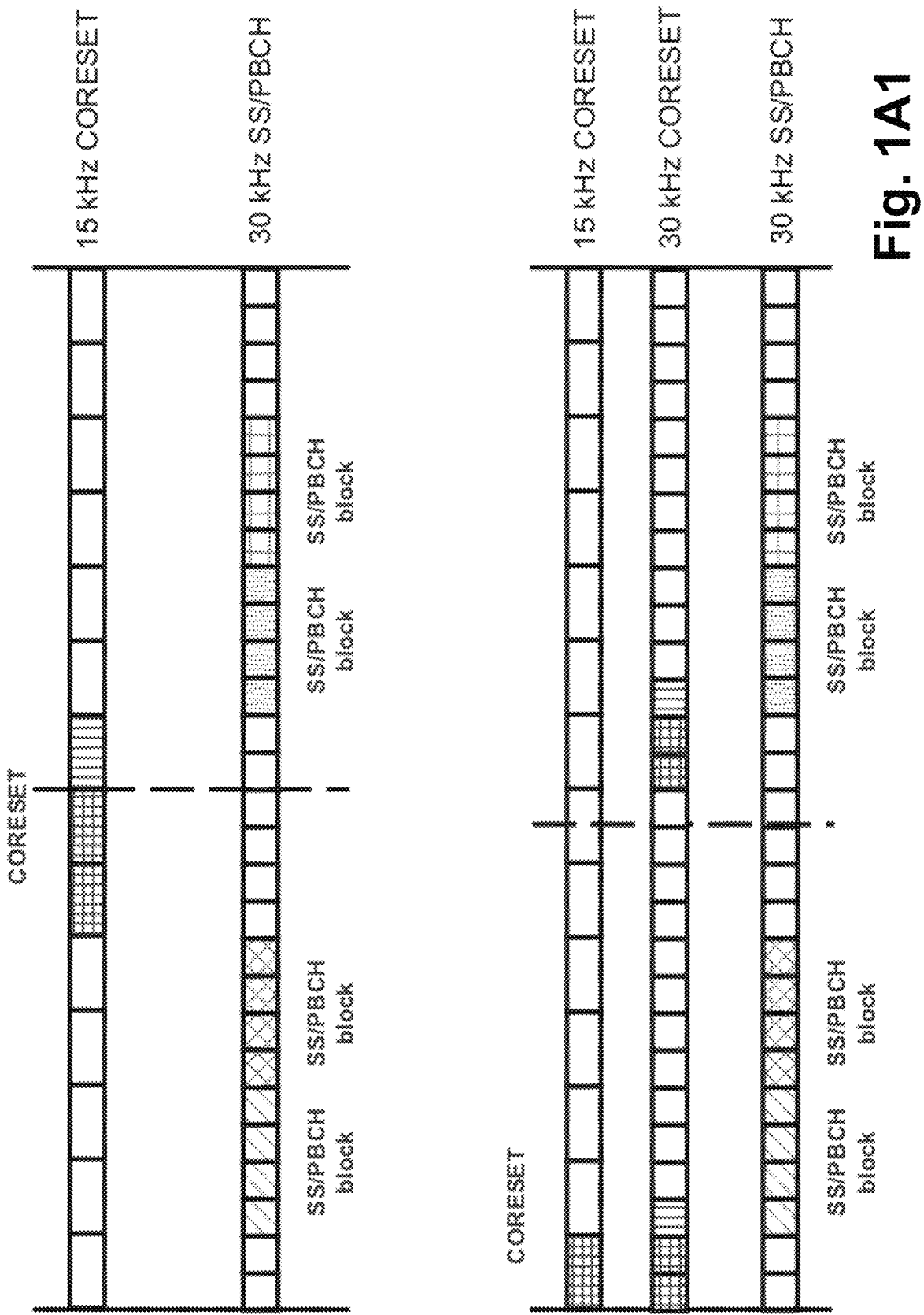

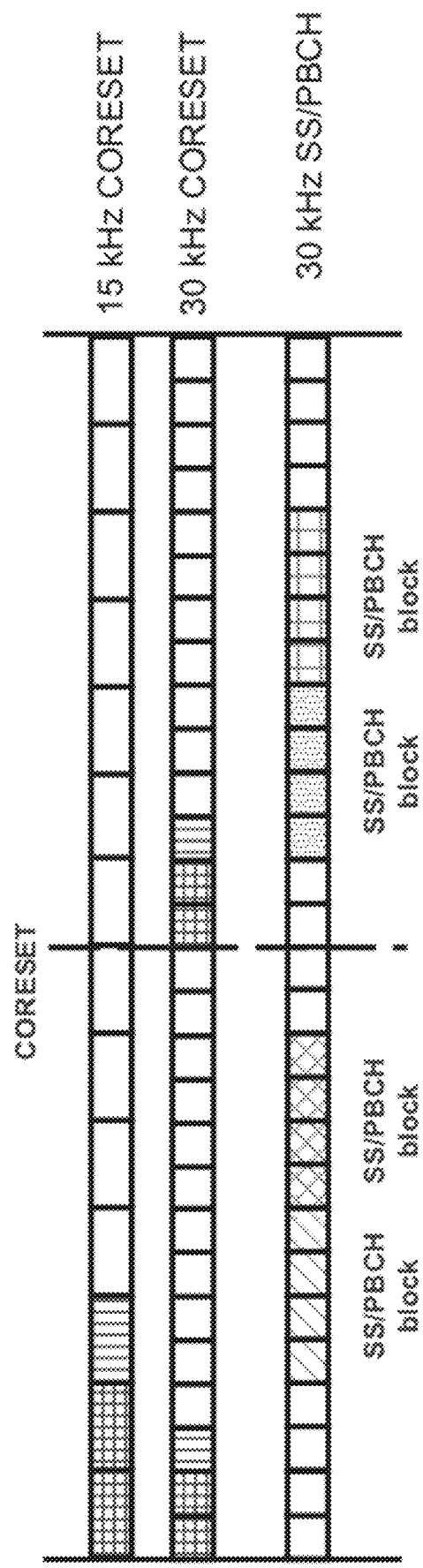
Fig. 1B1

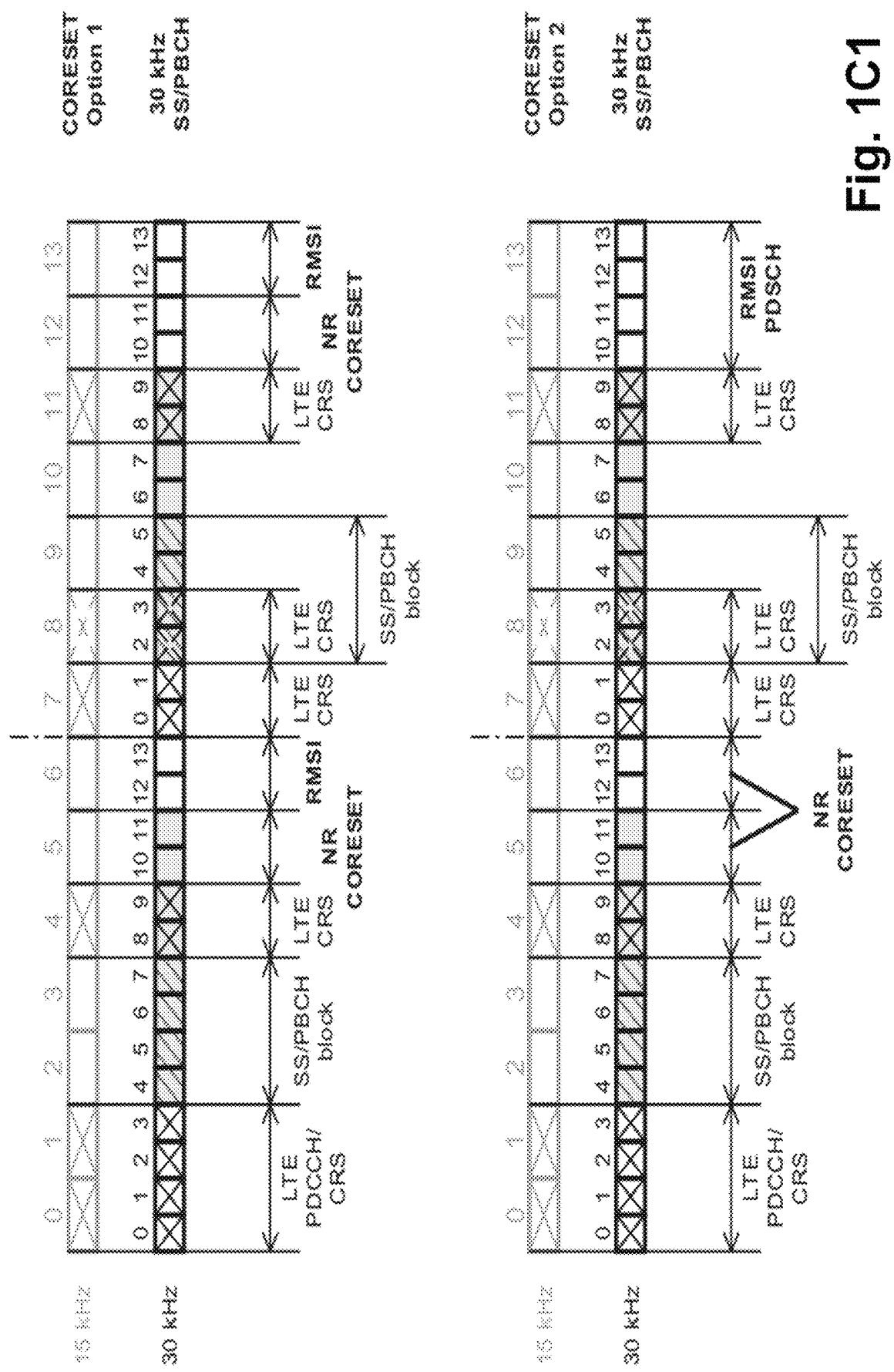
Fig. 1C1

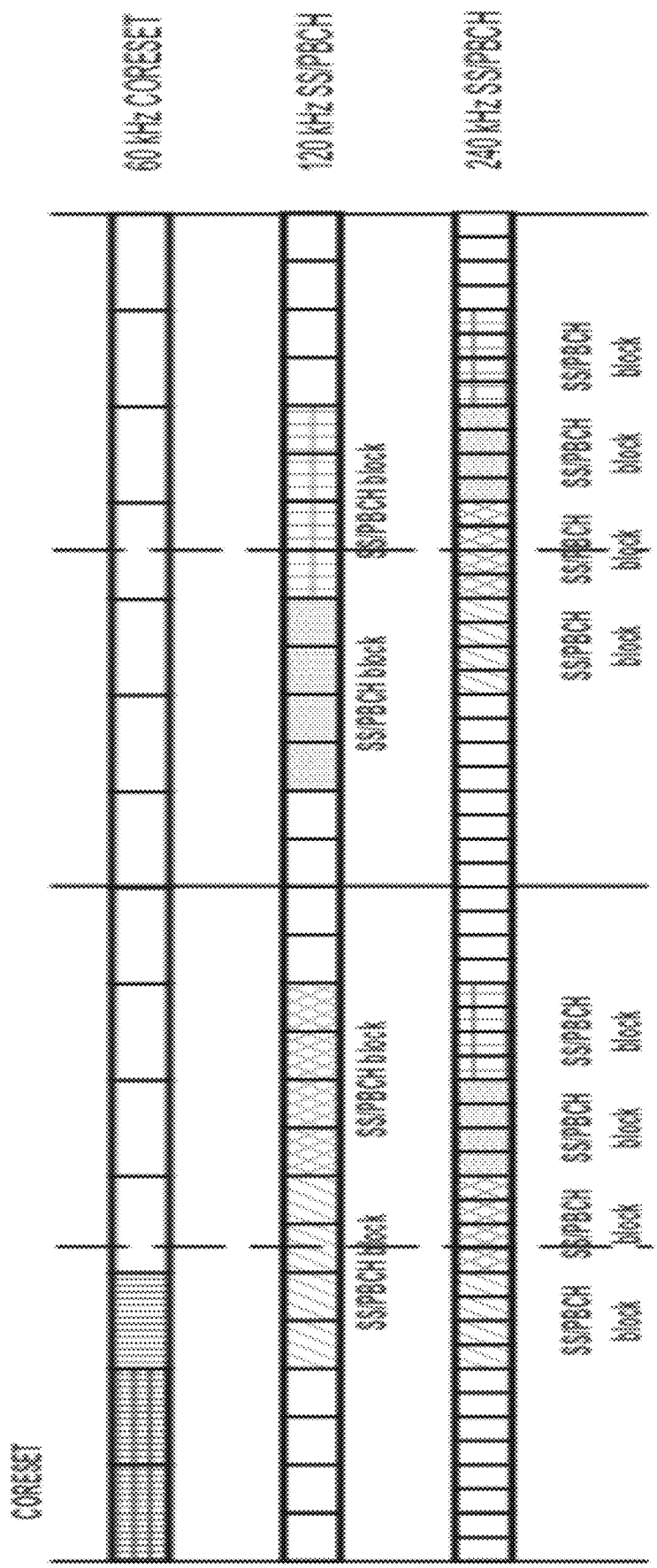
Fig. 1D1

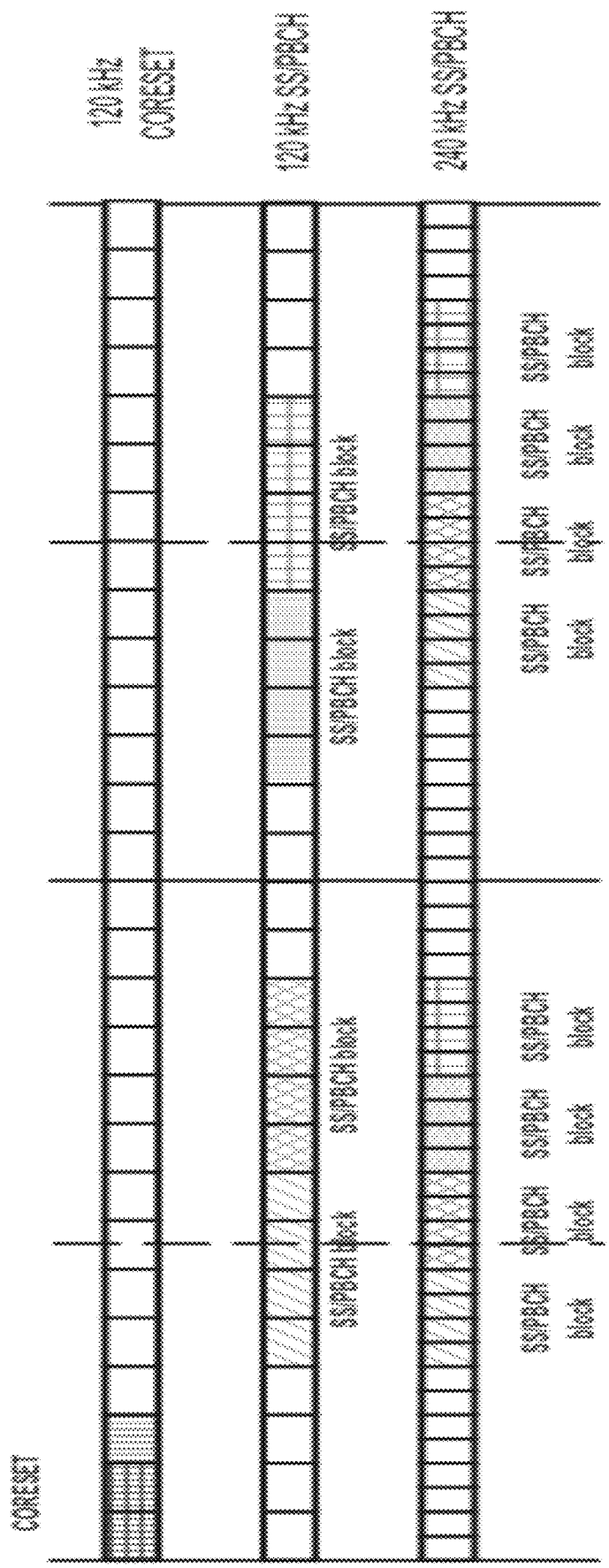
Fig. 1E1

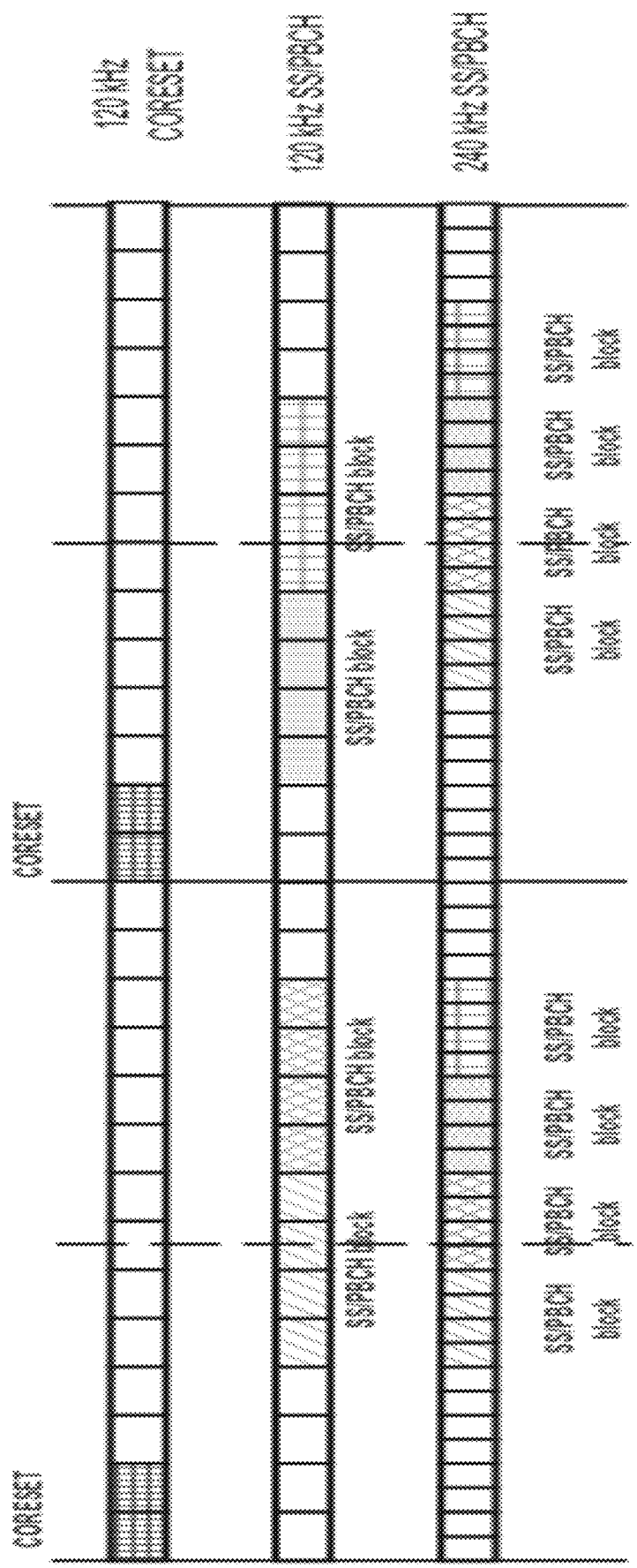
Fig. 1F1

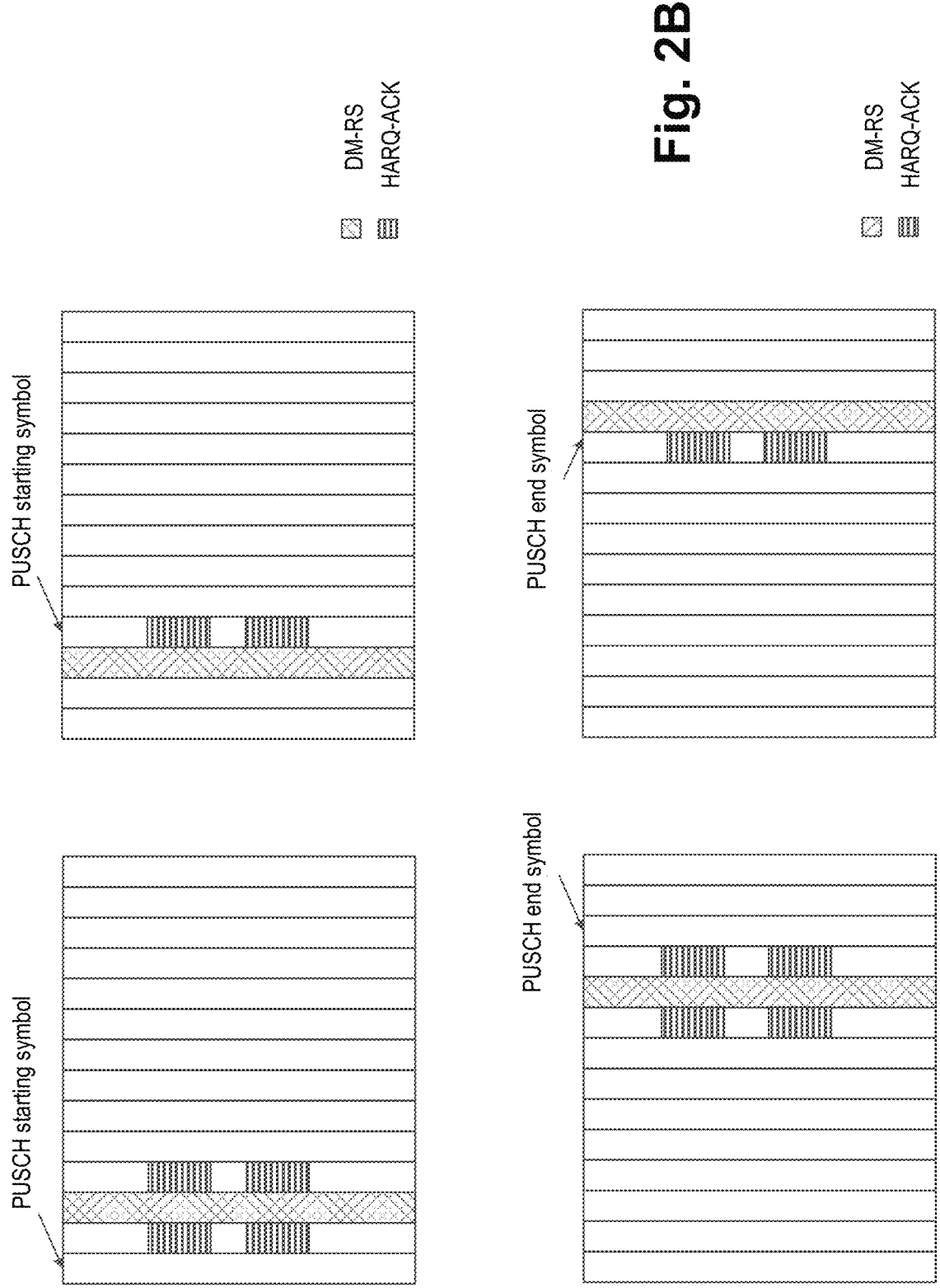

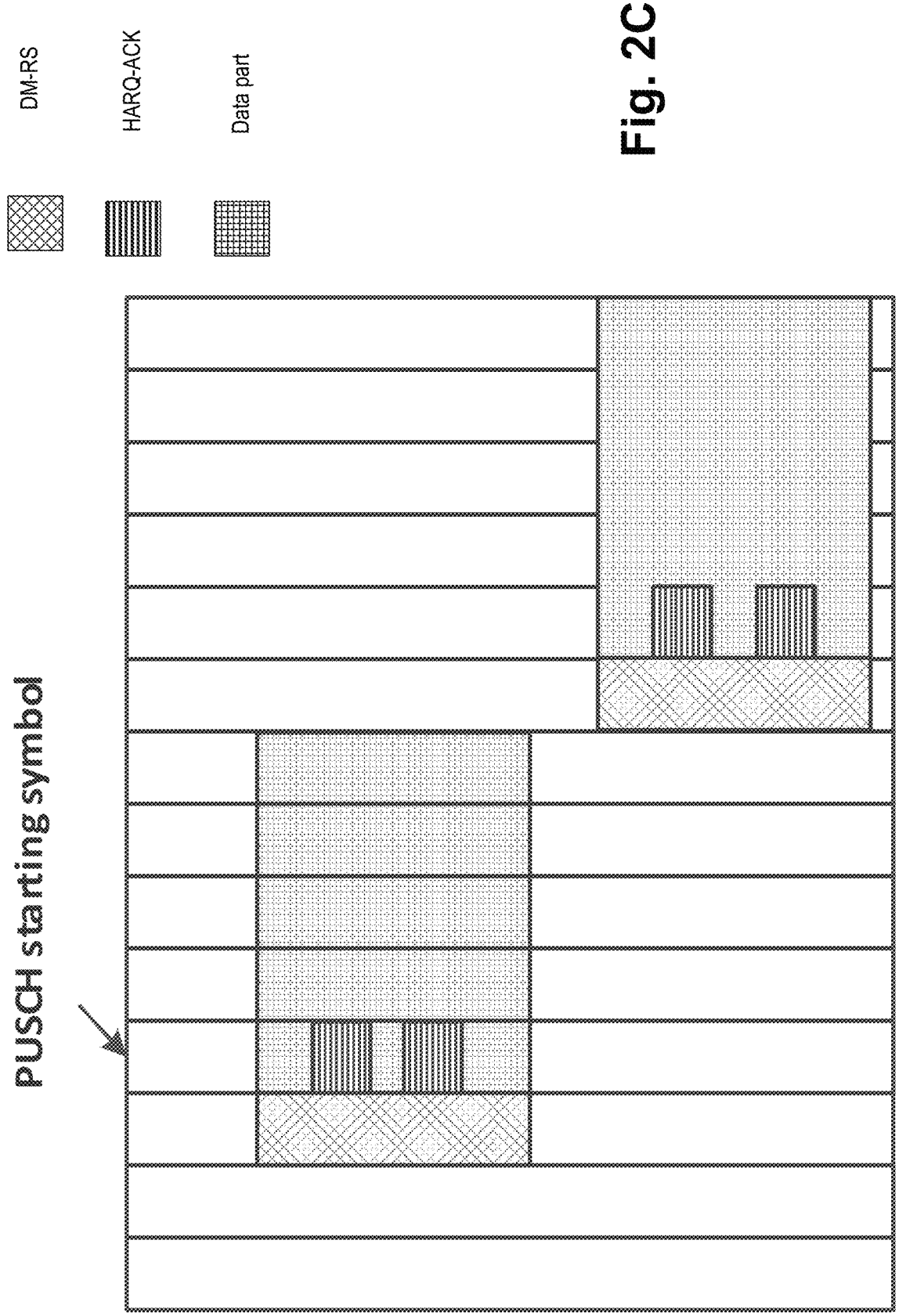

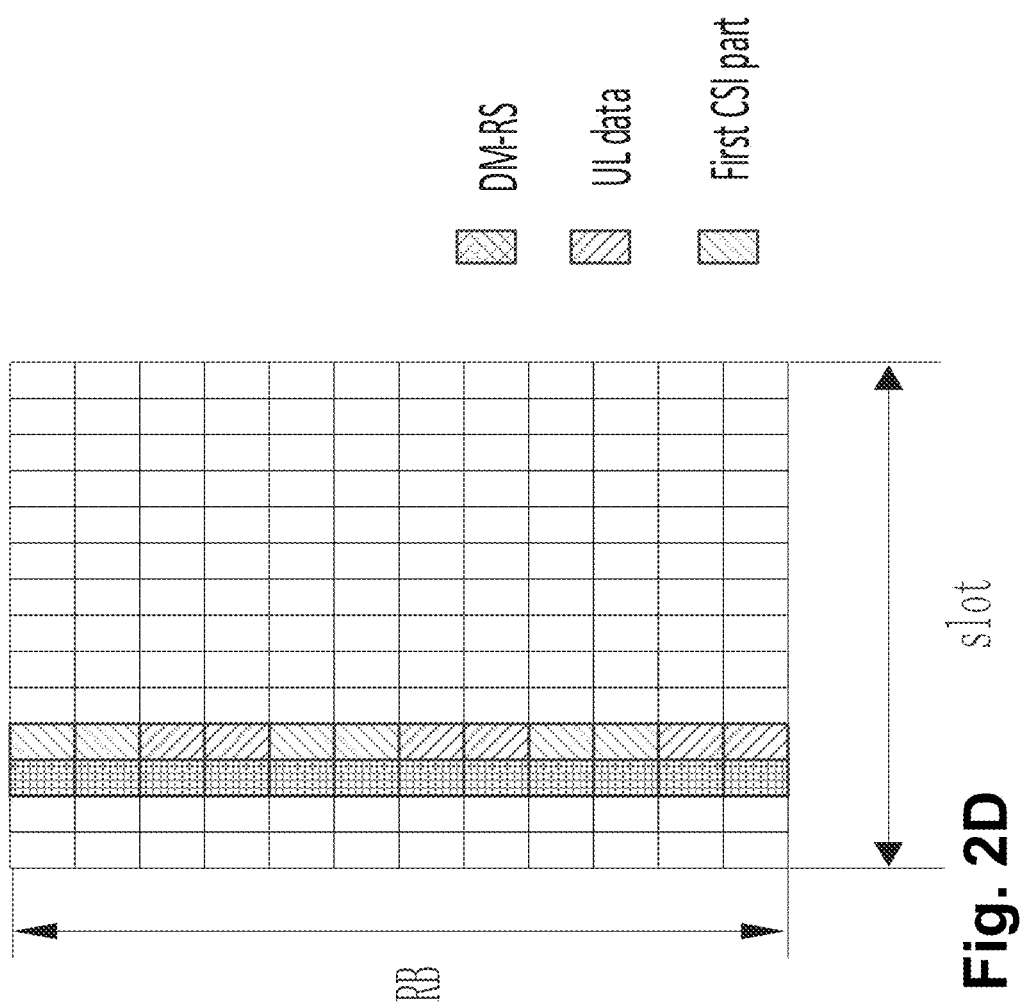
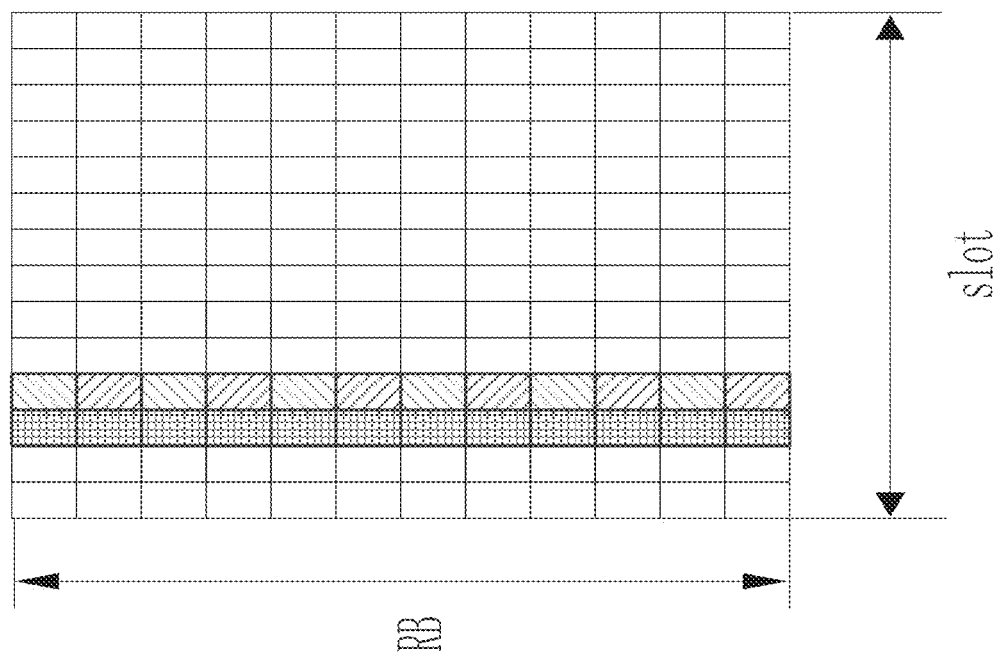
Fig. 2D

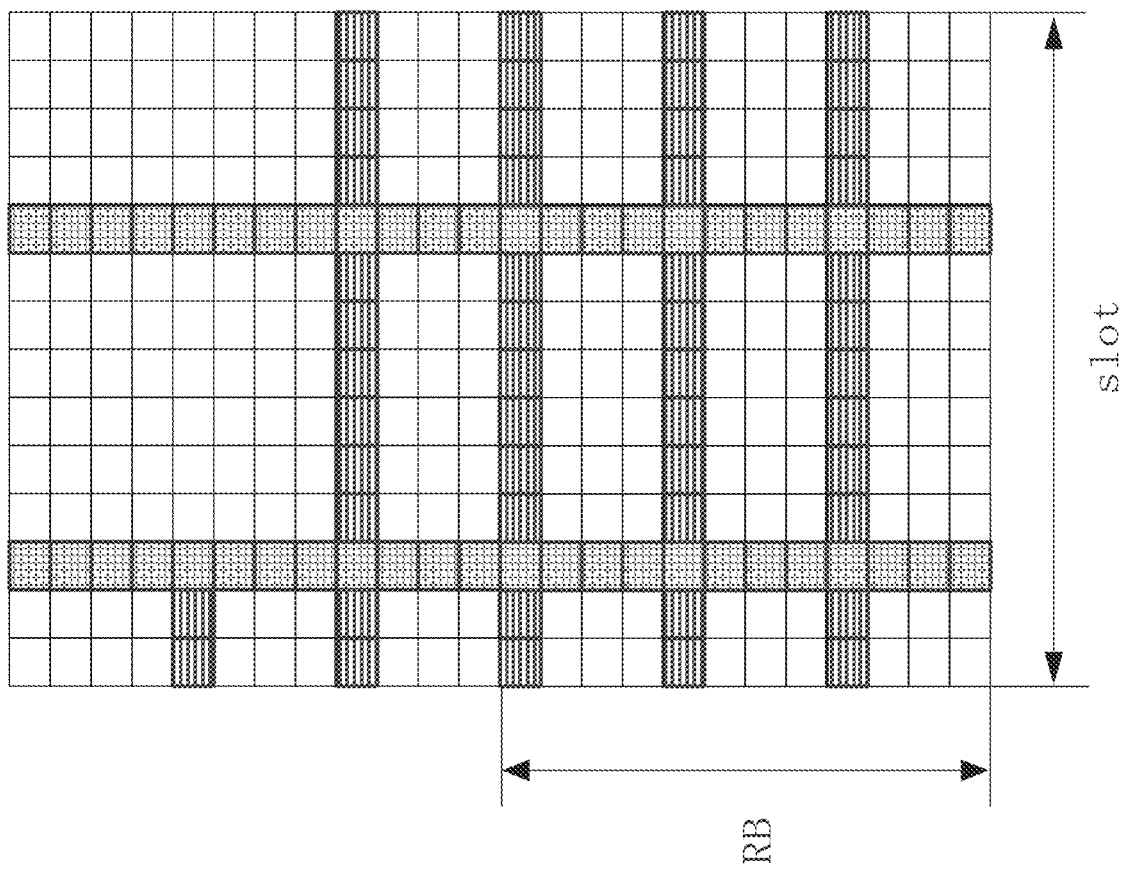

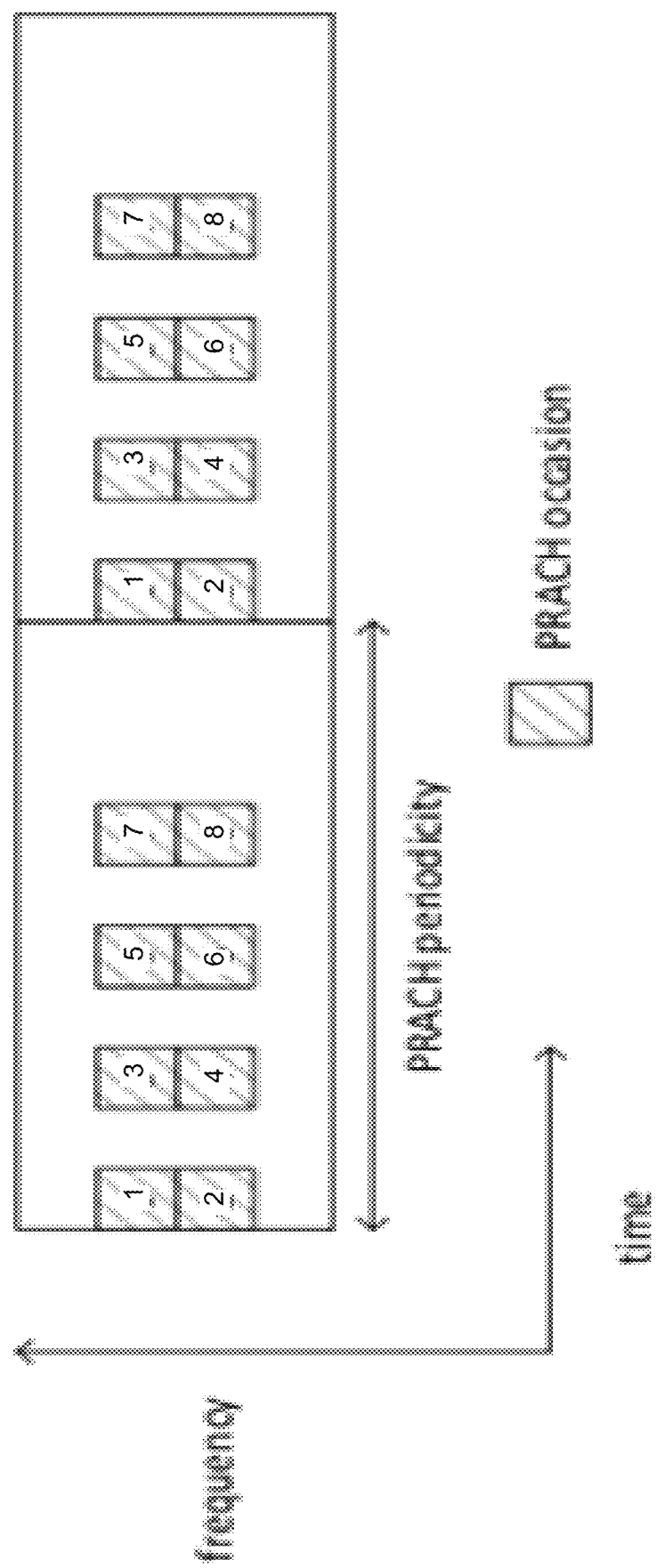

CONTROL RESOURCE SET INFORMATION IN PHYSICAL BROADCAST CHANNEL

CLAIM OF PRIORITY

The present application claims priority under 35 U.S.C. § 119 to U.S. Provisional Patent Application Ser. No. 62/578,203 filed Oct. 27, 2017 and entitled "Mechanisms on configuring random access channel format," claims priority under 35 U.S.C. § 119 to U.S. Provisional Application Ser. No. 62/588,246 filed Nov. 17, 2017 and entitled "Method of control channel configuration in physical broadcast channel," and claims priority under 35 U.S.C. § 119 to U.S. Provisional Patent Application Ser. No. 62/587,206 filed Nov. 16, 2017 and entitled "A novel distributed mapping scheme for uplink control information," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Next-generation wireless cellular communication systems may provide support for higher bandwidths in part by supporting higher carrier frequencies, such as centimeter-wave and millimeter-wave frequencies.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIGS. 1B, 1C, 1D, and 1E illustrate a SS/PBCH block position with respect to a different system with 5 or 10 MHz channel bandwidth, according to some embodiments.

FIGS. 1N and 1O illustrate examples of offset values that determines a relative PRB shift between SS/PBCH and CORESET bandwidth, according to some embodiments.

FIGS. 1T and 1U illustrate example position and/or locations of CORESET containing slots in the frequency range 1 (e.g., below 6 GHz) and when SS/PBCH was detected in the first half radio frame, according to some embodiments.

FIGS. 1V and 1W illustrate example position and/or locations of CORESET containing slots in the frequency range 2 (e.g., above 6 GHz) and when SS/PBCH was detected in the first half radio frame, according to some embodiments.

FIG. 1A1 illustrates a potential CORESET OFDM symbols when RMSI PDCCH is using SCS of 15 kHz and 30 kHz while the SS/PBCH is using 30 kHz SCS (for 1st 30 kHz SS/PBCH pattern), according to some embodiments.

FIG. 1B1 illustrates potential CORESET OFDM symbols when RMSI PDCCH is using SCS of 15 kHz and 30 kHz while the SS/PBCH is using 30 kHz SCS (for 2nd 30 kHz SS/PBCH pattern), according to some embodiments.

FIG. 1C1 illustrates an alternative potential CORESET OFDM symbols when RMSI PDCCH is using SCS of 15 kHz and 30 kHz while the SS/PBCH is using 30 kHz SCS (for 2nd 30 kHz SS/PBCH pattern), according to some embodiments.

FIG. 1D1 illustrates potential CORESET OFDM symbols when RMSI PDCCH is using SCS of 60 kHz while the SS/PBCH is using 120 kHz or 240 kHz SCS, according to some embodiments.

FIG. 1E1 illustrates potential CORESET OFDM symbols when RMSI PDCCH is using SCS of 120 kHz while the SS/PBCH is using 120 kHz or 240 kHz SCS, according to some embodiments.

FIG. 1F1 illustrates alternative potential CORESET OFDM symbols when RMSI PDCCH is using SCS of 120 kHz while the SS/PBCH is using 120 kHz or 240 kHz SCS, according to some embodiments.

FIG. 2B illustrates examples of HARQ-ACK feedback on PUSCH with different starting and/or end symbol of PUSCH, according to some embodiments.

FIG. 2C illustrates an example of HARQ-ACK feedback on PUSCH with frequency hopping in time domain, according to some embodiments.

FIG. 2D illustrates an example of interleaved mapping for the first CSI part and data on PUSCH, according to some embodiments.

FIG. 2F illustrates an example of time first mapping for HARQ-ACK on PUSCH with evenly distributed pattern, according to some embodiments.

FIG. 3 illustrates an example configuration of PRACH configuration, according to some embodiments.

DETAILED DESCRIPTION

Figure 1A:
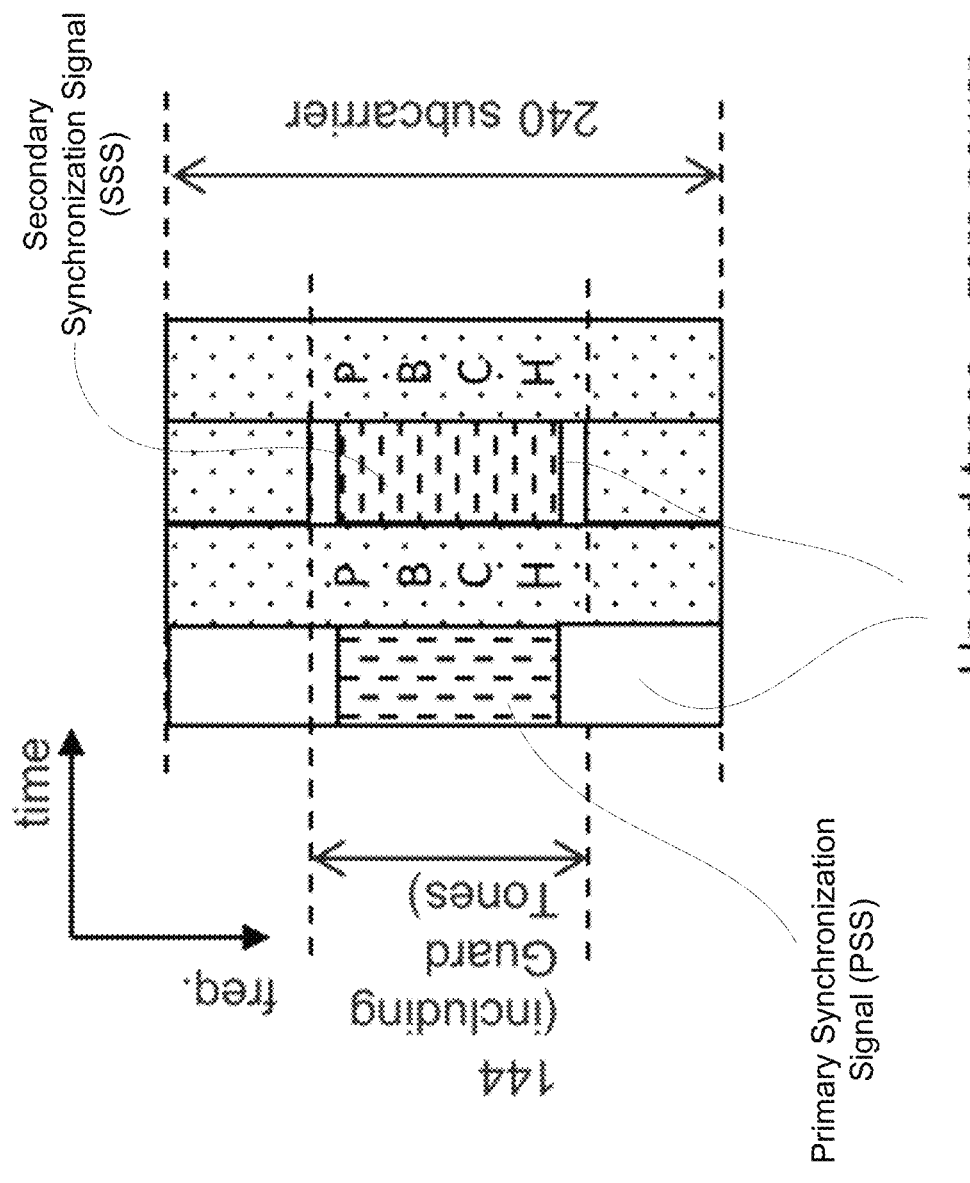
FIG. 1A illustrates a New Radio (NR) Synchronization Signal/Physical Broadcast Channel (SS/PBCH) block, according to some embodiments.

For purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR (next generation) capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

In 5G NR communication, prior to a UE getting fully connected to a gNB, the UE has to receive system information (SI) about the radio access network. Such system information is broadcasted by base stations (BSs) (e.g., gNBs), and may be split into multiple parts. For example, in one part, merely essential (e.g., most essential) system information are transmitted. Receiving such essential system information is useful (e.g., critical) for the reception of the other parts of the SI, and, therefore, a separate channel (e.g., a Physical Broadcast Channel (PBCH)) is dedicated to transmission of this most essential SI part. Other parts of the SI, such as the Remaining Minimal SI (RMSI) and/or Other SI (OSI) are transmitted in the Physical Downlink Shared Channel (PDSCH), e.g., are multiplexed with other data.

In an example, in order to receive and extract RMSI and/or the OSI from the data within the PDSCH, a separate channel (e.g., a Physical Downlink Control Channel (PDCCH)) is to be read first. The configuration of Control Resource Set (CORESET) in the PDCCH for RMSI transmission is a part of the essential SI carried in PBCH. Because the capacity of PBCH may be limited, the effective configuration of RMSI CORESET, e.g., the required number of bits, is critical. Various embodiments of this disclosure discuss different design options to achieve the desired effectiveness of RMSI CORESET configuration in PBCH.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Control Channel Configuration in Physical Broadcast Channel

Various embodiments of this disclosure discuss separate design options for frequency domain and time domain aspects for transmission of configuration information for RMSI CORESET. In an example, different combinations of the design options may be summarized in one or more tables, e.g., in a single table. In such a case, a particular combination to be used may be indicated to the UEs in the PBCH payload, e.g., using the index from the table. In an example, using combinations of the various design options allows to reduce a required number of bits to be carried in the payload of the PBCH, e.g., whose capacity may be limited.

In LTE, operators are allowed to deploy LTE systems in units of, for example, 1.25 MHz, 2.5 MHz, 5 MHz, 10 MHz, and 20 MHz, e.g., on a frequency grid noted as the channel frequency raster. The channel frequency raster is a list of center frequencies that may be used by the LTE system, and a gap between adjacent raster entries is, for example, 100 kHz. This allows the system to develop an LTE system within a frequency band with granularity of 100 kHz.

Additionally, the synchronization signal (SS) for LTE is positioned (e.g., always positioned) in a center of the system bandwidth. Therefore, the list of center frequencies in which SS may be deployed is also equal or equivalent to the channel frequency raster.

In contrast, in 5G NR, SS is no longer limited to be placed in the center of the system bandwidth. Therefore, in order to define the list of center frequencies that SS may be placed within the frequency band, a separate frequency list, called the SS raster, has to be defined. As a result, the NR deployments considers two different raster: a channel frequency raster and a SS raster.

In an example, 5G NR may support two different channel raster: a subcarrier spacing based channel raster and a 100 kHz based channel raster. For each frequency range, one of the two type of channel raster may be utilized. In case of subcarrier spacing based channel raster, the value of the channel raster may be dependent on a smallest subcarrier spacing of the data and control transmission that may be supported for the frequency range. For example, if subcarrier spacing is utilized in bands between 2.4 GHz and 6 GHz and the smallest subcarrier spacing available for those bands is 15 kHz, the subcarrier spacing based channel raster is based on 15 kHz.

The SS raster may be a subset of the channel raster, where the subset selection is performed such that any possible channel configuration has at least one SS that fits within the system bandwidth. In case a frequency range supports multiple subcarrier spacing (SCS) of SS, the SS raster may need to be defined for each SS with different SCS.

Table 1 and Table 2 below illustrate a number of Resource Blocks (RBs) that can be used in a given system bandwidth, when the system is deployed in frequency range 1 and 2, respectively. From the tables below, as an example, when 15 kHz is used for SS and 5 MHz is used for the system, the system has 25 RBs available. In another example, when 30 kHz is used for SS and 10 MHz is used for the system, the system has 24 RBs available.

TABLE 1

(Number of Resource Blocks (RB) in each system bandwidth, when the system is deployed in frequency range 1, e.g., below 6 GHz)

| SCS [kHz] | $N_{RB}$ | | | | | | | | |
|---|---|---|---|---|---|---|---|---|---|
| | 5 MHz | 10 MHz | 15 MHz | 20 MHz | 25 MHz | 40 MHz | 50 MHz | 60 MHz | 80 MHz | 100 MHz |
| 15 | 25 | 52 | 79 | 106 | 133 | 216 | 270 | N.A | N.A | N.A |
| 30 | 11 | 24 | 38 | 51 | 65 | 106 | 133 | 162 | 217 | 273 |
| 60 | N.A | 11 | 18 | 24 | 31 | 51 | 65 | 79 | 107 | 135 |

TABLE 2

(Number of RBs in each system bandwidth, when the system is deployed in frequency range 2, e.g., above 6 GHz and below 60 GHz

| SCS [kHz] | $N_{RB}$ | | | |
|---|---|---|---|---|
| | 50 MHz | 100 MHz | 200 MHz | 400 MHz |
| 60 | 66 | 132 | 264 | N.A |
| 120 | 32 | 66 | 132 | 264 |

FIG. 1A illustrates a NR SS/PBCH, according to some embodiments. For example, the NR SS/PBCH block (also referred to as NR SS block, or simply as SS block) comprises Primary Synchronization Signal (PSS), which may be, for example, 1 OFDM Symbol, with a sequence length of 127 (e.g., occupies 127 subcarriers, 12 PRB), 3 sequences (e.g., conveys a part of cell ID), and/or provides OFDM symbol timing estimate, coarse frequency offset estimate, etc.

The NR SS/PBCH block also includes PBCH, which occupies 20 PRB (e.g., including DM-RS overhead), two full 20 PRB OFDM Symbols, and 8 PRBs in SSS OFDM Symbol. The NR SS/PBCH block also includes SSS (Secondary Synchronization Signal), which comprises 1 OFDM symbol, with a sequence length 127 (e.g., occupies 127 subcarriers, 12 PRB).

Figure 1B:
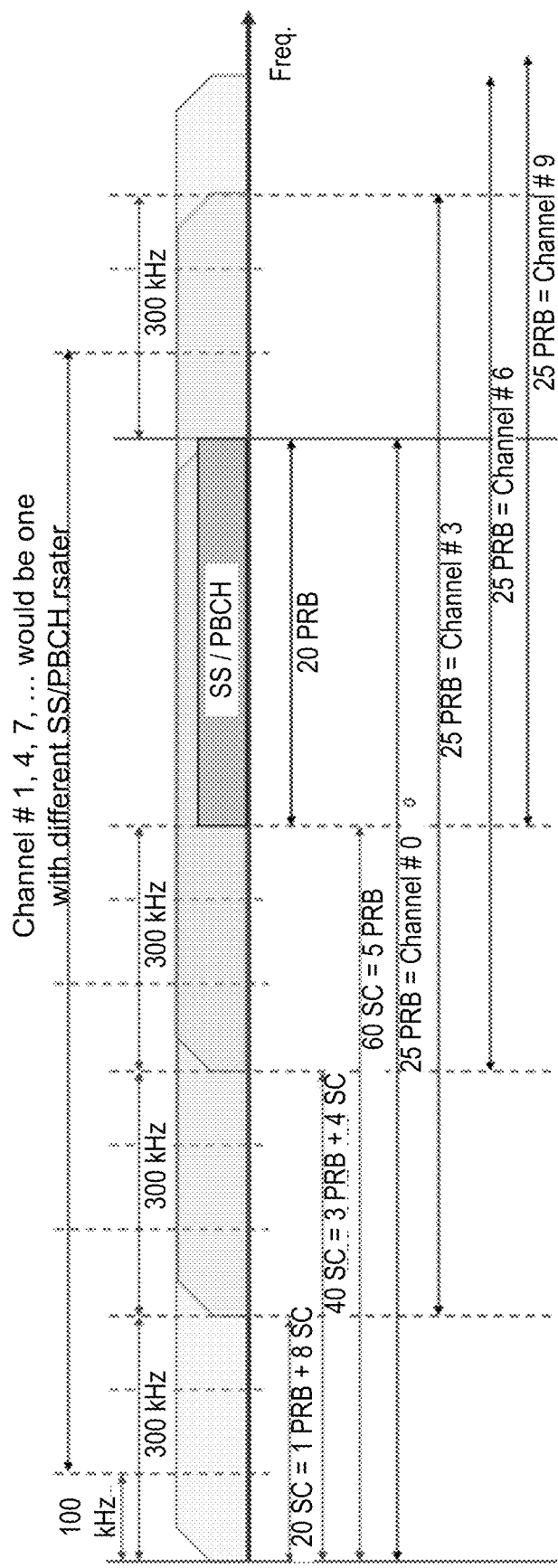
Figure 1C:
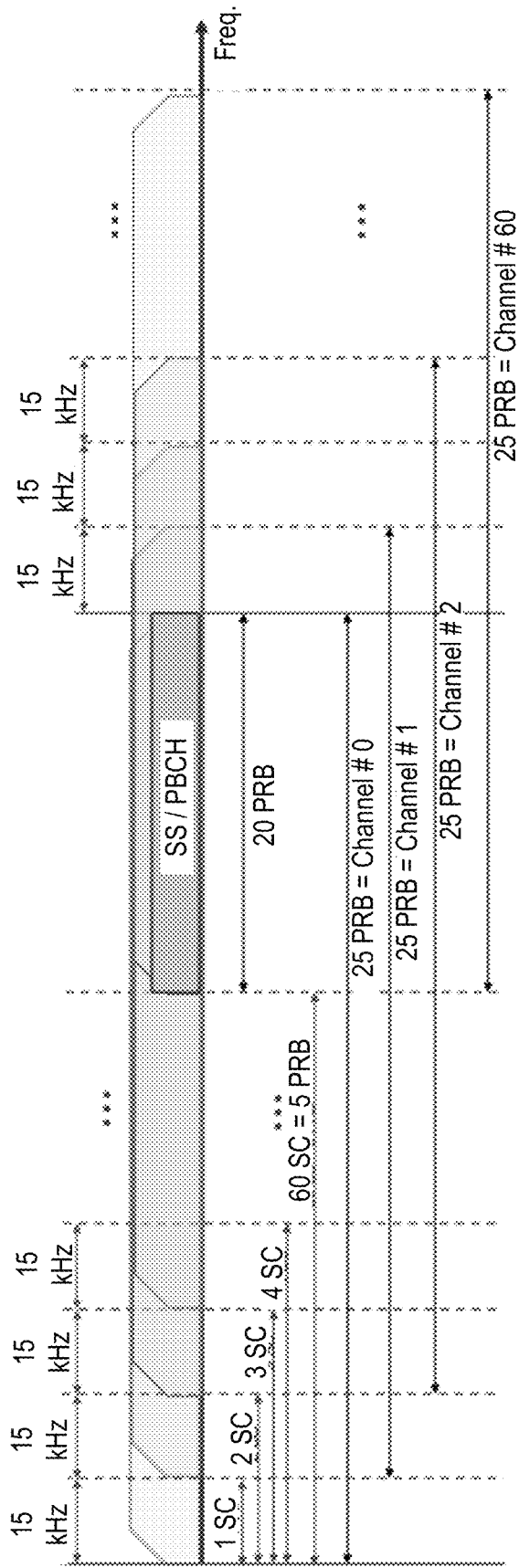

From a number of RBs available for each system bandwidth, it may be possible to determine the potential SS/PBCH frequency position with respect to the system bandwidth. FIGS. 1B, 1C, 1D, and 1E illustrate a SS/PBCH block position with respect to a different system with 5 or 10 MHz channel bandwidth, according to some embodiments. For example, FIG. 1B shows SS/PBCH Block position with respect to a different system with 5 MHz channel bandwidth, e.g., when 15 kHz is used for SS/PBCH Block and 100 kHz is used for the channel raster. FIG. 1C shows SS/PBCH Block position with respect to a different system with 5 MHz channel bandwidth, e.g., when 15 kHz is used for SS/PBCH Block and 15 kHz is used for the channel raster. FIG. 1D illustrates SS/PBCH Block position with respect to a different system with 10 MHz channel bandwidth, e.g., when 30 kHz is used for SS/PBCH Block and 100 kHz is used for the channel raster. FIG. 1E illustrates SS/PBCH Block position with respect to a different system with 10 MHz channel bandwidth, e.g., when 30 kHz is used for SS/PBCH Block and 30 kHz is used for the channel raster.

Figure 1F:
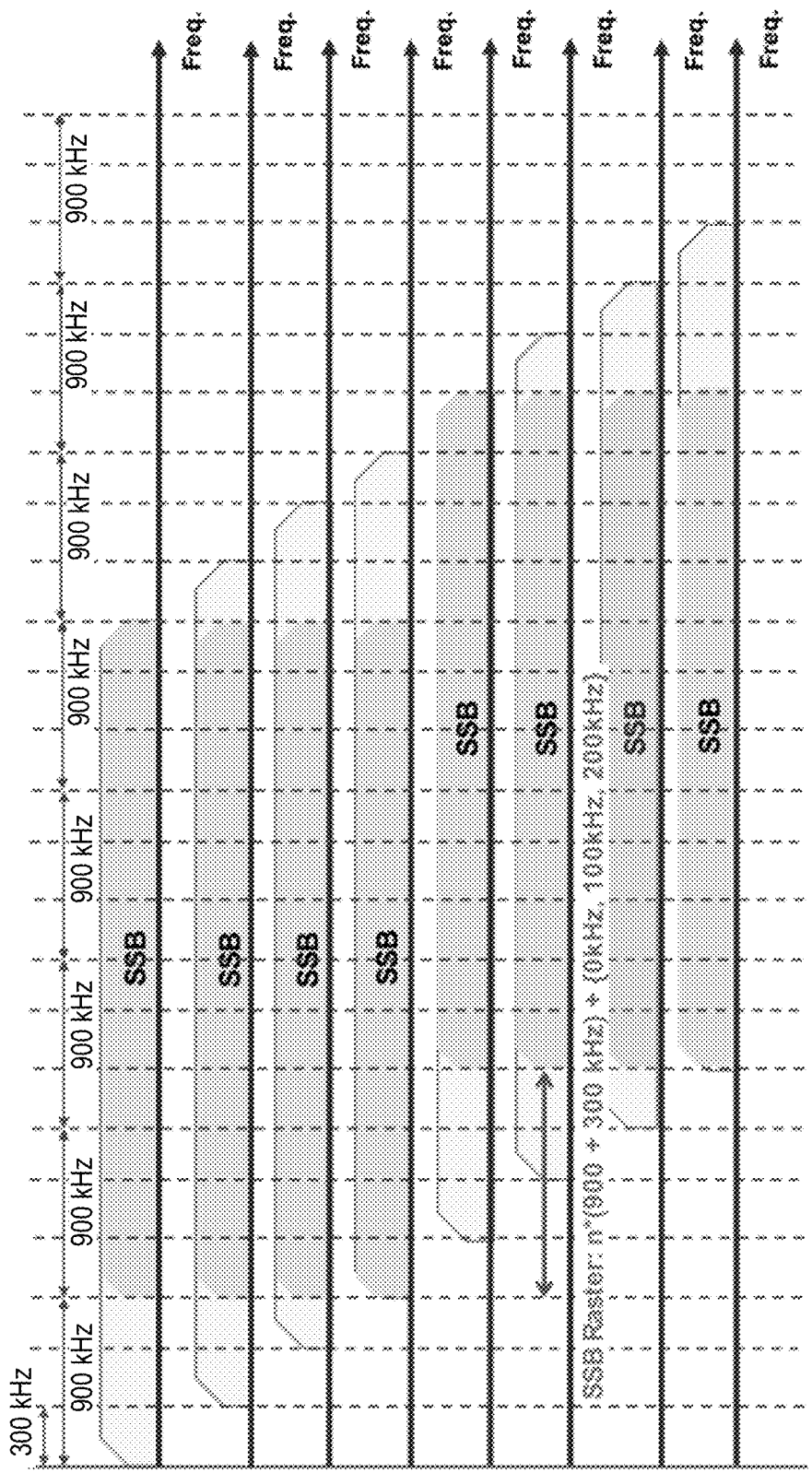
FIG. 1F illustrates two adjacent SS/PBCH block positions that are on a same subcarrier grid, according to some embodiments.

From the potential SS/PBCH positions, a minimum frequency gap between center frequencies (e.g., of band edge frequencies) of two adjacent SS/PBCH block positions (e.g., SS raster) can be derived. New SS/PBCH block position has to be defined, e.g., if the SS raster is larger than the bandwidth difference between the SS/PBCH block and the system bandwidth plus a single channel raster. FIG. 1F illustrates two adjacent SS/PBCH block positions that are on a same subcarrier grid, according to some embodiments.

From FIG. 1F, the SS raster gap, $C_{raster}^{SS}$, may be derived as:

$$C_{raster}^{SS} = (N_{RB}^{sys} - N_{RB}^{SS}) \cdot 12 \cdot \Delta_{SS} + C_{raster}^{chan}, \qquad \text{Equation 1}$$

where $\Delta_{SS}$ is the subcarrier spacing (SCS) of the SS/PBCH Block, $N_{RB}^{sys}$ and $N_{RB}^{SS}$ are the number of RBs of the system and SS/PBCH block using SCS of $\Delta_{SS}$, respectively, and $C_{raster}^{chan}$ is the channel raster gap (e.g., center frequency gap) between two potential channels. It may be noted that this is the SS raster for SS that are in the same subcarrier grid, e.g., meaning that they are integer multiple of SCS.

Various embodiments of this disclosure provide signaling mechanism, and transmission and reception of control resources for control information that contains scheduling information of system information.

Figure 1G:
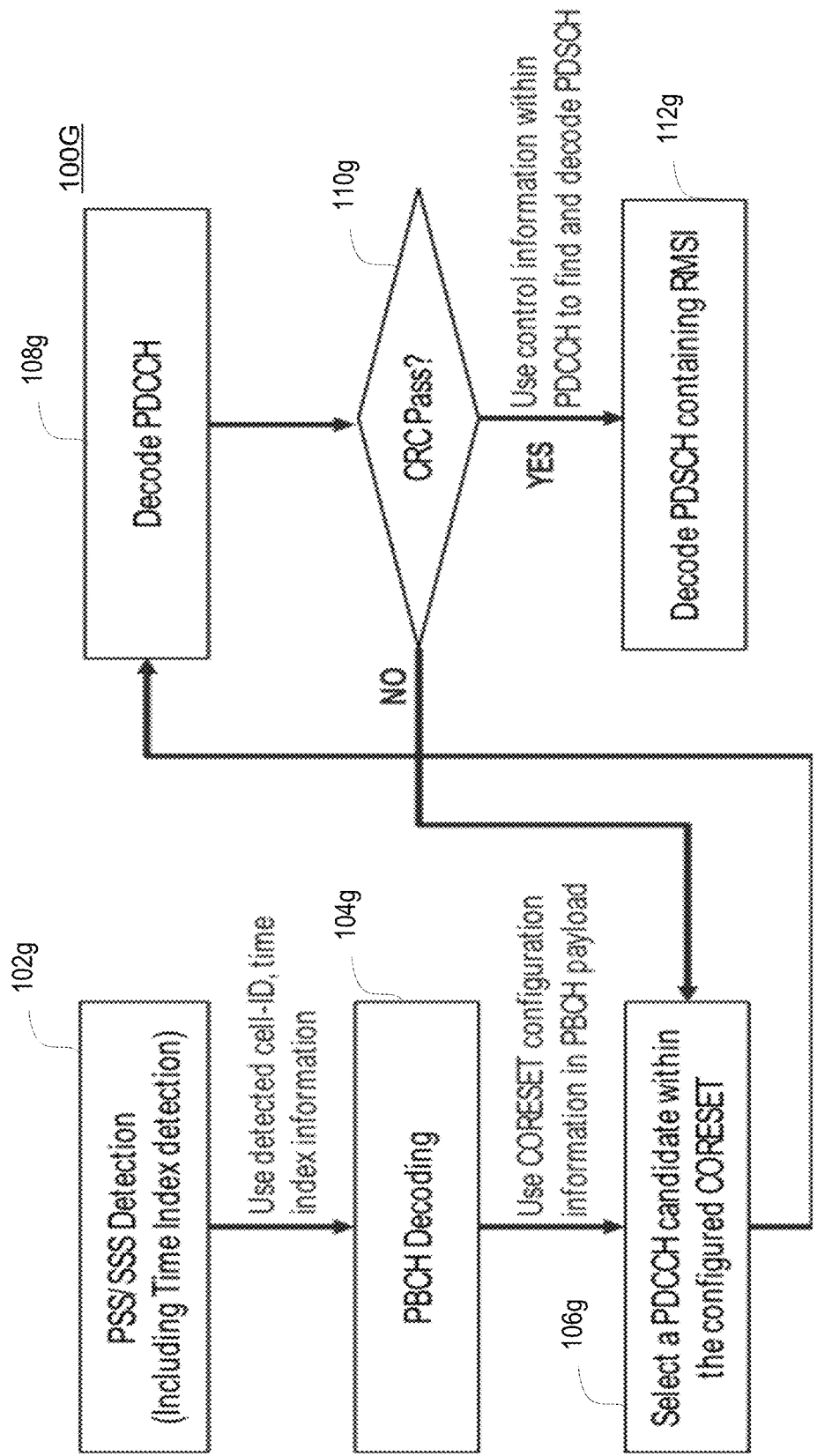
FIG. 1G illustrates a flowchart depicting a method 100G for a User Equipment (UE) decoding and receiving a Minimum System Information (MSI), according to some embodiments.

FIG. 1G illustrates a flowchart depicting a method 100G for a UE decoding and receiving the minimum system information (MSI), according to some embodiments.

Although the blocks in the flowchart with reference to FIG. 1G are shown in a particular order, the order of the actions can be modified. Thus, the illustrated embodiments can be performed in a different order, and some actions/blocks may be performed in parallel. Some of the blocks and/or operations listed in FIG. 1G may be optional in accordance with certain embodiments. The numbering of the blocks presented is for the sake of clarity and is not intended to prescribe an order of operations in which the various blocks must occur.

In an example, the MSI is split into two components: PBCH and Remaining MSI (RMSI). After the detection of PSS/SSS at 102g (and time index information for descrambling the PBCH), the UE decodes the PBCH at 104g, and retrieves the COntrol REsource SET (CORESET) information, which is the set of resources that could be used to transmit the physical downlink control channel (PDCCH). At 106g, the UE uses the CORESET information in the PBCH payload to select a PDCCH candidate within the CORESET. For example, multiple possible PDCCH positions may be possible within a CORESET, and one of the possible positions is selected. The PDCCH carries scheduling information of a physical downlink shared channel (PDSCH), which includes the RMSI contents.

At 108g, the UE decodes the selected PDCCH. If the decoded PDCCH does not pass the CRC (Cyclic Redundancy Test) at 110g, another PDCCH candidate is selected and the method 100G loops back to 106g. If the decoded PDCCH passes the CRC at 110g, at 112g the UE uses control information within the PDCCH to find and decode PDSCH that includes the RMSI.

In some embodiments, the PDCCH is transmitted using aggregation of unit resources, called the control channel element (CCE). The PDCCH can be formed using 1, 2, 4, or 8 CCEs. Each CCE includes 6 resource element groups, where a resource element group consist of 12 resource elements. Each resource element corresponds to a modulated symbol of a subcarrier of an OFDM symbol.

In some embodiments, the CORESET may span several physical resource blocks (PRBs), where a PRB may comprise consecutive 12 subcarriers in frequency domain, and span up to 3 (e.g., 3 consecutive) OFDM symbols in time domain.

Various embodiments of this disclosure provide method of signaling CORESET configuration, e.g., which is transmitted as part of the PBCH payload. Description of various embodiments have been split into two components—frequency bandwidth and location of the CORESET configuration, and time domain mapping of the CORESET configuration.

Frequency Domain Aspects

Supporting CORESET Bandwidth Similar to SS/PBCH Bandwidth with Same SCS

When the CORESET SCS and SS/PBCH SCS is the configured to be the same (e.g., through signaling in PBCH), the CORESET bandwidth may potentially be 18, 20, 24 PRBs, or the like.

Figure 1H:
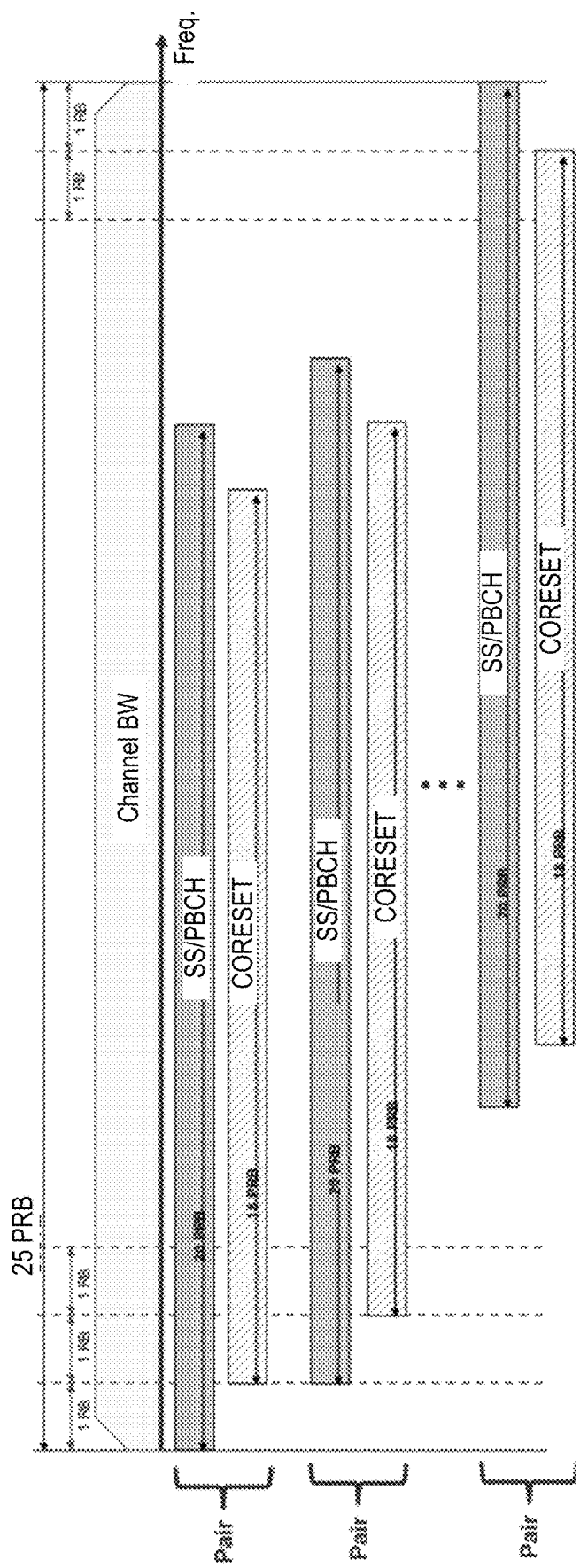
FIGS. 1H and 1I illustrate examples of the relative position of a Control Resource Set (CORESET) with respect to SS/PBCH position for 18 Physical Resource Block (PRB) CORESET, according to some embodiments.
Figure 1I:
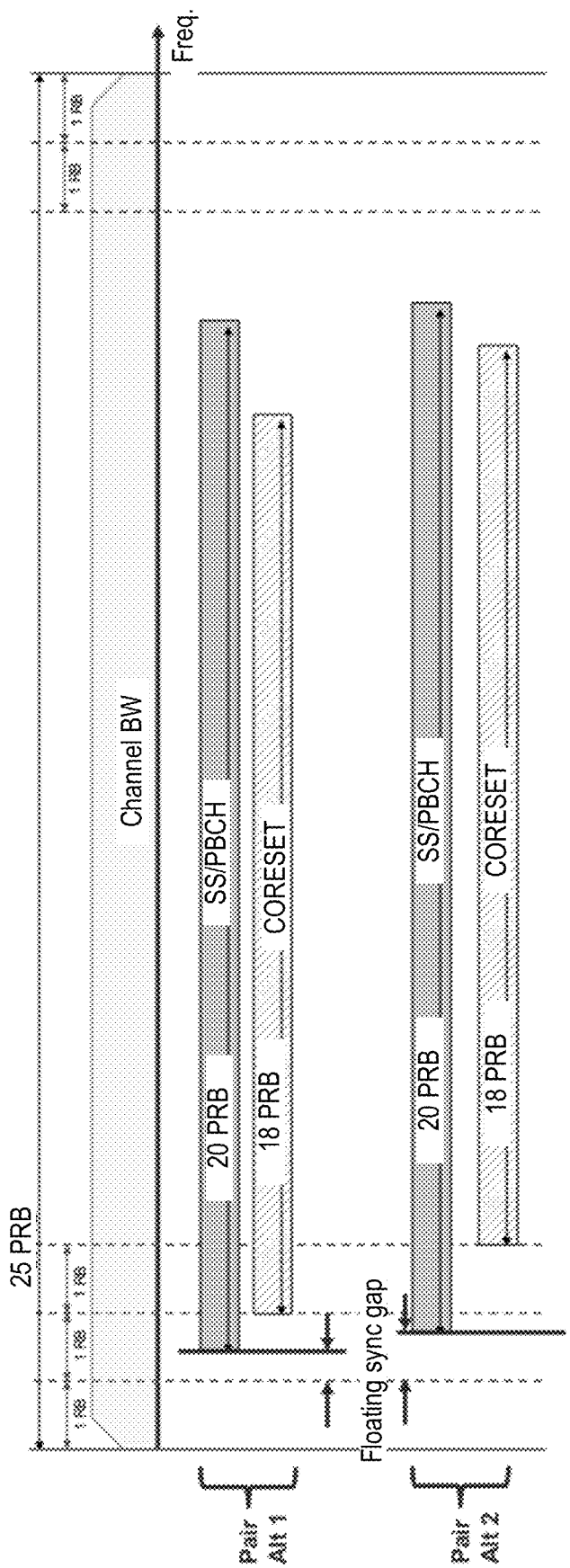

In case of 18 PRB CORESET bandwidth, the CORESET bandwidth and frequency position may be defined relative to the SS/PBCH bandwidth. FIGS. 1H and 1I illustrate examples of the relative position of the CORESET with respect to SS/PBCH position for 18 PRB CORESET, according to some embodiments. In case the SS/PBCH block is not aligned with the PRB grid (e.g., illustrated using vertical dotted lines in FIG. 1I) of the channel BW and has a subcarrier offset that is smaller than 1 PRB (e.g., 12 subcarriers), the CORESET may still be aligned with the PRB grid, e.g., as shown in the "Pair 1" of FIG. 1I. The relative position may be defined such that an edge of the CORESET bandwidth may have no more than 18 subcarriers (e.g., 1 PRB plus 6 subcarriers) away from an edge of the SS/PBCH bandwidth. For example, in FIG. 1I, in the pair 1, an edge of the CORESET bandwidth is less than 1 PRB away from an edge of the SS/PBCH bandwidth. For example, in FIG. 1I, in the pair 2, an edge of the CORESET bandwidth is more than 1 PRB away from an edge of the SS/PBCH bandwidth.

In case of 20 PRB CORESET bandwidth, the CORESET bandwidth and frequency position may be defined relative to the SS/PBCH bandwidth. If the SS/PBCH bandwidth is aligned with the PRB grid of the channel BW, the CORESET bandwidth may occupy exactly the same bandwidth as the SS/PBCH bandwidth. In case the SS/PBCH block is not aligned with the PRB grid of the channel BW and has a subcarrier offset that is smaller than 1 PRB (e.g., 12 subcarriers), the CORESET may still be aligned with the PRB grid. In such scenario, the relative position may be defined such that an edge of the CORESET bandwidth is no more than 6 subcarriers away from an edge of the SS/PBCH bandwidth and also confined within the channel bandwidth.

Figure 1J:
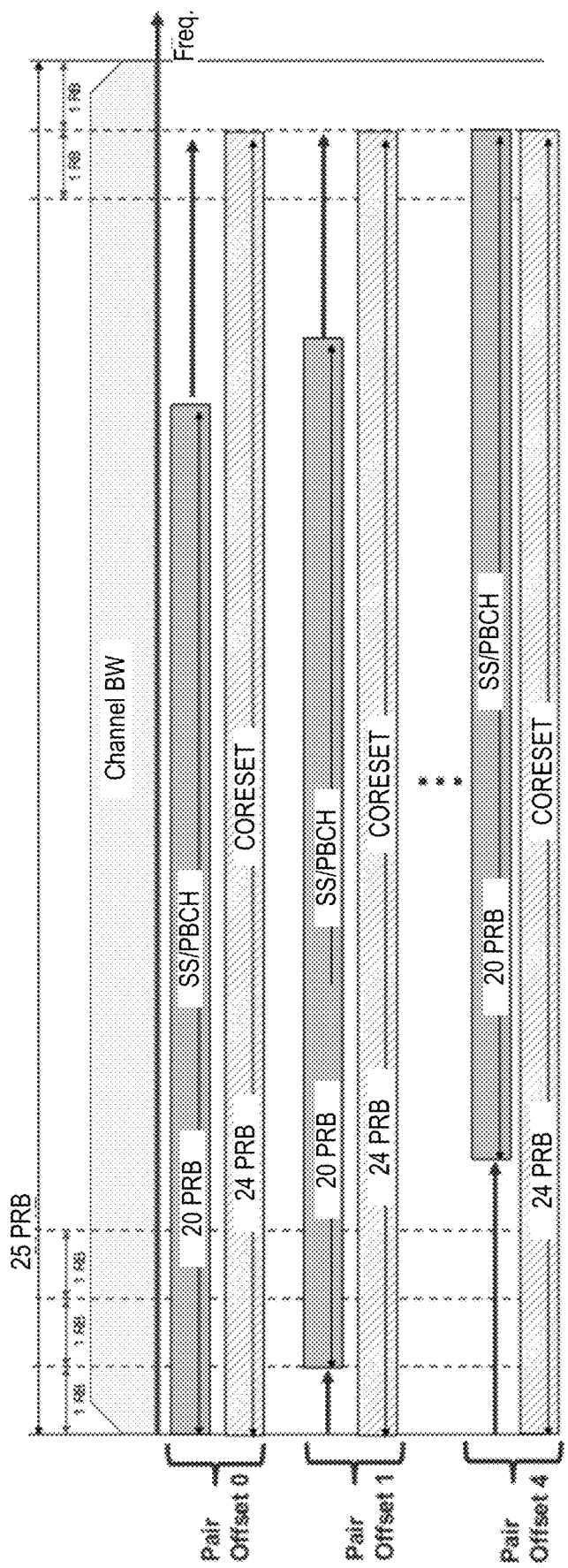
FIG. 1J illustrates relative Position of 24 PRB CORESET with respect to SS/PBCH Block within a 25 PRB channel BW, assuming 15 kHz SCS for SS/PBCH Block, according to some embodiments.

In case of 24 PRB CORESET bandwidth, the CORESET bandwidth and frequency position may be defined relative to the SS/PBCH bandwidth. However, given that there are multiple SS/PBCH bandwidth placement within the channel BW, CORESET configuration signaling has to additionally support signaling of frequency offset with respect to SS/PBCH. The offset needed may be in the units of integer PRBs. In case the SS/PBCH block is not aligned with the PRB grid of the channel BW and has a subcarrier offset that is smaller than 1 PRB (e.g., 12 subcarriers), the CORESET may still be aligned with the PRB grid. In such scenario, the relative position may be defined such that the edge of the CORESET bandwidth is no more than (12*N+6) subcarriers away from the edge of the SS/PBCH bandwidth and also confined within the channel bandwidth, where N is the integer and dependent on the PRB offset signaling. FIG. 1J illustrates relative Position of 24 PRB CORESET with respect to SS/PBCH Block within a 25 PRB channel BW, assuming 15 kHz SCS for SS/PBCH Block, according to some embodiments.

Figure 1K:
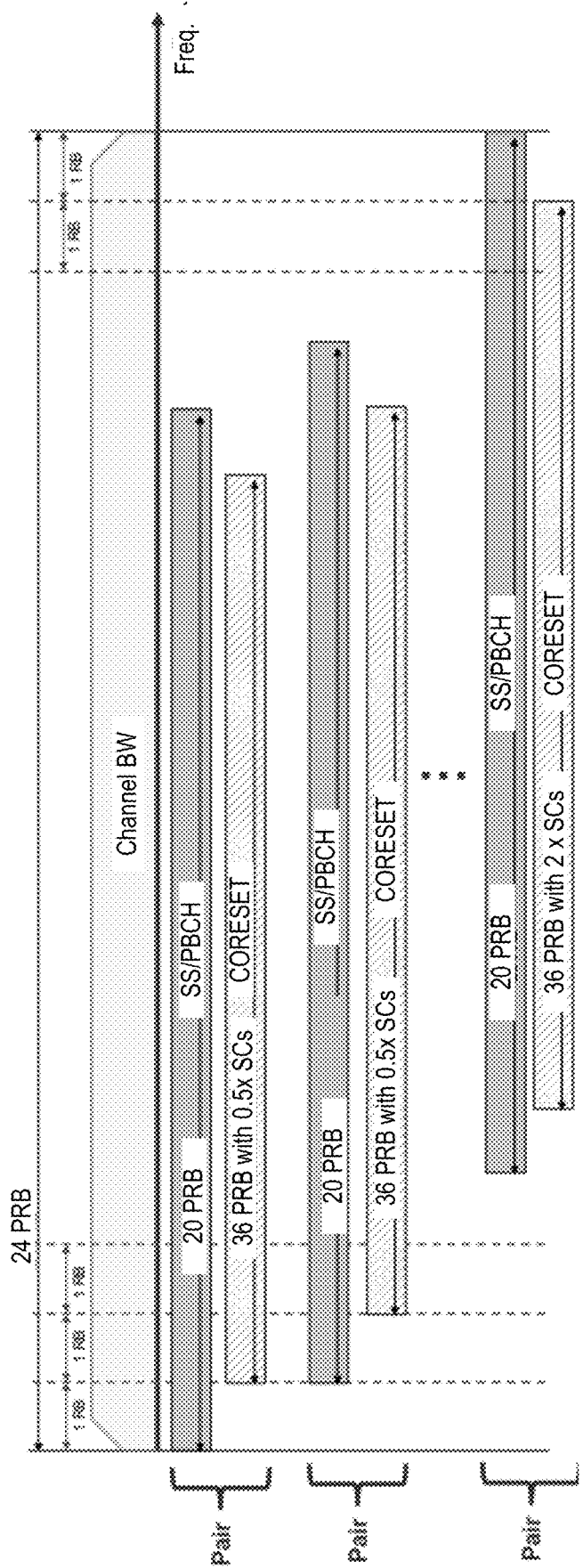
FIGS. 1K and 1L illustrate examples of the number of PRB for CORESET and its relative position (e.g., for the above discussed scenarios), according to some embodiments.
Figure 1L:
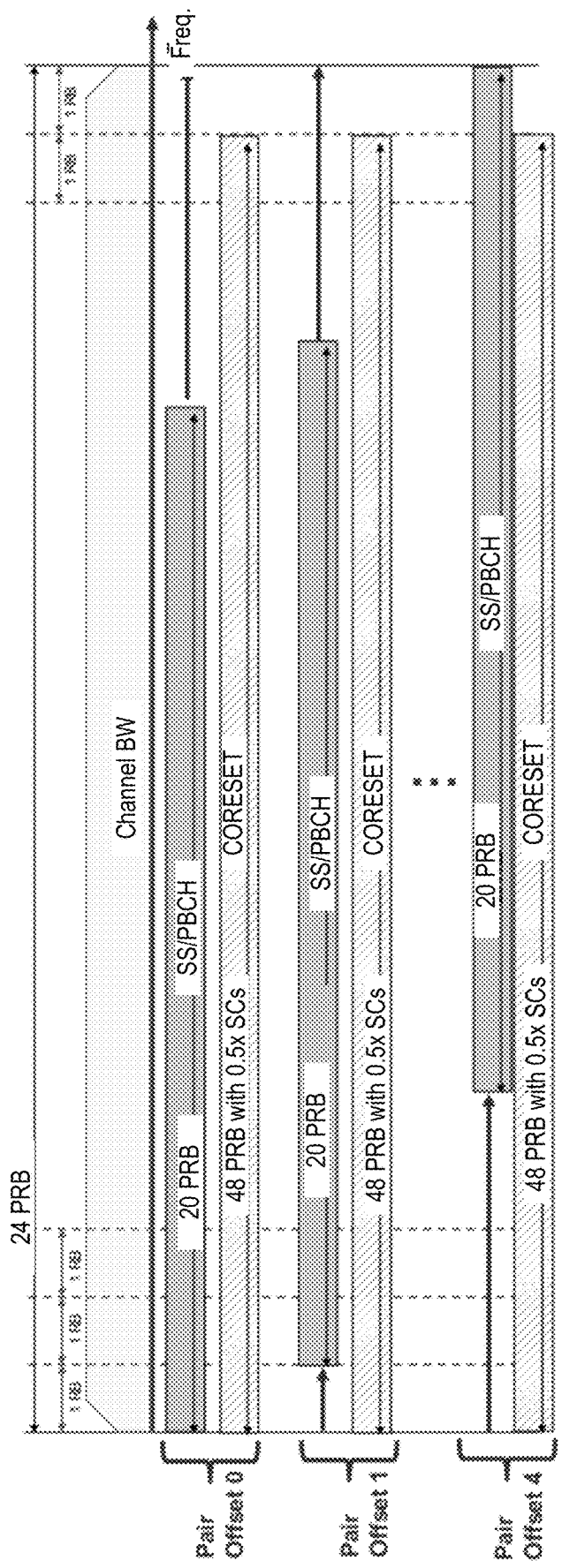

Supporting CORESET Bandwidth Similar to SS/PBCH Bandwidth with SS/PBCH SCS Larger than PDCCH SCS Contained in the CORESET Example configurations of SS/PBCH SCS being larger than the PDCCH SCS that is contained within the CORESET signaled by PBCH are:
 (i) SS/PBCH SCS of 30 kHz and RMSI PDCCH/PDSCH SCS of 15 kHz, and/or
 (ii) SS/PBCH SCS of 120 kHz and RMSI PDCCH/PDSCH SCS of 60 kHz In such configuration, if 18 PRB is used for CORESET when SCS of SS/PBCH and SCS of RMSI PDCCH/PDSCH was the same, then 36 PRB may be used for CORESET when SCS of SS/PBCH is larger than SCS of RMSI PDCCH/PDSCH. FIGS. 1K and 1L illustrate examples of the number of PRB for CORESET and its relative position (e.g., for the above discussed scenarios), according to some embodiments.

If 20 PRB is used for CORESET when SCS of SS/PBCH and SCS of RMSI PDCCH/PDSCH are the same, then 40 PRB may be used for CORESET when SCS of SS/PBCH is larger than SCS of RMSI PDCCH/PDSCH.

If 24 PRB is used for CORESET when SCS of SS/PBCH and SCS of RMSI PDCCH/PDSCH is the same, then 48 PRB may be used for CORESET when SCS of SS/PBCH is larger than SCS of RMSI PDCCH/PDSCH.

In some embodiments, in a configuration where 48 PRBs are used (e.g., instead of 24 PRBs) for CORESET when SCS of SS/PBCH is larger than SCS of RMSI PDCCH/PDSCH, the offset value that determines the relative PRB shift between SS/PBCH and CORESET bandwidth may be in units of 2 PRB in SCS of the RMSI PDCCH/PDSCH (e.g., instead of 1 PRB as in the 18 PRB CORESET case). An example of this is shown in FIG. 1L.

Supporting CORESET Bandwidth Similar to SS/PBCH Bandwidth with SS/PBCH SCS Smaller than PDCCH SCS Contain in the CORESET Example configuration of SS/PBCH SCS being smaller than the PDCCH SCS that is contained within the CORESET signaled by PBCH may be:

(i) SS/PBCH SCS of 15 kHz and RMSI PDCCH/PDSCH SCS of 30 kHz, or (ii) SS/PBCH SCS of 240 kHz and RMSI PDCCH/PDSCH SCS of 120 kHz.

Figure 1M:
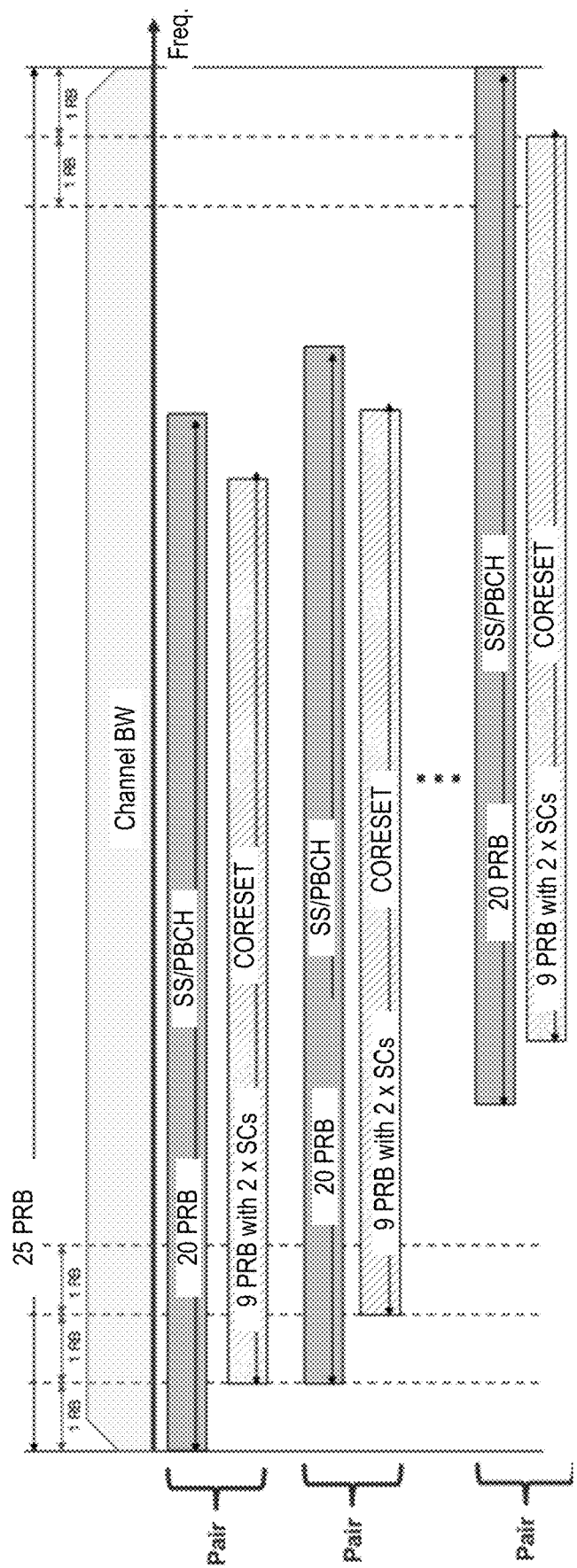
FIG. 1M illustrates an example of a number of PRBs for CORESET and its relative position (e.g., for the above scenarios), according to some embodiments.

In such configurations, if 18 PRBs are used for CORESET when SCS of SS/PBCH and SCS of RMSI PDCCH/PDSCH are the same, then 9 PRB is to be used for CORESET when SCS of SS/PBCH is smaller than SCS of RMSI PDCCH/PDSCH. FIG. 1M illustrate an example of a number of PRBs for CORESET and its relative position (e.g., for the above scenarios), according to some embodiments.

If 20 PRBs are used for CORESET when SCS of SS/PBCH and SCS of RMSI PDCCH/PDSCH was the same, then 9 PRBs (or 10 PRBs) are to be used for CORESET when SCS of SS/PBCH is smaller than SCS of RMSI PDCCH/PDSCH. An example reason for reducing the number of PRB smaller than half of the original number PRB (e.g., when SCS is the same between SS/PBCH and RMSI PDCCH/PDSCH) may be due to adjacent channel leakage ratio limits. In an example, wider subcarrier spacing results in more severe leakage to out of the transmission bands and this may limit the number of PRBs for CORESET in such scenarios described.

If 24 PRBs are used for CORESET when SCS of SS/PBCH and SCS of RMSI PDCCH/PDSCH was the same, then 12 (or 11) PRBs are to be used for CORESET when SCS of SS/PBCH is smaller than SCS of RMSI PDCCH/PDSCH. An example reason for reducing the number of PRB smaller than half of the original number PRB (e.g., when SCS is the same between SS/PBCH and RMSI PDCCH/PDSCH) is due to adjacent channel leakage ratio limits. In an example, wider subcarrier spacing results in more severe leakage to out of the transmission bands and this may limit the number of PRBs for CORESET in such scenarios described.

Figure 1N:
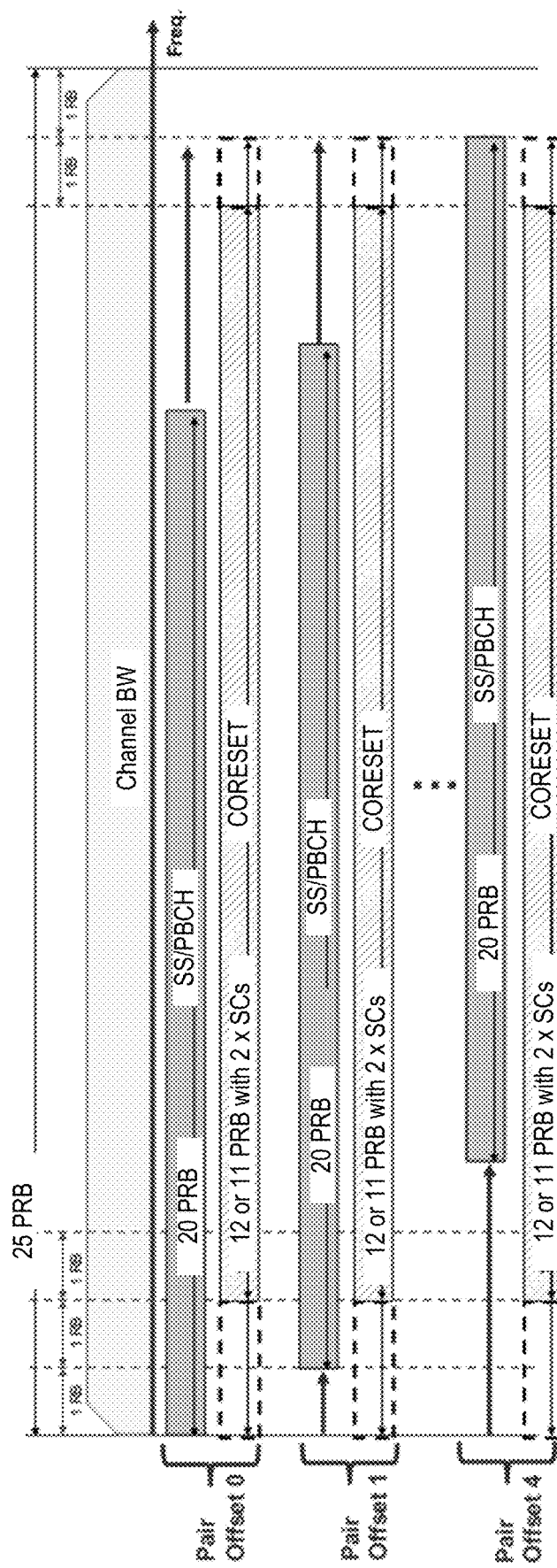

In the configuration where 12 (or 11) PRBs are used (e.g., instead of 24 PRBs) for CORESET when SCS of SS/PBCH is larger than SCS of RMSI PDCCH/PDSCH, the offset value that determines the relative PRB shift between SS/PBCH and CORESET bandwidth may be in units of half PRB with SCS that of RMSI PDCCH and PDSCH (e.g., instead of 1 PRB as in the 18 PRB CORESET case), or equivalently, in units of 1 PRB with SCS that of SS/PBCH, e.g., as illustrated in FIGS. 1N and 1O, according to some embodiments.

Table 3, Table 4, and Table 5 herein below show a number of PRBs for CORESET.

For example, Table 3 below depicts a number of PRB for CORESET, based on 18 PRB CORESET configuration.

TABLE 3

| SCS of SS/PBCH | SCS of RMSI PDCCH/PDSCH (signaled in PBCH) | Number of PRB for CORESET signaled in PBCH (unit based on SCS of RMSI PDCCH/PDSCH) |
|---|---|---|
| 15 kHz | 15 kHz | 18 |
|  | 30 kHz | 9 |
| 30 kHz | 15 kHz | 36 |
|  | 30 kHz | 18 |
| 120 kHz | 60 kHz | 36 |
|  | 120 kHz | 18 |
| 240 kHz | 60 kHz | 72 |
|  | 120 kHz | 36 |

Table 4 below depicts a number of PRB for CORESET, based on 20 PRB CORESET configuration.

TABLE 4

| SCS of SS/PBCH | SCS of RMSI PDCCH/PDSCH (signaled in PBCH) | Number of PRB for CORESET signaled in PBCH (unit based on SCS of RMSI PDCCH/PDSCH) |
|---|---|---|
| 15 kHz | 15 kHz | 20 |
|  | 30 kHz | 10 or 9 |
| 30 kHz | 15 kHz | 40 |
|  | 30 kHz | 20 |
| 120 kHz | 60 kHz | 40 |
|  | 120 kHz | 20 |
| 240 kHz | 60 kHz | 80 |
|  | 120 kHz | 40 |

Table 5 depicts a number of PRB for CORESET, based on 24 PRB CORESET configuration.

TABLE 5

| SCS of SS/PBCH | SCS of RMSI PDCCH/PDSCH (signaled in PBCH) | Number of PRB for CORESET signaled in PBCH (unit based on SCS of RMSI PDCCH/PDSCH) |
|---|---|---|
| 15 kHz | 15 kHz | 24 |
|  | 30 kHz | 12 or 11 |
| 30 kHz | 15 kHz | 48 |
|  | 30 kHz | 24 |
| 120 kHz | 60 kHz | 48 |
|  | 120 kHz | 24 |
| 240 kHz | 60 kHz | 96 |
|  | 120 kHz | 48 |

Supporting Larger CORESET Bandwidth Compared to the Bandwidth of the SS/PBCH

In addition to supporting CORESET bandwidth similar to the bandwidth of the SS/PBCH, the system may be able to support CORESET bandwidth that are higher (e.g., substantially twice and/or four times) than that of a bandwidth of SS/PBCH.

Figure 1P:
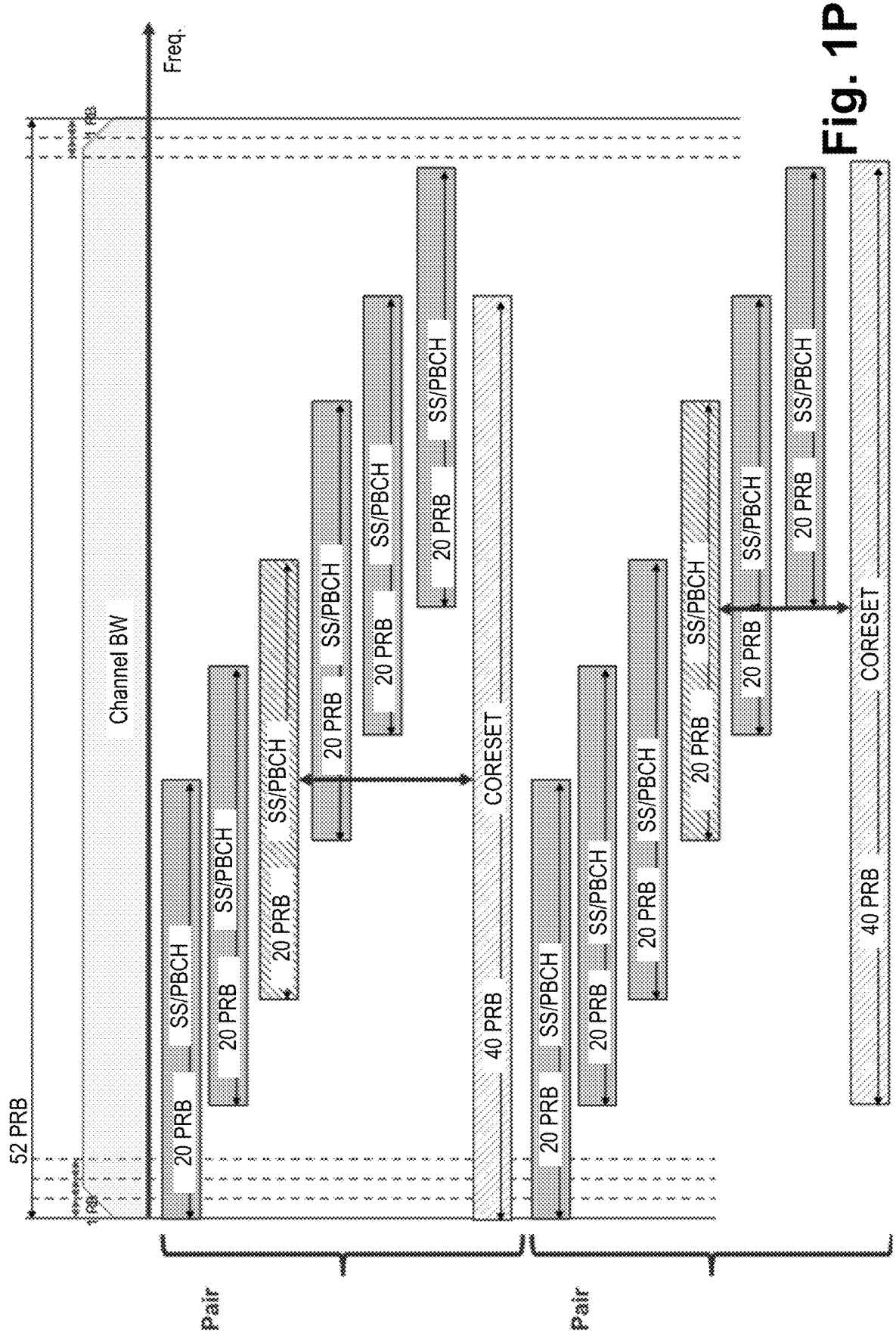
In FIG. 1P, a system bandwidth consists of 52 PRB with 15 kHz, and SS/PBCH is also using 15 kHz and spans 20 PRBs, according to some embodiments.

It is to be noted that larger CORESET bandwidth compared to the bandwidth of SS/PBCH may be possible (e.g., only possible) if the channel bandwidth is much larger than the SS/PBCH bandwidth. For example, if the system bandwidth 10 MHz and 15 kHz SCS based SS/PBCH is used, the SS/PBCH may merely occupy 20 PRBs (e.g., 3.6 MHz). Within the system bandwidth of 10 MHz, there may be 5 to 6 (e.g., depending on the channel raster) potential SS/PBCH positions that the network may utilize. If a center frequency of the CORESET bandwidth and a center frequency of SS/PBCH are to have small relative difference (for example maximum of +2 PRB or −2 PRB in units with SCS of SS/PBCH), then merely some of the SS/PBCH positions may allow configuration of CORESET with larger bandwidth. An example of this illustrated in FIG. 1P. In FIG. 1P, a system bandwidth comprises 52 PRB with 15 kHz, and SS/PBCH is also using 15 kHz and spans 20 PRBs, according to some embodiments. Within the 52 PRB system bandwidth, there may be 6 different positions of SS/PBCH that may be selected for use by the system. Larger CORESET bandwidth of 40 PRB with 15 kHz subcarrier spacing may be only available when one of the central SS/PBCH positions within the system bandwidth is selected for use by the system.

In an example, based on the above example, the CORESET configuration signaling may be expanded to also include CORESET bandwidth configuration that is two times (e.g., 2×) or four times (e.g., 4×) larger than that of SS/PBCH block bandwidth. Table 6, Table 7, and Table 8 below show a number of PRBs of CORESET that may be configured by PBCH.

For example, Table 6 below depicts a number of PRBs for CORESET based on 18 PRB CORESET configuration.

TABLE 6

| SCS of SS/PBCH | SCS of RMSI PDCCH/PDSCH (signaled in PBCH) | Number of PRB for CORESET signaled in PBCH (unit based on SCS of RMSI PDCCH/PDSCH) | | |
|---|---|---|---|---|
| | | Similar BW as SS/PBCH | 2x BW as SS/PBCH | 4x BW as SS/PBCH |
| 15 kHz | 15 kHz | 18 | 36 | 72 |
| | 30 kHz | 9 | 18 | 36 |
| 30 kHz | 15 kHz | 36 | 72 | 144 |
| | 30 kHz | 18 | 36 | 72 |
| 120 kHz | 60 kHz | 36 | 72 | 144 |
| | 120 kHz | 18 | 36 | 72 |
| 240 kHz | 60 kHz | 72 | 144 | N/A |
| | 120 kHz | 36 | 72 | 144 |

Table 7 below shows a number of PRBs for CORESET based on 20 PRB CORESET configuration.

TABLE 7

| SCS of SS/PBCH | SCS of RMSI PDCCH/PDSCH (signaled in PBCH) | Number of PRB for CORESET signaled in PBCH (unit based on SCS of RMSI PDCCH/PDSCH) | | |
|---|---|---|---|---|
| | | Similar BW as SS/PBCH | 2x BW as SS/PBCH | 4x BW as SS/PBCH |
| 15 kHz | 15 kHz | 20 | 40 | 80 |
| | 30 kHz | 10 | 20 | 40 |
| 30 kHz | 15 kHz | 40 | 80 | 160 |
| | 30 kHz | 20 | 40 | 80 |
| 120 kHz | 60 kHz | 40 | 80 | 160 |
| | 120 kHz | 20 | 40 | 80 |
| 240 kHz | 60 kHz | 80 | 160 | N/A |
| | 120 kHz | 20 | 80 | 160 |

When the CORESET bandwidth unit is based on reference PRB of 24 PRBs, the CORESET configuration signaling may also support PRB offset signaling. The PRB offset signaling may be on top of the subcarrier offset signaling that is utilized when SS/PBCH block are not aligned with the CORESET on the PRB grid.

Table 8 shows a number of PRB for CORESET based on 24 PRB CORESET configuration.

TABLE 8

| SCS of SS/PBCH | SCS of RMSI PDCCH/PDSCH (signaled in PBCH) | Number of PRB for CORESET signaled in PBCH (unit based on SCS of RMSI PDCCH/PDSCH) | | |
|---|---|---|---|---|
| | | Similar BW as SS/PBCH | 2x BW as SS/PBCH | 4x BW as SS/PBCH |
| 15 kHz | 15 kHz | 24 | 48 | 96 |
| | 30 kHz | 12 or 11 | 24 | 48 |
| 30 kHz | 15 kHz | 48 | 96 | 192 |
| | 30 kHz | 24 | 48 | 96 |
| 120 kHz | 60 kHz | 48 | 96 | 192 |
| | 120 kHz | 24 | 48 | 96 |
| 240 kHz | 60 kHz | 96 | 192 | N/A |
| | 120 kHz | 48 | 96 | 192 |

Figure 1Q:
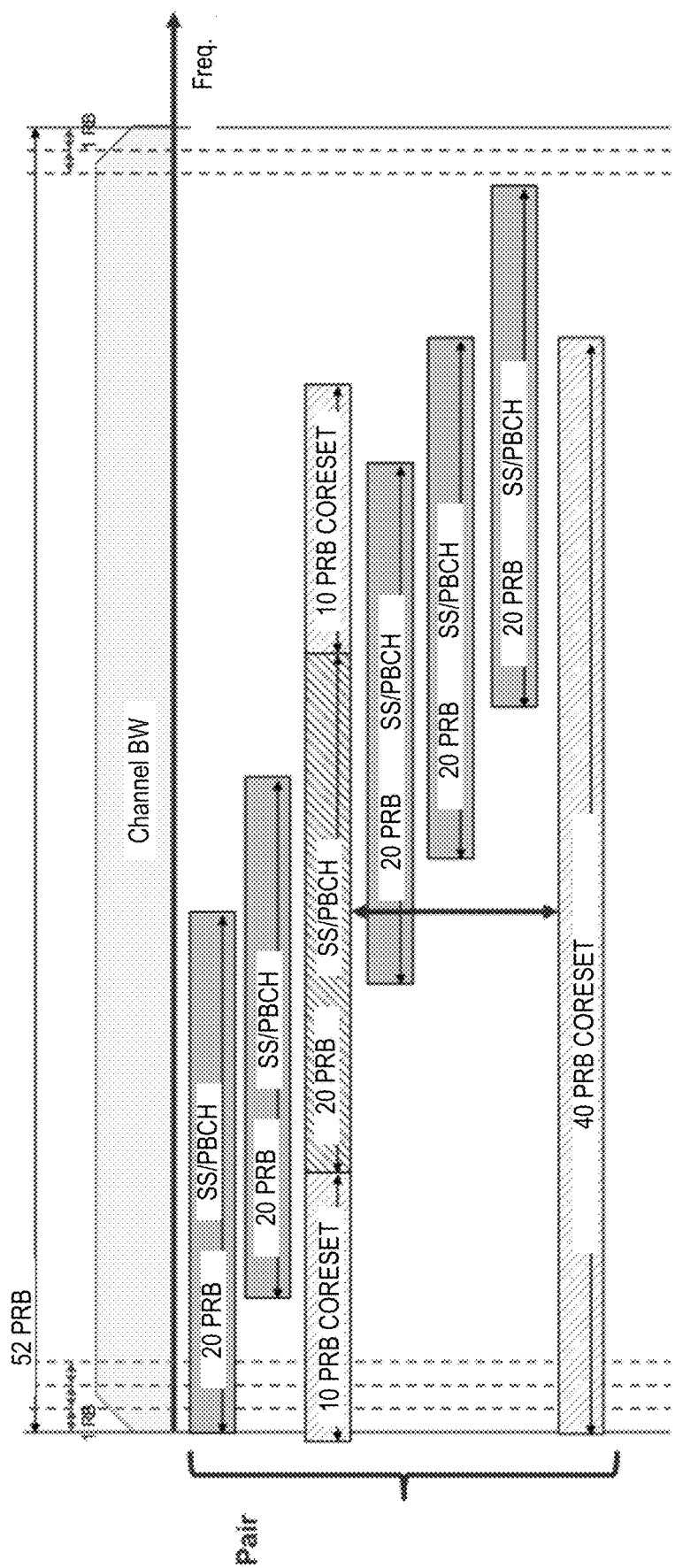
FIG. 1Q illustrates that when wider bandwidth CORESET is configured, the CORESET configuration may indicate FDM of CORESET and SS/PBCH, in which the CORESET may not use the frequency resources that is occupied by the SS/PBCH, according to some embodiments.

Supporting Frequency Domain Multiplexed (FDM) CORESET Bandwidth with SS/PBCH Bandwidth In some embodiments, the CORESET configuration described above may be in general applicable to CORESET configuration when CORESET and SS/PBCH do not collide and are multiplexed in time domain (e.g., time domain multiplexing (TDM)). However, some of the configuration may be applied to FDM of CORESET and SS/PBCH. For example, FIG. 1Q illustrates that when wider bandwidth CORESET is configured, the CORESET configuration may indicate FDM of CORESET and SS/PBCH, in which the CORESET may not use the frequency resources that is occupied by the SS/PBCH, according to some embodiments.

Figure 1R:
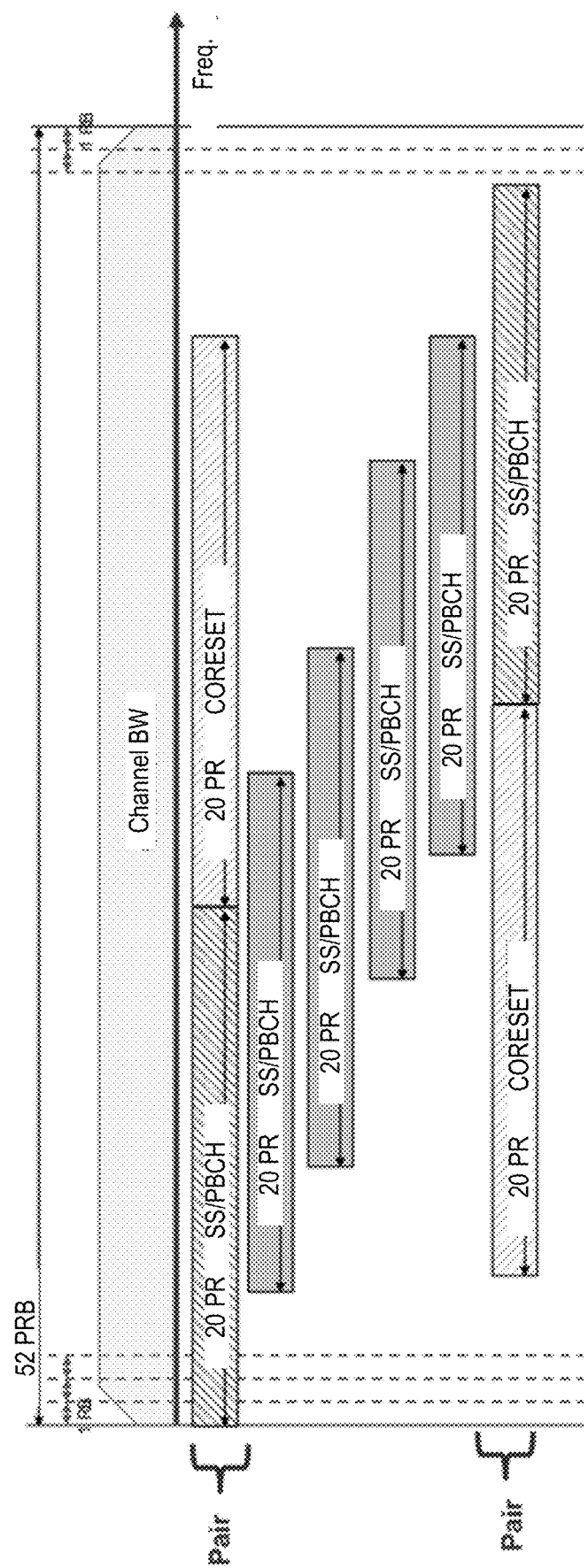
FIG. 1R illustrates an example when system selects one of the SS/PBCH that is on the edge of the system bandwidth and have the CORESET by FDM next to the SS/PBCH, according to some embodiments.

In another example, FDM of CORESET and SS/PBCH may be supported when the system selects one of the SS/PBCH that is on the edge of the system bandwidth and have the CORESET by FDM next to the SS/PBCH. For example, FIG. 1R illustrates an example when system selects one of the SS/PBCH that is on the edge of the system bandwidth and have the CORESET by FDM next to the SS/PBCH, according to some embodiments. There may be two positions of SS/PBCH and CORESET, e.g., (i) SS/PBCH on the lower frequency and CORESET on the higher frequency, and (ii) CORESET on the lower frequency and SS/PBCH on the higher frequency. When FDM of SS/PBCH and CORESET is configured, the PBCH also signals the FDM position type (i) or (ii).

Figure 1S:
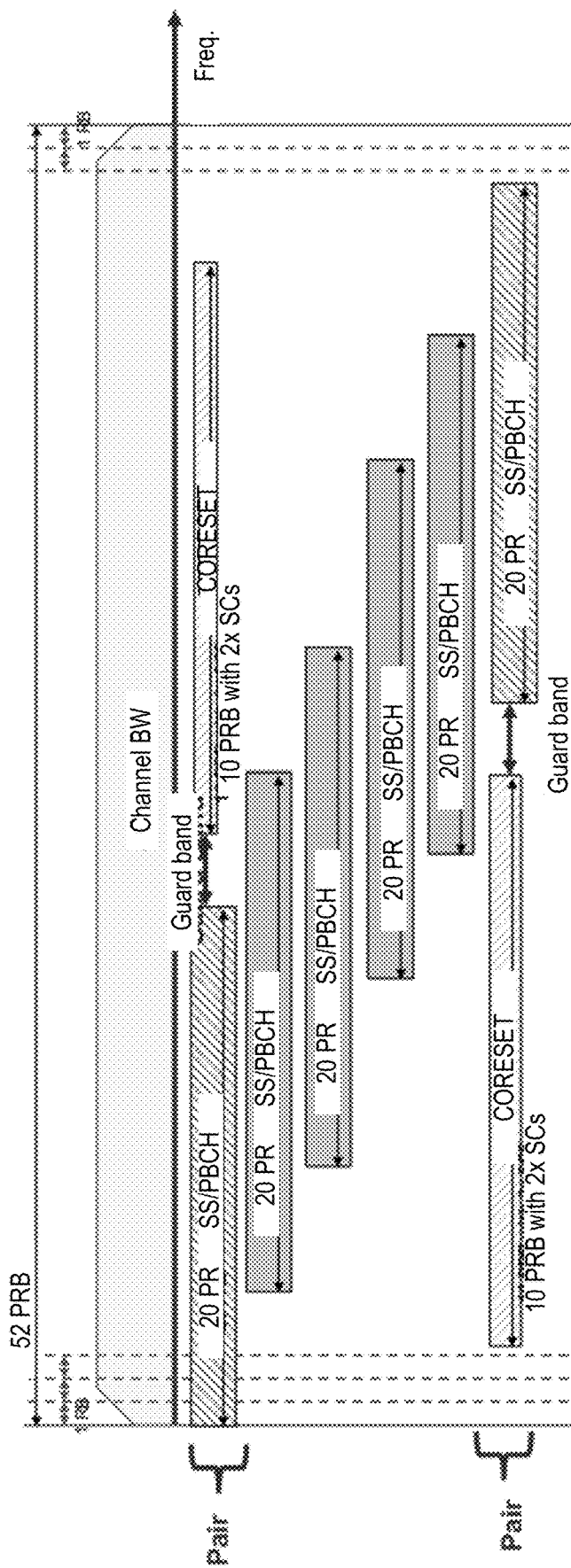
FIG. 1S illustrates a guard band (e.g., guard PRBs) between a CORESET and SS/PBCH block.

In case, the SCS of RMSI PDCCH/PDSCH that is transmitted in the PBCH signaled CORESET is different from the SCS of SS/PBCH block, the network may need to insert guard PRBs. FIG. 1S illustrates a guard band (e.g., guard PRBs) between a CORESET and SS/PBCH block.

Time Domain Aspects

Slot Placements of CORESET for RMSI PDCCH

For initial access, in an example, the UE assumes that SS/PBCH block are repeated with 20 milli-second (ms) periodicity. Furthermore, the multiple SS/PBCH blocks (e.g., each with different SS/PBCH block indices) are positioned such that all of them are confined within half radio frame, e.g., 5 msec. Therefore, the UE may assume that these half radio frames (e.g., of duration 5 ms) that contain one or more SS/PBCH block are repeating with 20 ms periodicity.

However, the network can actually operate the system with a different SS/PBCH block periodicity than what is assumed by the UE (e.g., with a periodicity that is different from 20 ms).

In an example, the CORESET containing slots are placed in other half radio frame that the SS/PBCH was detected from. If SS/PBCH was detected in the first half radio frame and PBCH was successfully decoded, UE assumes that the CORESET containing slots are placed in the second half radio frame. If SS/PBCH was detected in the second half radio frame and PBCH was successfully decoded, UE assumes that the CORESET containing slots are placed in the first half radio frame. A set of slots in the other half radio frame are defined as CORESET contains slots.

Figure 1T:
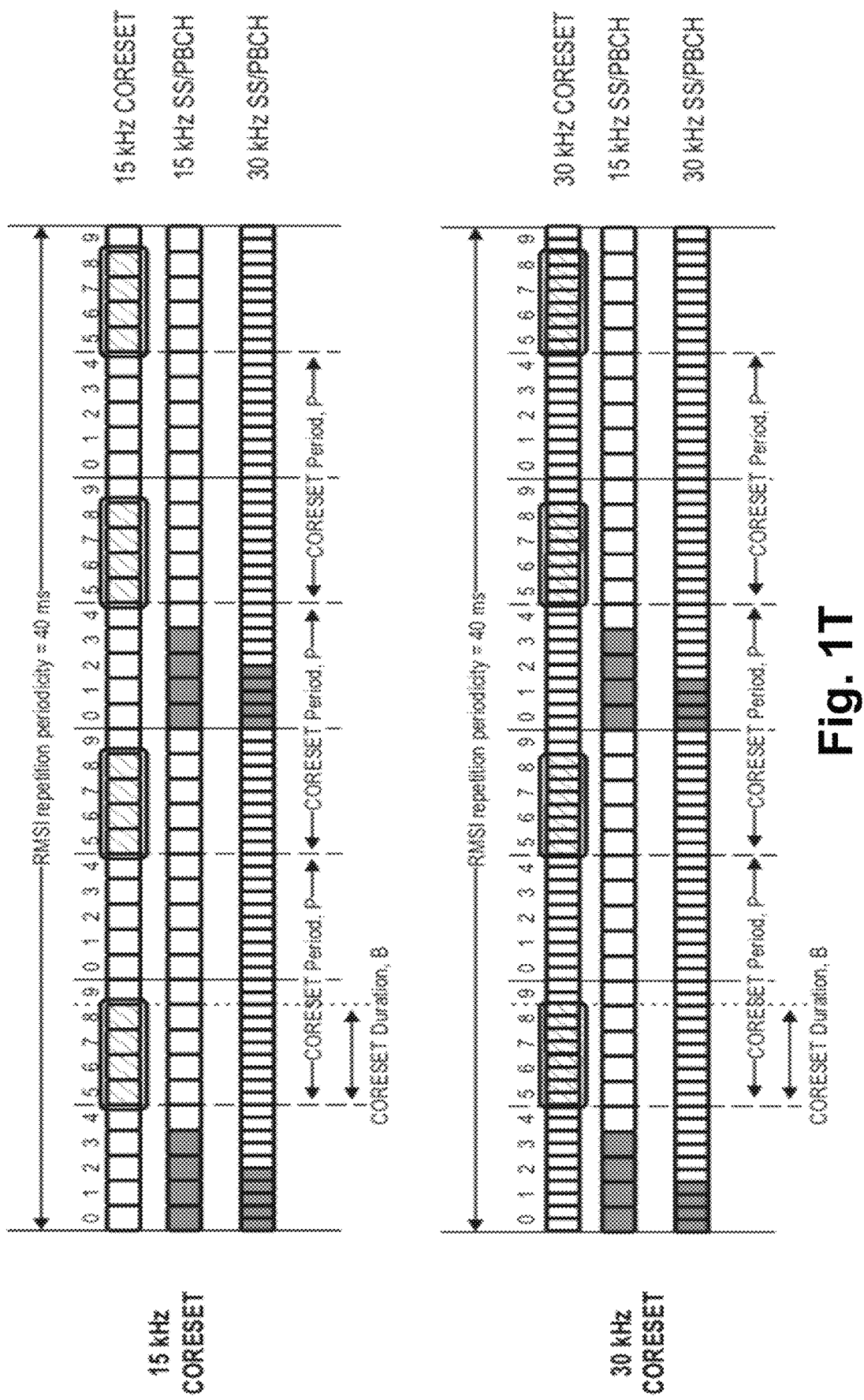

FIGS. 1T and 1U illustrate example position and/or locations of CORESET containing slots in the frequency range 1 (e.g., below 6 GHz) and when SS/PBCH was detected in the first half radio frame, according to some embodiments. FIG. 1U shows CORESET containing slots when 4 consecutive set of slots is used, where CORESET duration "B" is set to 4 slots, and CORESET period "P" is set to 10 ms. FIG. 1T shows CORESET containing slots when slots spanning 4 ms is used, where CORESET duration B is set to 4 msec, and CORESET period P is set to 10 ms. By controlling the parameter P and B, different CORESET periodicity can be supported.

In equation form, example shown in FIG. 1U can be expressed as follows:

$$n_{slot}^{RMSI} = m_0 + \frac{N_{slot}^{frame}}{2}(1 - I_{HF})$$
$$m_0 = 0, 1, \cdots, (B-1)$$

where, $n_{slot}^{RMSI}$ are the slot indices (e.g., within a radio frame) that contain CORESET signaled by PBCH, $N_{slot}^{frame}$ is the number of slots in a radio frame with SCS of RMSI PDCCH/PDSCH, and $I_{HF}$ is the half radio frame index signaled in the PBCH.

Figure 1W:
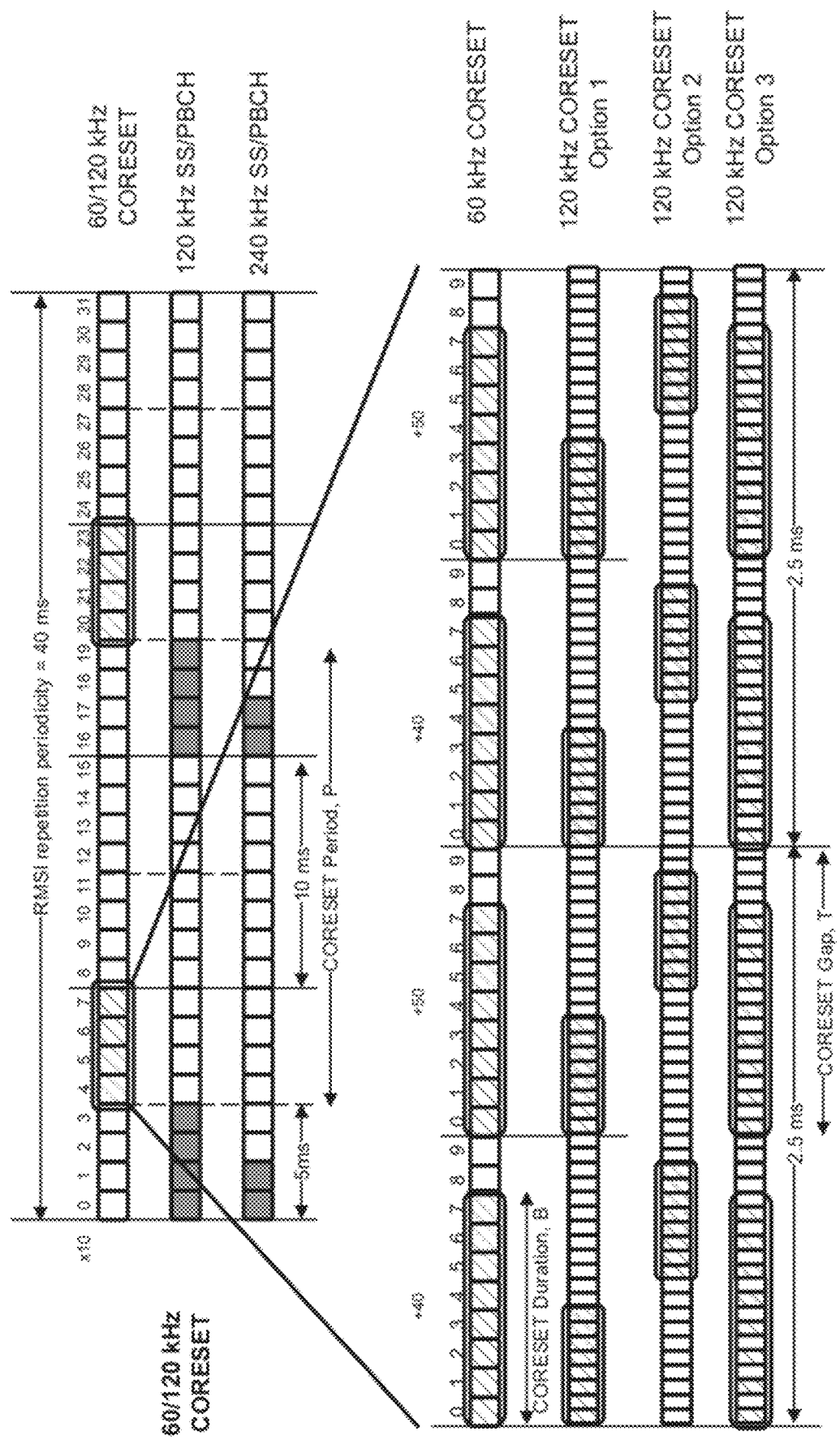

FIGS. 1V and 1W illustrate example position and/or locations of CORESET containing slots in the frequency range 2 (e.g., above 6 GHz) and when SS/PBCH was detected in the first half radio frame, according to some embodiments. FIG. 1V shows CORESET containing slots when two 8 consecutive set of slots is used every 10 ms interval, where CORESET duration B is set to 8 slots, CORESET period P is set to 10 ms, and CORESET gap between two CORESET groups (e.g., forming B consecutive CORESET slots) "T" is set to 2.5 ms. FIG. 1W shows CORESET containing slots when slots spanning 4 ms is used, CORESET duration B is set to 8 slots, CORESET period P is set to 20 ms, and CORESET gap between four CORESET groups (e.g., forming B consecutive CORESET slots) T is set to 2.5 ms. By controlling the parameter P, T, and/or B, different CORESET configurations may be supported.

Association Between CORESET Slots and SS/PBCH

A CORESET slot can be associated with all or a part of the SS/PBCH. If a CORESET slot and a SS/PBCH is associated, UE may assume that there is quasi-co-location (QCL) relationship (e.g., with respect to any (or all) of spatial, average channel gain, Doppler spread, Doppler shift, average channel spread, average channel delay) between SS/PBCH and demodulation reference signal (DMRS) of RMSI PDCCH that can be transmitted in the CORESET. If multiple SS/PBCH is associated with a CORESET, UE can select one of the SS/PBCH for QCL relationship assumption and try to detect and decode the RMSI PDCCH. In an example, it may be beneficial for the UE to select the SS/PBCH block with the strongest signal strength.

Figure 1X:
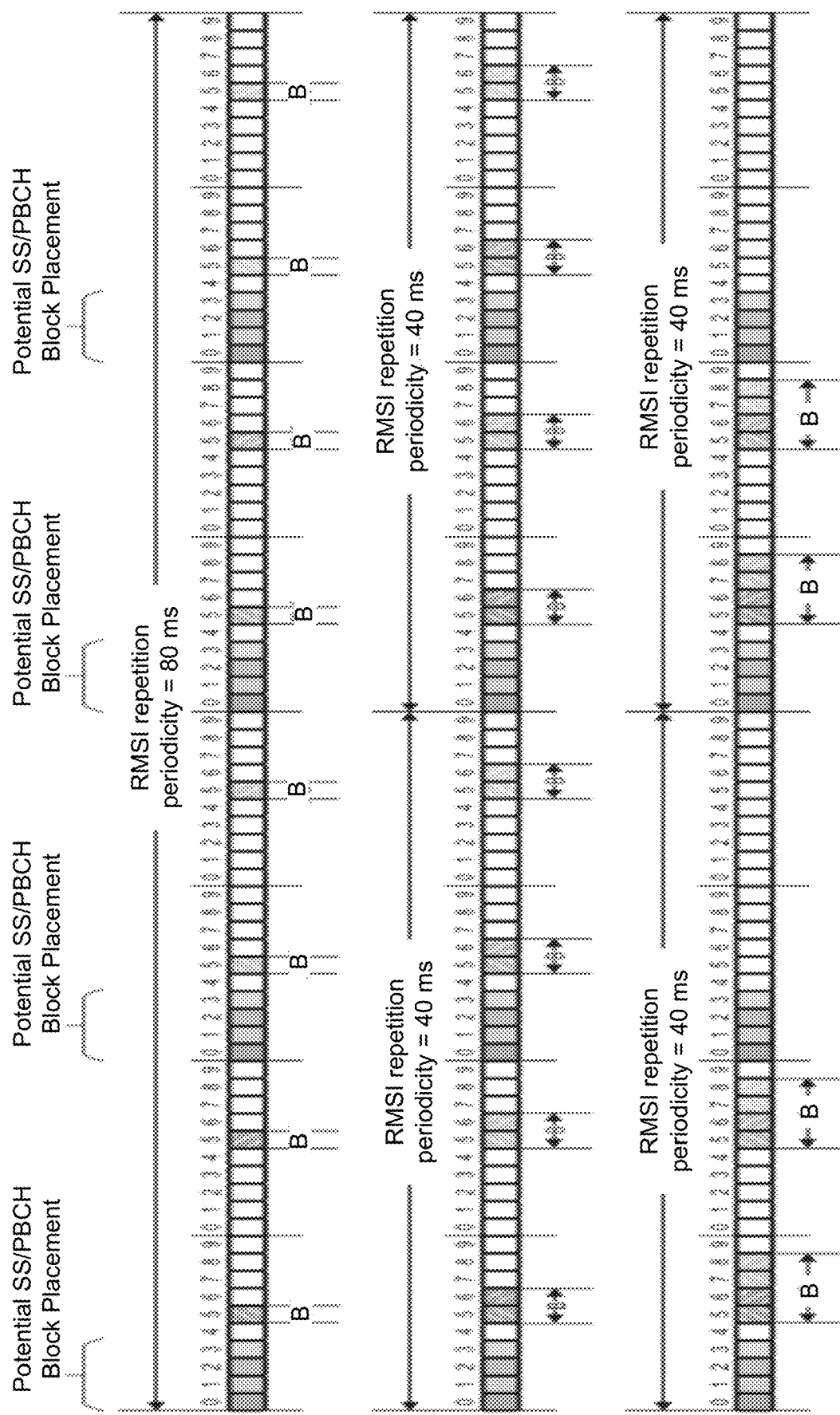
FIG. 1X illustrates examples of 1 to 1 association between SS/PBCH and CORESET slot, according to some embodiments.

In an example, alternatively, a CORESET slot can be associated with a SS/PBCH (e.g., all SS/PBCH blocks with the same SS/PBCH block index). One manner of performing this 1 to 1 mapping is to associate the CORESET slots one by one with increasing SS/PBCH block index. If this 1 to 1 association is to be applied between CORESET slot and SS/PBCH in the example shown in FIG. 1U, this may correspond to the SS/PBCH index in the following equation:

$$n_{slot}^{RMSI} = m_0 + \frac{N_{slot}^{frame}}{2}(1 - I_{HF})$$
$$m_0 = 0, 1, \cdots, (B-1),$$

where, $n_{slot}^{RMSI}$ are the slot indices (e.g., within a radio frame) that contain CORESET signaled by PBCH, $N_{slot}^{frame}$ is the number of slots in a radio frame with SCS of RMSI PDCCH/PDSCH, $I_{HF}$ is the half radio frame index signaled in the PBCH. FIG. 1X illustrates examples of 1 to 1 association between SS/PBCH and CORESET slot, according to some embodiments.

Figure 1Y:
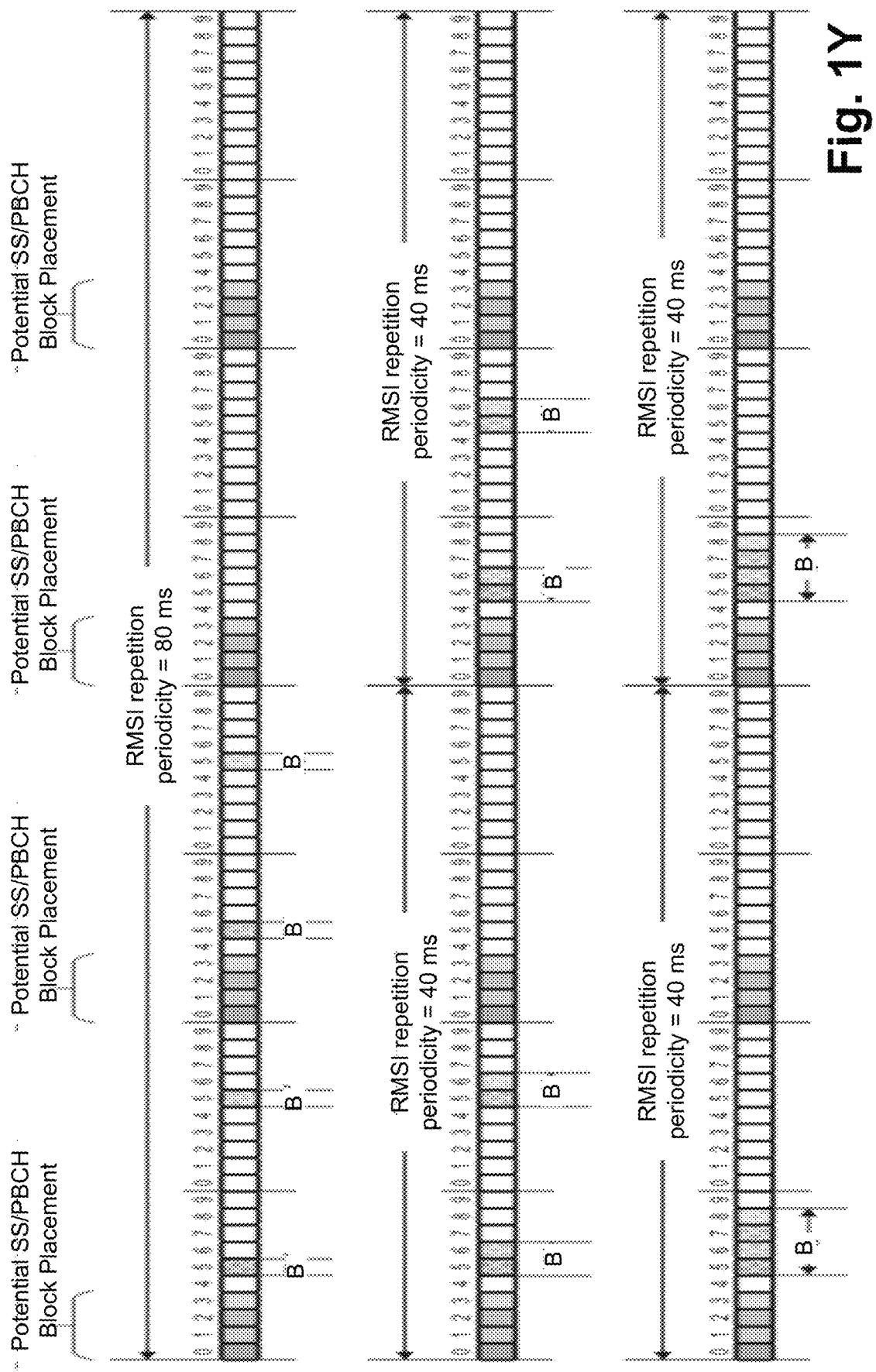
FIG. 1Y illustrates examples of 1 to 2 association between SS/PBCH and CORESET slot, according to some embodiments.

Alternatively, in an example, a CORESET slot can be associated with two SS/PBCH from the same slot. If this was to be applied to 1 to 2 association between CORESET slot and SS/PBCH in the example shown in FIG. 1U, variable $$m_0 = 2 \cdot \left\lfloor \frac{n_{ID}^{SS}}{2} \right\rfloor + \{0, 1\}$$

would correspond to the SS/PBCH index, $n_{ID}^{SS}$, in the following equation:

$$n_{slot}^{RMSI} = m_0 + \frac{N_{slot}^{frame}}{2}(1 - I_{HF})$$
$$m_0 = 0, 1, \ldots, (B-1)$$

where, $n_{slot}^{RMSI}$ are the slot indices (within a radio frame) that contain CORESET signaled by PBCH, $N_{slot}^{frame}$ is the number of slots in a radio frame with SCS of RMSI PDCCH/PDSCH, $I_{HF}$ is the half radio frame index signaled in the PBCH. FIG. 1Y illustrates examples of 1 to 2 association between SS/PBCH and CORESET slot, according to some embodiments.

OFDM Symbols of CORESET within the CORESET Slot

CORESET OFDM Symbol Positions within the CORESET Slot

Figure 1Z:
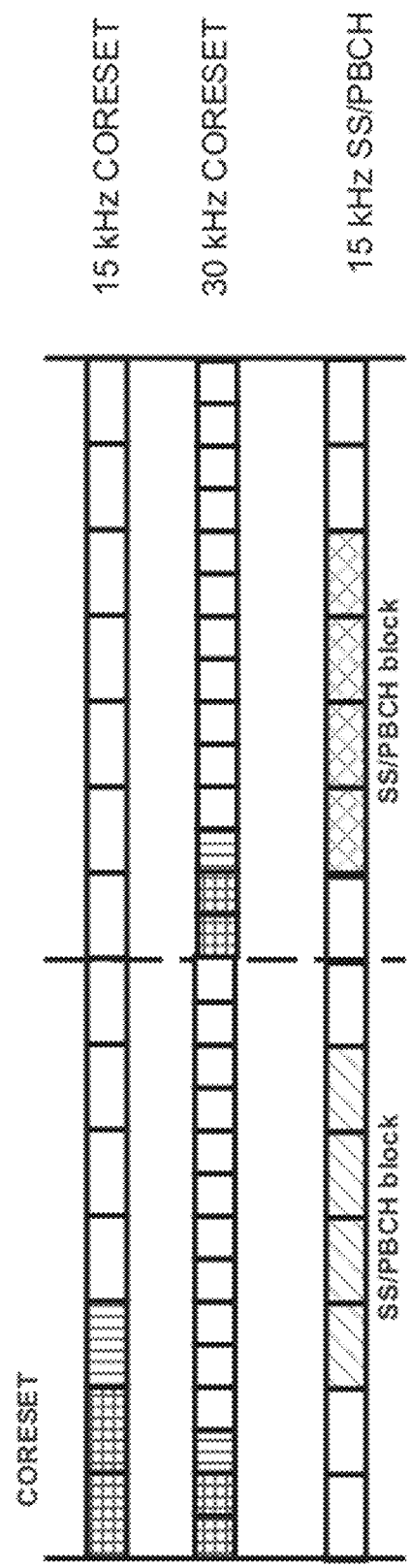
FIG. 1Z illustrate a potential CORESET OFDM symbols when RMSI PDCCH is using SCS of 15 kHz and 30 kHz while the SS/PBCH is using 15 kHz SCS, according to some embodiments.

The following figures provide examples of CORESET OFDM symbol positions within the CORESET slot. For example, FIG. 1Z illustrate a potential CORESET OFDM symbols when RMSI PDCCH is using SCS of 15 kHz and 30 kHz while the SS/PBCH is using 15 kHz SCS, according to some embodiments. A number of CORESET OFDM symbols can potentially vary from 1 to 3 OFDM symbols.

FIG. 1A1 illustrates a potential CORESET OFDM symbols when RMSI PDCCH is using SCS of 15 kHz and 30 kHz while the SS/PBCH is using 30 kHz SCS (for 1st 30 kHz SS/PBCH pattern), according to some embodiments. The number of CORESET OFDM symbols can potentially vary from 1 to 3 OFDM symbols. The two different CORESET OFDM symbol positions for 15 kHz SCS based RMSI PDCCH are shown in the top and bottom of FIG. 1A1, respectively.

FIG. 1B1 illustrates a potential CORESET OFDM symbols when RMSI PDCCH is using SCS of 15 kHz and 30 kHz while the SS/PBCH is using 30 kHz SCS (for 2nd 30 kHz SS/PBCH pattern), according to some embodiments. The number of CORESET OFDM symbols can potentially vary from 1 to 3 OFDM symbols.

FIG. 1C1 illustrates an alternative potential CORESET OFDM symbols when RMSI PDCCH is using SCS of 15 kHz and 30 kHz while the SS/PBCH is using 30 kHz SCS (for 2nd 30 kHz SS/PBCH pattern), according to some embodiments. This example CORESET OFDM symbol position may be utilized when NR signals need to be fully compatible on top of LTE signals. The number of CORESET OFDM symbols can potentially vary from 1 to 2 OFDM symbols.

Option (A): (top section of FIG. 1C1) If CORESET is based on 15 kHz, OFDM symbol number 5 or 12 may be utilized by the CORESET, while the RMSI PDSCH can be transmitted in OFDM symbol number 6 or 13, respectively. If CORESET is based on 30 kHz, OFDM symbol number 10 and 11 may be utilized by the CORESET, while the RMSI PDSCH can be transmitted in OFDM symbol 12 and 13.

Option (B): (bottom section of FIG. 1C1) If CORESET is based on 15 kHz, OFDM symbol 5 and/or 6 may be utilized by the CORESET, while the RMSI PDSCH can be transmitted in OFDM symbol 12 and 13, respectively. If CORESET is based on 30 kHz, OFDM symbol 10 to 13 of the first slot can be utilized by the CORESET, while the RMSI PDSCH can be transmitted in OFDM symbol 10 to 13 of the second slot.

FIG. 1D1 illustrates potential CORESET OFDM symbols when RMSI PDCCH is using SCS of 60 kHz while the SS/PBCH is using 120 kHz or 240 kHz SCS, according to some embodiments. The number of CORESET OFDM symbols can potentially vary from 1 to 3 OFDM symbols. The CORESET may occupy OFDM symbols 0 to 2. In case CORESET occupies 3 OFDM symbols, some of the SS/PBCH may not be utilized by the network with 5 ms SS/PBCH periodicity.

FIG. 1E1 illustrates potential CORESET OFDM symbols when RMSI PDCCH is using SCS of 120 kHz while the SS/PBCH is using 120 kHz or 240 kHz SCS, according to some embodiments. The number of CORESET OFDM symbols may potentially vary from 1 to 3 OFDM symbols. The CORESET can occupy OFDM symbols 0 to 2 of the first slot of every pair of slots.

FIG. 1F1 illustrates alternative potential CORESET OFDM symbols when RMSI PDCCH is using SCS of 120 kHz while the SS/PBCH is using 120 kHz or 240 kHz SCS, according to some embodiments. The number of CORESET OFDM symbols can potentially vary from 1 to 2 OFDM symbols. The CORESET can occupy OFDM symbols 0 to 1.

Distributed Mapping Scheme for Uplink Control Information

Mobile communication has evolved significantly from early voice systems to today's highly sophisticated integrated communication platform. The next generation wireless communication system, 5G, or new radio (NR), will provide access to information and sharing of data anywhere, anytime by various users and applications. NR is expected to be a unified network/system that target to meet vastly different and sometimes conflicting performance dimensions and services. Such diverse multi-dimensional requirements are driven by different services and applications. In general, NR is evolving based on 3GPP LTE-Advanced with additional potential new Radio Access Technologies (RATs) to enrich people's lives with better, simple and seamless wireless connectivity solutions. NR may enable ubiquitous connected by wireless and deliver fast, rich contents and services.

For NR, uplink control information (UCI) may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI), rank indicator (RI), beam related information (e.g., L1-RSRP (layer 1-reference signal received power)), and/or the like.

As agreed in NR, for HARQ-ACK and CSI report piggybacked on physical uplink shared channel (PUSCH), HARQ-ACK and CSI report are mapped to distributed resource elements (RE) across PUSCH allocated resource blocks (RB). Further, in a case when frequency hopping is disabled for PUSCH, CSI piggybacked on PUSCH follows frequency first mapping rule. In addition, it has been agreed that for CSI piggybacked on PUSCH, splitting CSI mapping (at least for some CSI) into two parts is supported for NR, where the two parts are mapped differently.

As mentioned above, both HARQ-ACK feedback and CSI reports are mapped in a distributed manner when piggybacking on PUSCH. In this case, certain distributed mapping rule has to be defined, e.g., to ensure alignment between gNB and UE side on the resource allocated for HARQ-ACK and CSI report.

Various embodiments of this disclosure discuss distributed mapping schemes for uplink control information (UCI) on physical uplink shared channel (PUSCH). For example, various embodiments of this disclosure propose: (i) Distributed mapping scheme for UCI on PUSCH in time domain, and/or (ii) Distributed mapping scheme for UCI on PUSCH in frequency domain.

Distributed Mapping Scheme for UCI on PUSCH in Time Domain

As discussed herein above, in NR, for HARQ-ACK feedback and CSI report piggybacked on PUSCH, HARQ-ACK feedback and CSI report are mapped to distributed REs across PUSCH allocated RBs. In this case, specific distributed mapping rules in time and/or frequency domains has to be defined, e.g., to ensure alignment between gNB and UE side on the resource allocated for HARQ-ACK and CSI report.

In some embodiments, either CP-OFDM (Cyclic prefix-Orthogonal Frequency Division Multiplexing) or DFT-s-OFDM (Discrete Fourier Transform-spread-OFDM) waveform may be assumed for PUSCH. In an example, in case of DFT-s-OFDM waveform, the subcarriers in frequency domain may be logical ones and may correspond to the inputs of DFT precoder, which is employed before mapping to IDFT. The mapping schemes provided henceforth may be applied regardless of the waveform employed for PUSCH. Also, for purposes of this disclosure, CSI report may be interchangeably used with CSI report and/or beam related information report.

Embodiments of distributed mapping scheme for UCI on PUSCH in time domain may be provided as follows:

In some embodiments, for PUSCH transmission, first De-Modulation Reference Signal (DM-RS) symbol may be located in the first symbol of PUSCH transmission, or third or fourth symbol in a slot, e.g., in order to align with DM-RS symbol for PDSCH. For CSI mapping, at least the first CSI part may be mapped, e.g., starting from the first symbol of PUSCH transmission. Thus, in case when a first DM-RS is located in the third or fourth symbol in a slot, the first CSI part is mapped starting from the first symbol of PUSCH, which indicates that the first CSI part may be transmitted before the first DM-RS symbol. When PT-RS (Phase Tracking Reference Signal) is present, the first CSI part and/or second CSI part may be mapped to the symbol where PT-RS is transmitted. Different PT-RS density may be applied to the PUSCH slot with CSI, and to PUSCH slot without CSI, which can be pre-defined. For example, two independent PT-RS density table, or higher layer signaling, e.g. independent MCS and allocated bandwidth threshold may be used to determine the PT-RS pattern, or DCI, e.g. MCS and/or allocated bandwidth offset.

Figure 2A:
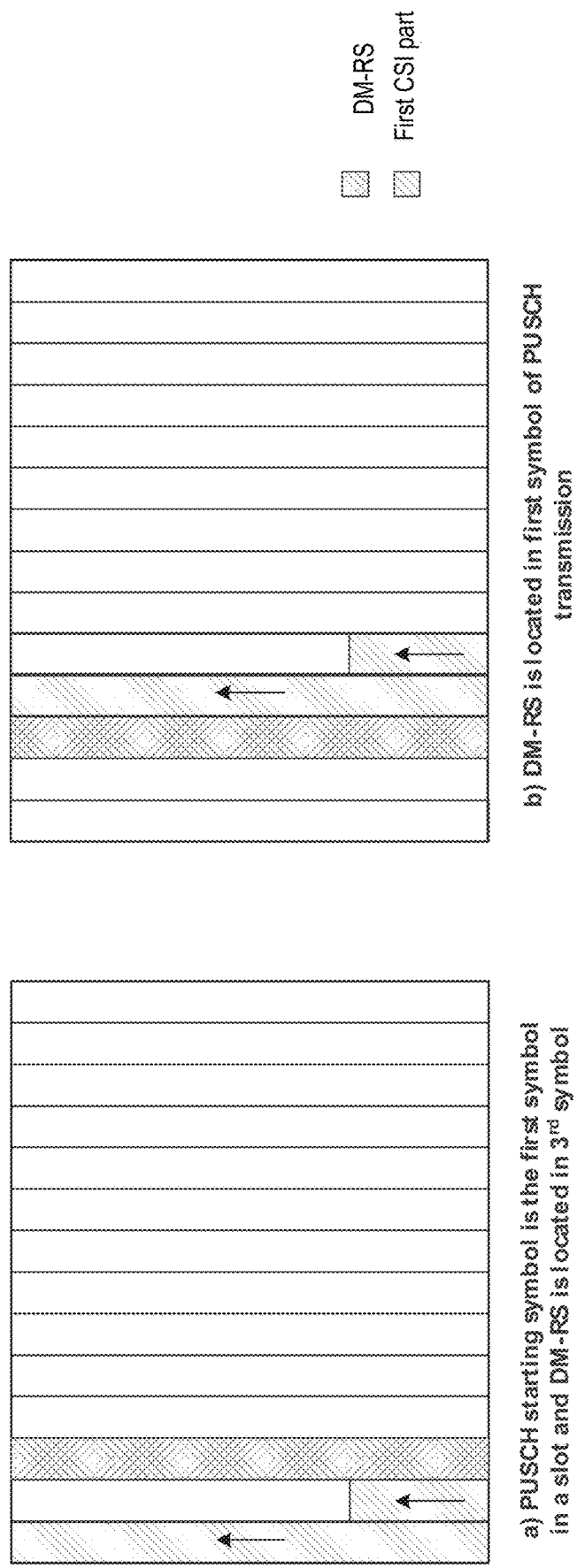
FIG. 2A illustrates examples of starting symbol for the first channel state information (CSI) part, according to some embodiments.

FIG. 2A illustrates examples of starting symbol for the first CSI part, according to some embodiments. In the examples, the starting symbol for the first CSI part is the first symbol for PUSCH.

In some embodiments, in case when HARQ-ACK feedback is mapped in a frequency first manner, HARQ-ACK feedback may be located in the symbol before and/or after the DM-RS symbol(s), e.g., depending on the starting and/or end position of PUSCH and DM-RS position. If additional DM-RS symbol(s) are configured for PUSCH transmission, HARQ-ACK feedback may be mapped in the symbol before and/or after the additional DM-RS symbol(s).

In an example, the same design principle may be applied in case when frequency hopping is applied for the transmission of PUSCH. For example, HARQ-ACK may be mapped before and/or after the DM-RS symbols in each frequency hop.

FIG. 2B illustrates examples of HARQ-ACK feedback on PUSCH with different starting and/or end symbol of PUSCH (e.g., in time domain), according to some embodiments. In the examples of FIG. 2B, in case when PUSCH starting symbol is located before the first DM-RS symbol and/or the PUSCH end symbol is located after the additional DM-RS symbols, HARQ-ACK feedback is mapped around the DM-RS, e.g., as illustrated in FIG. 2B. In case when PUSCH starting symbol is located after the first DM-RS symbol, HARQ-ACK feedback is mapped after the first DM-RS, e.g., as illustrated in FIG. 2B. Further, in case when PUSCH end symbol is located before the additional DM-RS symbol, HARQ-ACK feedback is mapped before the additional DM-RS symbols.

FIG. 2C illustrates an example of HARQ-ACK feedback on PUSCH with frequency hopping in time domain, according to some embodiments. In the example of FIG. 2C, front-loaded DM-RS is inserted before PUSCH transmission in each frequency hop. In this case, HARQ-ACK feedback is mapped after the DM-RS in each hop, so as to allow better channel estimation performance.

In an example, as shown in the figures, two trunks of resources may be allocated for HARQ-ACK feedback on PUSCH in frequency domain—the design principles for time domain mapping may be straightforwardly extended to the design when different distributed mapping is employed for HARQ-ACK feedback in frequency.

When PT-RS is present, the HARQ-ACK may be mapped in the symbol including PT-RS. Further, the HARQ-ACK may be mapped around the PT-RS.

If one PT-RS antenna port is enabled, the HARQ-ACK and/or CSI report may be mapped to the port which is QCLed with the PT-RS antenna port. If more than one PT-RS antenna port is enabled, the HARQ-ACK and/or CSI report may be mapped to the antenna port that is QCLed with a particular PT-RS antenna port (e.g., which may be predefined or configured by higher layer signaling or DCI).

Distributed Mapping Scheme for UCI on PUSCH in Frequency Domain

In some embodiments, distributed mapping scheme for UCI on PUSCH in frequency domain may be provided as follows:

In some embodiments, HARQ-ACK feedback, first and second CSI part and/or UL data may be interleaved in the frequency domain. For example, HARQ-ACK feedback, first and second CSI part and/or UL data may be located in the resource elements (RE) with different comb offsets. The comb distance (e.g., between two REs for the same type of UCI or data) and/or comb offset for HARQ-ACK feedback, first and second CSI part and/or UL data may be predefined in the specification or configured by higher layers. Configuration by higher layers may include configuration via NR minimum system information (MSI), NR remaining minimum system information (RMSI), NR other system information (OSI), radio resource control (RRC) signaling, and/or the like.

Alternatively (or additionally), comb distance may be determined in accordance with the number of physical resource blocks (PRB) allocated for PUSCH transmission and/or the amount of REs allocated for UCI.

In some embodiments, different comb distance may be used for the transmission of HARQ-ACK feedback, CSI report and/or data. After UCI mapping is finished, UL data is mapped into all the remaining resource. In addition, when HARQ-ACK is multiplexed in the PUSCH, HARQ-ACK may be only mapped in the comb offset where UL data is mapped, e.g., regardless of whether puncturing or rate-matching is employed for HARQ-ACK feedback. In an example, in case when phase tracking reference signal (PT-RS) is present, HARQ-ACK and CSI report are not mapped on the REs where PT-RS is located.

In some embodiments, in one option, the first CSI part and UL data and/or second CSI part are interleaved in frequency domain with same comb distance, but with different comb offsets.

FIG. 2D illustrates an example of interleaved mapping for the first CSI part and data on PUSCH, according to some embodiments. In FIG. 2D, the first CSI part and UL data are interleaved in the frequency with equal comb distance. Further, they are mapped in every other or other two REs.

In some embodiments, HARQ-ACK feedback may be mapped in a time first manner, such that it spans as many symbols as possible (e.g., excluding DM-RS symbols). In such a scenario, a starting subcarrier or PRB used for the transmission of HARQ-ACK feedback can be predefined in the specification, configured by higher layers, and/or determined in accordance with the number of PRBs allocated for PUSCH.

For example, in one option, in a case when K trunks are used for HARQ-ACK feedback, the K trunks may be evenly distributed within the allocated resource. An amount of REs allocated for HARQ-ACK may be determined in accordance with HARQ-ACK payload size and/or beta-offset. In a case when K trunks are used for HARQ-ACK feedback, the amount of REs may be evenly distributed in K trunks.

In particular, the starting subcarrier in frequency domain for each trunk may be given by:

$$\left\lfloor \frac{i \cdot N_{RB} \cdot N_{SC}^{RB}}{K+1} \right\rfloor \text{ or } \left\lceil \frac{i \cdot N_{RB} \cdot N_{SC}^{RB}}{K+1} \right\rceil,$$

where $N_{RB}$ is the number of RBs allocated for PUSCH, $N_{SC}^{RB}=12$ is the number of REs in one RB, $i=1, \ldots, K$. In an example, K may be predefined in the specification, e.g., K=2 or configured by higher layer via MSI, RMSI, OSI and/or RRC signaling. In another example, the starting subcarrier in frequency domain for each trunk can be:

$$\left\lfloor \frac{i \cdot N_{RB} \cdot N_{SC}^{RB}}{K} \right\rfloor \text{ or } \left\lceil \frac{i \cdot N_{RB} \cdot N_{SC}^{RB}}{K} \right\rceil.$$

In an example, in case of frequency hopping, same starting subcarrier for each trunk can be applied for HARQ-ACK on PUSCH in each frequency hop.

In an example, when PT-RS is present in the allocated PUSCH resource, the starting subcarrier in frequency domain for each trunk can be:

$$\left\lfloor \frac{i \cdot (N_{RB} \cdot N_{SC}^{RB} - K_{PTRS})}{K+1} \right\rfloor \text{ or } \left\lceil \frac{i \cdot (N_{RB} \cdot N_{SC}^{RB} - K_{PTRS})}{K+1} \right\rceil,$$

where $K_{PTRS}$ is the number of subcarriers within allocated PUSCH resource.

Figure 2E:
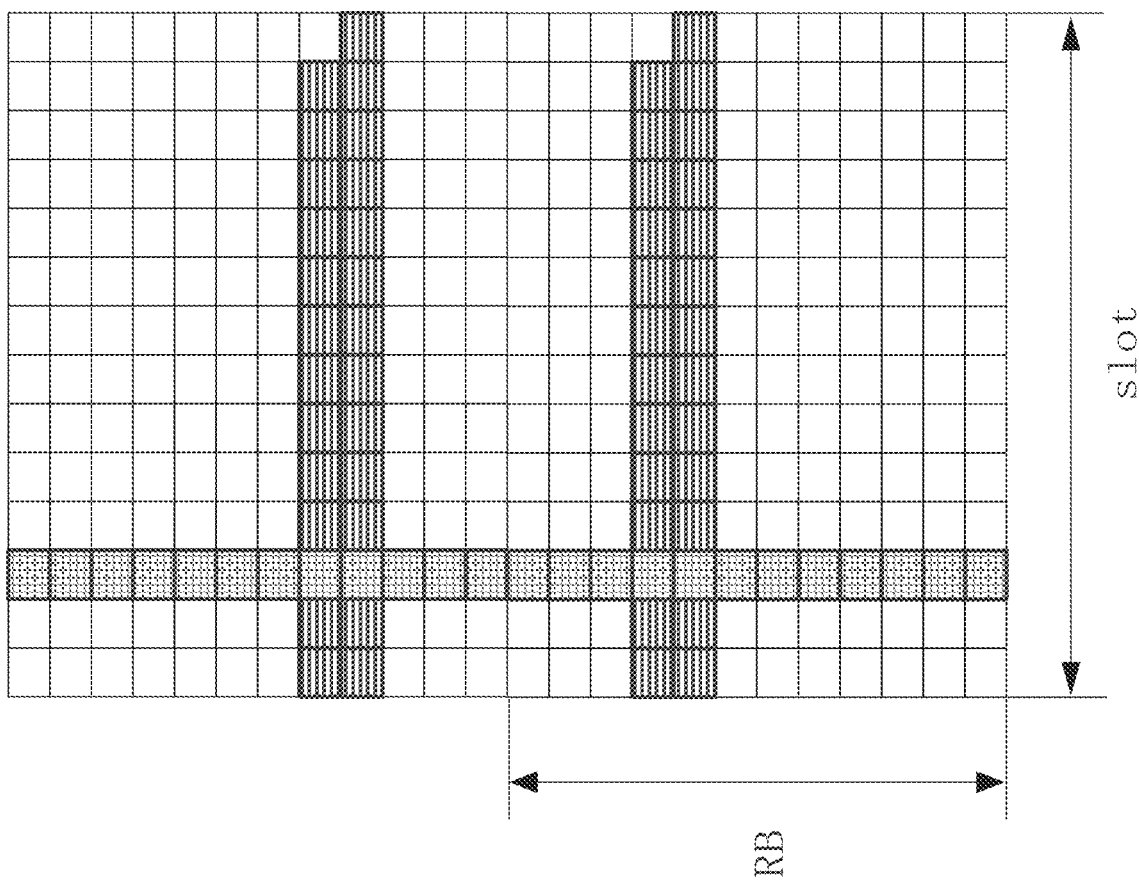
FIG. 2E illustrates an example of time first mapping for HARQ-ACK feedback on PUSCH, according to some embodiments.

FIG. 2E illustrates an example of time first mapping for HARQ-ACK feedback on PUSCH, according to some embodiments. In the example of FIG. 2E, 2 RBs are allocated for PUSCH. Further, based on the HARQ-ACK payload size and beta-offset, the amount of REs allocated for HARQ-ACK is 50, which are evenly distributed within 2 trunks, where each trunk has 25 REs for HARQ-ACK feedback. Furthermore, the starting subcarrier for each trunk is subcarrier #8 and #16, as shown in FIG. 2E. In each trunk, HARQ-ACK is mapped in a time first and frequency second manner, such that HARQ-ACK is first among all symbols (e.g., excluding the DM-RS symbols) and then mapped to the next subcarrier. The last subcarrier and RE (e.g., where the HARQ-ACK is mapped in the corresponding trunk) is determined by the amount of the HARQ-ACK bits.

As a further extension, in case when each trunk includes one RE in frequency domain, a number of trunks may be determined by:

$$K = \left\lceil \frac{N_{RE}^{HARQ}}{N_{sym}^{HARQ}} \right\rceil,$$

where $N_{RE}^{HARQ}$ is the total number of REs for HARQ-ACK transmission, which depends on the HARQ-ACK feedback payload size and beta_offset value; and $N_{sym}^{HARQ}$ is the number of symbols allocated for HARQ-ACK feedback. For time first mapping scheme, the number of symbols allocated for HARQ-ACK feedback is equal to (a number of symbols allocated for PUSCH—a number of symbols allocated for DM-RS). Based on this equation, the first (K−1) trunks includes one RE in frequency domain and spans all the available symbols for HARQ-ACK. For a $K^{th}$ trunk, the number of REs in time domain for HARQ-ACK is $N_{RE}^{HARQ}-(K-1) N_{sym}^{HARQ}$.

For this option, the subcarrier may be calculated similar to aforementioned above. In one example, the subcarrier for each trunk can be given by $$\left\lfloor \frac{i \cdot N_{RB} \cdot N_{SC}^{RB}}{K+1} \right\rfloor \text{ or } \left\lfloor \frac{i \cdot N_{RB} \cdot N_{SC}^{RB}}{K} \right\rfloor.$$

With regard to the number of REs for each trunk, in one option, for the first (K−1) trunk, the number of REs allocated for HARQ-ACK can be determined by $$\left\lceil \frac{N_{RE}^{HARQ}}{K} \right\rceil,$$

where $N_{RE}^{HARQ}$ is the total number of REs for HARQ-ACK transmission, which depends on the HARQ-ACK feedback payload size and beta_offset value. For the $k^{th}$ trunk, a number of REs can be $$\left( N_{RE}^{HARQ} - K \cdot \left\lceil \frac{N_{RE}^{HARQ}}{K} \right\rceil \right).$$

Yet in another option, for a first $K_0$ trunk, where $K_0 = (N_{RE}^{HARQ} \bmod K)$, the number of REs allocated for HARQ-ACK can be determined by $$\left\lceil \frac{N_{RE}^{HARQ}}{K} \right\rceil.$$

For a remaining $K_1$ trunk (where $K_1 = K - K_0 = K - (N_{RE}^{HARQ} \bmod K)$), the number of REs can be $$\left\lfloor \frac{N_{RE}^{HARQ}}{K} \right\rfloor.$$

FIG. 2F illustrates an example of time first mapping for HARQ-ACK on PUSCH with evenly distributed pattern, according to some embodiments. In the example of FIG. 2F, a number of REs allocated for HARQ-ACK is 50. A number of PUSCH and DM-RS symbols is 14 and 2, respectively. Based on the equation, the number of trunks can be calculated as 5 and the subcarrier for each trunk is every $4^{th}$ subcarrier. Further, for the first 4 trunks, HARQ-ACK feedback spans all available symbols (e.g., 12 symbols) and in the $5^{th}$ trunk, HARQ-ACK feedback merely spans 2 symbols in time.

In some embodiments, in a case when HARQ-ACK is mapped in a frequency first manner, HARQ-ACK may be evenly distributed in the allocated symbols. The gap between two HARQ-ACK feedback can be predefined in the specification or configured by higher layers via MSI, RMSI, OSI, and/or RRC signaling, or may derived based on the number of symbols for HARQ-ACK feedback and the amount of REs allocated for HARQ-ACK feedback.

In an option, the gap between two HARQ-ACK REs may be calculated as:

$$N_{gap} = \left\lfloor \frac{N_{RB} \cdot N_{SC}^{RB} \cdot N_{sym}^{HARQ}}{N_{RE}^{HARQ}} \right\rfloor,$$

where $N_{RE}^{HARQ}$ is the total number of REs allocated for HARQ-ACK feedback, which can be determined based on the HARQ-ACK payload size and beta-offset. $N_{sym}^{HARQ}$ is the number of symbols allocated for HARQ-ACK feedback.

With regard to the number of REs in each allocated symbol for HARQ-ACK feedback, in one option, in the first $(N_{sym}^{HARQ}-1)$ symbols, the number of REs for HARQ-ACK feedback may be $$\left\lceil \frac{N_{RE}^{HARQ}}{N_{sym}^{HARQ}} \right\rceil.$$

In the last symbol allocated for HARQ-ACK feedback, the number of REs is $$N_{RE}^{HARQ} - N_{sym}^{HARQ} \cdot \left\lceil \frac{N_{RE}^{HARQ}}{N_{sym}^{HARQ}} \right\rceil.$$

In another option, in the first($N_{RE}^{HARQ}$ mod $N_{sym}^{HARQ}$) symbols, the number of REs allocated for HARQ-ACK feedback is $$\left\lceil \frac{N_{RE}^{HARQ}}{N_{sym}^{HARQ}} \right\rceil.$$

In the remaining $N_{sym}^{HARQ}-(N_{RE}^{HARQ}$ mod $N_{sym}^{HARQ})$ symbols, the number of REs allocated for HARQ-ACK feedback is $$\left\lceil \frac{N_{RE}^{HARQ}}{N_{sym}^{HARQ}} \right\rceil.$$

In an example, the CSI report may not be mapped on the REs where HARQ-ACK feedback and/or PT-RS is allocated. Further, similar to the time first mapping, when calculating the gap for HARQ-ACK feedbacks, the number of PT-RS REs may be excluded in the equation for the number of available REs in frequency domain.

Figure 2G:
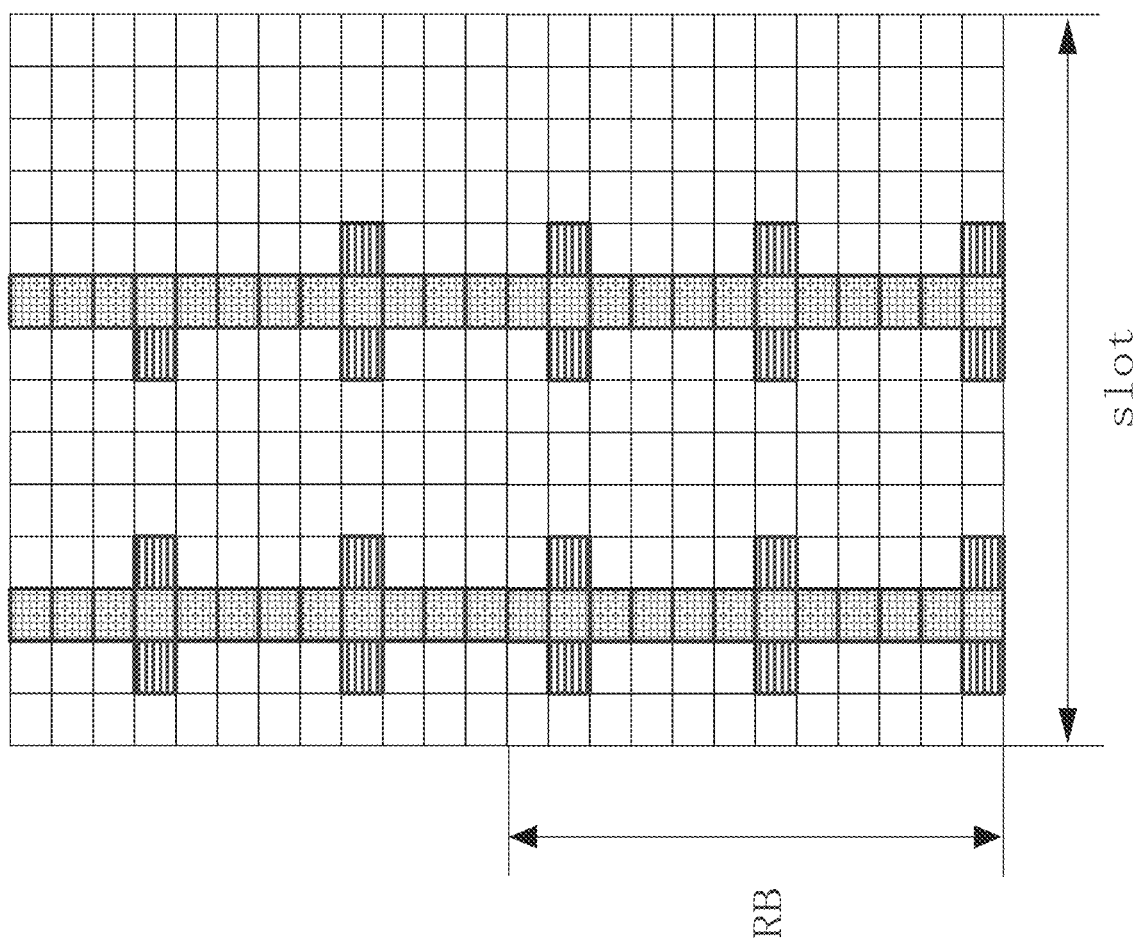
FIG. 2G illustrates an example of frequency first mapping for HARQ-ACK feedbacks on PUSCH, according to some embodiments.

FIG. 2G illustrates an example of frequency first mapping for HARQ-ACK feedbacks on PUSCH, according to some embodiments. In the example of FIG. 2G, totally 19 REs and 4 symbols are allocated for HARQ-ACK. Further, 2 RBs are allocated for PUSCH transmission. According to the equation, the gap between two HARQ-ACK REs can be derived as 4 REs. Furthermore, in the first 3 symbols allocated for HARQ-ACK feedback, a number of REs is 5; while in the last symbol allocated for HARQ-ACK feedback, the number of REs is 4.

In an example, although aforementioned discussion defines starting subcarrier and gap for HARQ-ACK feedback on PUSCH (e.g., which is mainly targeted for CP-OFDM based waveform), same design principle may be straightforwardly extended to the case when DFT-s-OFDM based waveform is used for PUSCH transmission. In this case, a starting subcarrier and gap may be replaced by the starting position and gap in time domain before DFT operation.

In some embodiments, in case of non-slot based PUSCH transmission, e.g., when PUSCH spans 1, 2, 4 or 7 symbols, UCI may be mapped on the REs which are not allocated for DM-RS transmission. The above discussion for the mapping scheme of HARQ-ACK feedback and CSI report on PUSCH in frequency domain can be straightforwardly extended. For example, the DM-RS REs may be excluded when mapping the HARQ-ACK and CSI report or calculating the starting REs on one or more trunks for HARQ-ACK and CSI report on PUSCH.

Mechanisms on Configuring Random Access Channel Format

In some embodiments, the UE can receive system information including system information block (SIB). The SIB can include system and configuration information such as physical random access channel (PRACH) configuration index. The PRACH configuration index can be used for configuring the PRACH format for transmission of a PRACH short sequence length preamble. Various PRACH formats are possible. In response to the PRACH preamble, the gNB can transmit a random access response (RAR) message with a random access radio network temporary identifier (RA-RNTI).

FIG. 3 illustrates an example configuration of PRACH configuration, according to some embodiments. For example, in this example, 8 beams are assumed, e.g., during initial beam selection procedure. Eight PRACH resources are identified as 1, . . . , 8 within a single PRACH period. Each PRACH resource is associated with a corresponding beam (and a corresponding SSB). Thus, in this example, a PRACH occasion is mapped to a corresponding SSB. Although not illustrated in FIG. 3, in an example, one SSB can be mapped to multiple PRACH occasions. Thus, put differently, in an example, one SSB can be mapped to one or more PRACH occasions.

One PRACH occasion can include multiple PRACH resources (e.g., multiple PRACH preambles, e.g., up to 64 preambles for example). In some embodiments, a number of PRACH preamble within a PROCH occasion can be configured. Thus, if one SSB is mapped to one PRACH occasion, then the SSB can correspond to one of 64 PRACH preambles within the PRACH occasion.

In another example, if one SSB is mapped to two PRACH occasions, then one of the two PRACH occasions can be selected (e.g., selected randomly) and one of the PRACH preambles within the selected PRACH occasion may be selected for the SSB. Thus, in this example, the SSB can correspond to one of 128 PRACH preambles within the two PRACH occasions.

In an example, more than 1 SSB may be mapped to 1 PRACH occasion. For example, if two SSBs are mapped to 1 PRACH occasion (e.g., which has 64 preambles), then a first SSB can be mapped to any one of 32 preambles, and a second SSB can be mapped to any one of 32 remaining preambles.

In some embodiments, a number of RACH preambles can be configured. The total number of RACH preambles for a RACH occasion can be fixed in the specification and/or configured by the system. Once a total number of RACH preambles for a RACH occasion is determined, this may be used for the contention based RACH (CBRA) and/or the contention free RACH (CFRA). To distinguish the preamble sets between CBRA and CFRA (e.g., for avoiding any conflict), the number of RACH preamble for CBRA may be configured additionally and separately. In this case, the number of RACH preambles for CBRA is used for CBRA and remaining preambles inside the total number of RACH procedure can be used for CFRA.

In some embodiments, if multi-beam is used for the system, multiple synchronization signal block (SSB) can be used for covering multiple beams, and there can be association between multiple SS blocks and RACH resources. Therefore, a total number of preambles for CBRA and CFRA may be configured or determined for each SSB.

For example, if a total number of RACH preambles for a RACH occasion is 64, then a total number of RACH preambles for an SSB can be 64. In this case, one RACH occasion is associated with one SSB. Then the number of RACH preambles for CBRA per RACH occasion can be same as the number of RACH preambles for CBRA per SSB.

In another example, a total number of RACH preambles for a RACH occasion may be 64, and the total number of RACH preambles for an SSB may be 32. In this case, one RACH occasion is associated with two SSB, and half of total preambles inside one RACH occasion is associated with one SSB. In this case the number of RACH preambles for CBRA per SSB has to be separately configured.

In an example, therefore, a number of RACH preambles for CBRA per SSB has to be configured, e.g., depending on the association between the SSB and RACH resource. Since the number of RACH preambles for CBRA per SSB has to be smaller or at least the same as the number of RACH preambles for CBRA and CFRA per SSB, the different candidates for the number of RACH preambles for CBRA per SSB may be defined, e.g., depending on the number of RACH preambles for CBRA and CFRA per SSB. Table 9 is the possible option for the configuration sets for such parameters. For example, Table 9 depicts example range of values of RACH preambles.

TABLE 9

| Parameter | Value | Explanation for current suggestion |
|---|---|---|
| Number of PRACH preambles for CBRA and CFRA per SSB | {4, 8, 16, 32, 64, 128, 256} | How to configure the value needs to be studied: either explicit signaling via RMSI or implicit signaling |
| Number of PRACH preambles for CBRA per SSB | {1, 2, 3, 4} if #_PRACH_SSB = 4 {2, 4, 6, 8} if #_PRACH_SSB = 8 {4, 8, 12, 16} if #_PRACH_SSB = 16 {4, 8, 12, 16, 20, 24, 28, 32} if #_PRACH_SSB = 32 {4, 8, 12, 16, 20, 24, 28, 32, 36, 40, 44, 48, 52, 56, 60, 64} if #_PRACH_SSB >= 64 | This needs to be signaled via RMSI. #_PRACH_SSB is the parameter of the number of PRACH preambles for CBRA and CFRA per SSB defined above. #_PRACH_SSB >= 64 means that more than one RACH occasions are associated to a single SSB. In this case, same PRACH preamble number is used for each RACH occasion. |
| Number of PRACH preambles for CBRA and CFRA per RACH occasion | 64 | Fixed in the specification. Confirm the WA that RAPID is 6 bit long |
| Number of PRACH preambles for CBRA per RACH occasion | {4, 8, 12, 16, 20, 24, 28, 32, 36, 40, 44, 48, 52, 56, 60, 64} | Same as LTE. It may not need to be signaled if the number of PRACH preambles for CBRA per SSB is signaled. |

Thus, for example, referring to the third row of Table 9, the configuration setting indicates a number of PRACH preambles for CBRA per SSB. For example, if the PRACH occasion has 64 preambles, then this indicator indicates a number of preambles that are for contention based RACH (CBRACH) per SSB.

The number of PRACH preambles for CBRA per SSB is based on the indicator _PRACH_SSB, as indicated in the third row of the above table. Note that the indicator _PRACH_SSB is indicative of a number of PRACH preambles for CBRA and CFRA per SSB, e.g., indicative of PRACH preambles (e.g., either contention based, or contention free) per SSB. Also, a PRACH occasion has a given specific number of PRACH preambles (e.g., where the specific number may be upper bounded by 64). Thus, if the indicator _PRACH_SSB (e.g., which is indicative of the number of PRACH preambles per SSB) is known, it is possible to know a number of SSB per PRACH occasion.

For example, assume there are 64 PRACH preambles in a PRACH occasion, and assume, merely as an example, there are two SSBs per PRACH occasion. Then there are 32 PRACH preambles per SSB. Thus, if the indicator _PRACH_SSB has a value of 32, then this value maps to 2 SSBs per PRACH occasion (e.g., assuming that the PRACH occasion has 64 preambles).

In another example, assume there are 64 PRACH preambles in a PRACH occasion, and assume, merely as an example, there is SSB per PRACH occasion. Then there are 64 PRACH preambles per SSB. Thus, if the indicator _PRACH_SSB has a value of 64, then this value maps to 1 SSB per PRACH occasion (e.g., assuming that the PRACH occasion has 64 preambles).

Hence, as seen in the above two examples, the indicator _PRACH_SSB is also indicative of a number of SSBs per PRACH occasion.

Figure 4:
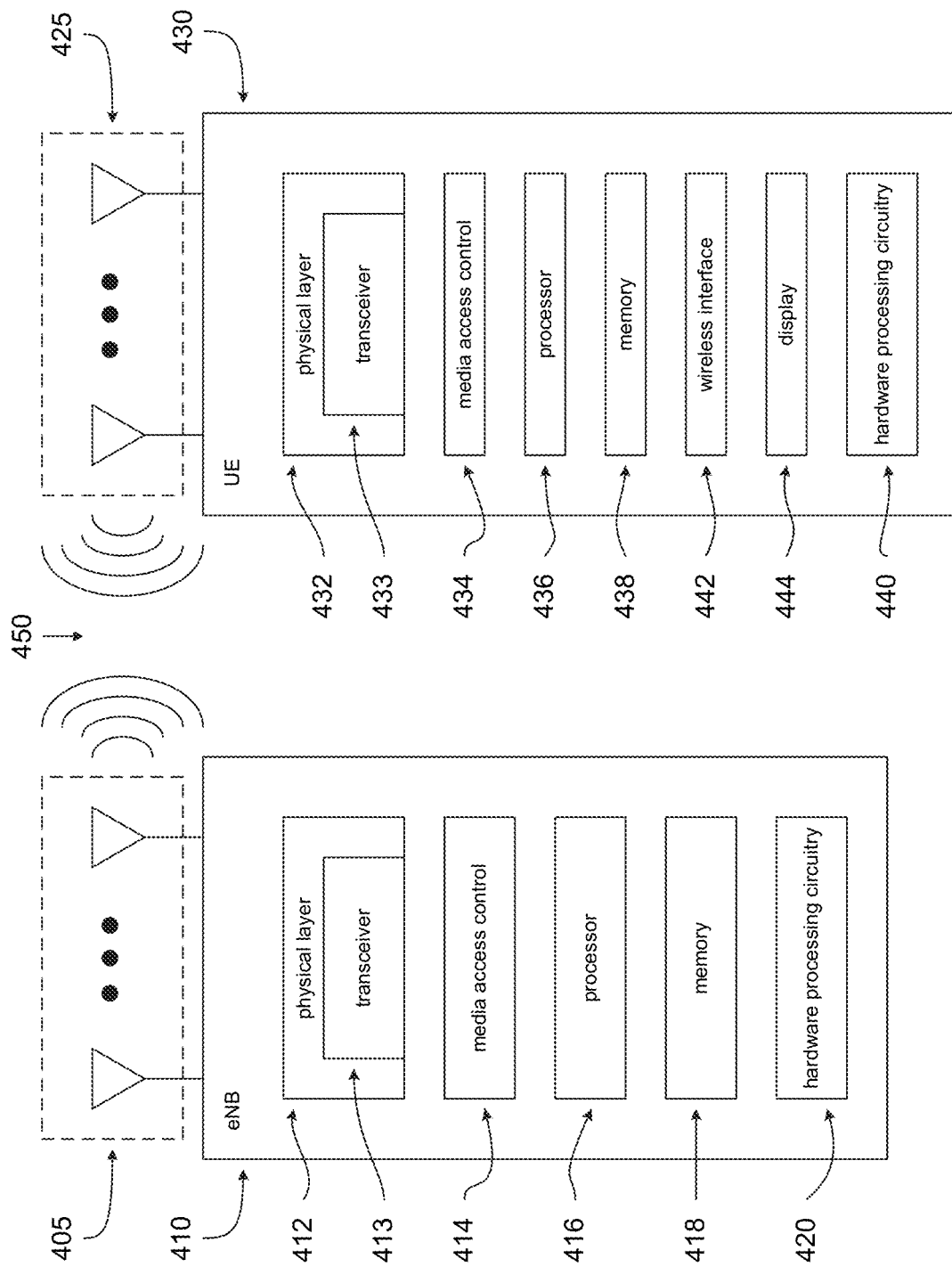
FIG. 4 illustrates an Evolved Node-B (eNB) and a UE, in accordance with some embodiments of the disclosure.

FIG. 4 illustrates an eNB and a UE, according to some embodiments. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 5:
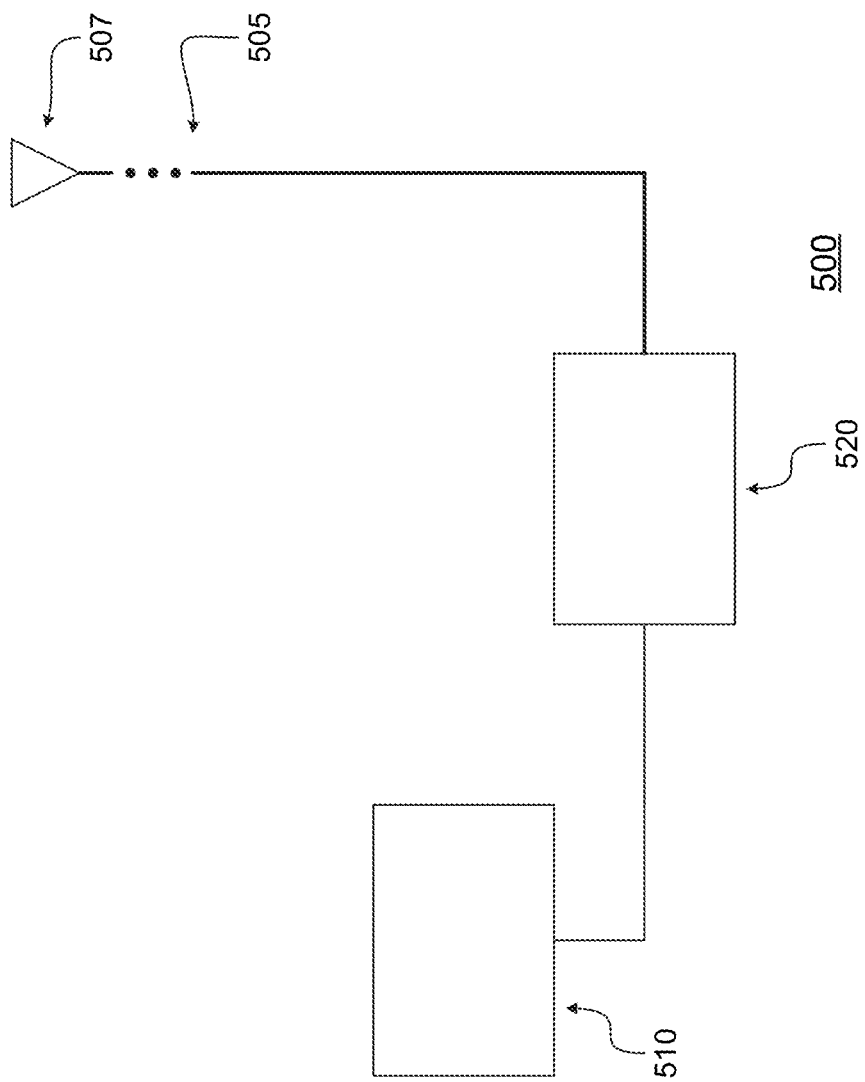
FIG. 5 illustrates hardware processing circuitries for an eNB for transmitting configuration information associated with PRACH occasions, for receiving PUSCH transmission comprising a plurality of symbols (e.g., such that the CSI part 1 is embedded starting from a first symbol of the PUSCH transmission), for transmitting information about subcarrier offset associated with common RB and SS/PBCH blocks, and/or the like, according to some embodiments.

FIG. 5 illustrates hardware processing circuitries 500 for an eNB for transmitting configuration information associated with PRACH occasions, for receiving PUSCH transmission comprising a plurality of symbols (e.g., such that the CSI part 1 is embedded starting from a first symbol of the PUSCH transmission), for transmitting information about subcarrier offset associated with common RB and SS/PBCH blocks, and/or the like, according to some embodiments. With reference to FIG. 4, an eNB may include various hardware processing circuitries discussed herein (such as hardware processing circuitry 500 of FIG. 5), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 5, an apparatus of eNB 410 (or another eNB or base station), which may be operable to communicate with one or more UEs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 405). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from an eNB to a wireless communications channel and/or a UE, and may be operable to provide signals from a UE and/or a wireless communications channel to an eNB. For example, antenna ports 505 and antennas 507 may be operable to provide transmissions from eNB 410 to wireless communication channel 450 (and from there to UE 430, or to another UE). Similarly, antennas 507 and antenna ports 505 may be operable to provide transmissions from a wireless communication channel 450 (and beyond that, from UE 430, or another UE) to eNB 410.

Hardware processing circuitry 500 may comprise various circuitries operable in accordance with the various embodiments discussed herein. With reference to FIG. 5, hardware processing circuitry 500 may comprise a first circuitry 510 and/or a second circuitry 520.

In some embodiments, the first circuitry 510 may transmit configuration information associated with PRACH occasions. For example, the first circuitry 510 may transmit a message comprising an indicator to indicate a number of contention based PRACH preambles within a PRACH occasion per SSB. The UE may generate a first PRACH occasion, based on the indicator.

In some embodiments, the first circuitry 510 may transmit a message comprising information indicative of a subcarrier offset between: a subcarrier 0 in a common resource block (RB), and a subcarrier 0 of a SS/PBCH (synchronization signal/Physical Broadcast Channel) block. The UE may monitor for the SS/PBCH block, based on the information indicative of the subcarrier offset.

In some embodiments, the second circuitry 520 may receive and process a CSI resource indicator (CSI) comprising: a CSI part 1, and a CSI part 2. The second circuitry 520 may also receive and process a PUSCH transmission comprising a plurality of symbols, such that the CSI part 1 is embedded starting from a first symbol of the PUSCH transmission.

In some embodiments, first circuitry 510 and/or second circuitry 520 may be implemented as separate circuitries. In other embodiments, first circuitry 510 and second circuitry 520 may be combined and implemented together in a circuitry without altering the essence of the embodiments.

Figure 6:
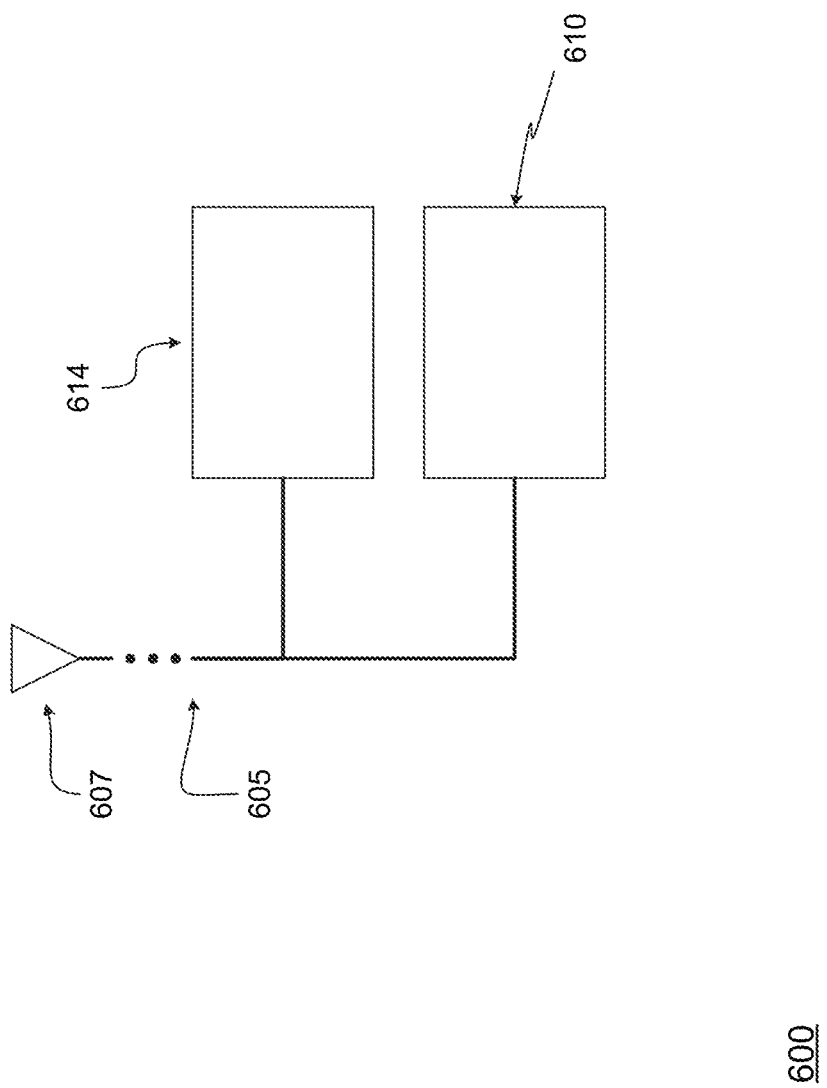
FIG. 6 illustrates hardware processing circuitries for a UE for processing configuration information associated with PRACH occasions, for generating PUSCH transmission comprising a plurality of symbols (e.g., such that the CSI part 1 is embedded starting from a first symbol of the PUSCH transmission), for processing information about subcarrier offset associated with common RB and SS/PBCH blocks, and/or the like, according to some embodiments.

FIG. 6 illustrates hardware processing circuitries for a UE for processing configuration information associated with PRACH occasions, for generating PUSCH transmission comprising a plurality of symbols (e.g., such that the CSI part 1 is embedded starting from a first symbol of the PUSCH transmission), for processing information about subcarrier offset associated with common RB and SS/PBCH blocks, and/or the like, according to some embodiments.

With reference to FIG. 4, a UE may include various hardware processing circuitries discussed herein (such as hardware processing circuitry 600 of FIG. 6), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 6, an apparatus of UE 430 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 425). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 430 to wireless communication channel 450 (and from there to eNB 410, or to another eNB). Similarly, antennas 607 and antenna ports 605 may be operable to provide transmissions from a wireless communication channel 450 (and beyond that, from eNB 410, or another eNB) to UE 430.

Hardware processing circuitry 600 may comprise various circuitries operable in accordance with the various embodiments discussed herein. With reference to FIG. 6, hardware processing circuitry 600 may comprise a first circuitry 610 and/or a second circuitry 614.

In some embodiments, the first circuitry 610 may be operable to process a message comprising an indicator to indicate a number of contention based PRACH preambles within a PRACH occasion per SSB. In some embodiments, the second circuitry 620 may be operable to generate a first PRACH occasion, based on the indicator. In an example, the indicator is a first indicator, and wherein the message comprises: a second indicator to indicate a number of SSBs per PRACH occasion. In an example, an upper limit of the second indicator is based on the first indicator. In an example, the indicator is a first indicator, and wherein the message comprises: a second one or more indicators to indicate a number of PRACH preambles within a PRACH occasion per SSB. In an example, an upper limit of the second indicator is based on the first indicator. In an example, the indicator has a value selected from a set consisting of: 4, 8, 12, 16, 20, 24, 28, 32, 36, 40, 44, 48, 52, 56, 50, and 64. In an example, the indicator has a value selected from a set consisting of: 1, 2, 3, and 4. In an example, the indicator has a value selected from a set consisting of 4, 8, 12, 16, 20, 24, 28, 32, 36, 40, 44, 48, 52, 56, 50, and 64, in response to 64 PRACH preambles within a PRACH occasion being associated with an SSB. In an example, the indicator has a value selected from a set consisting of: 1, 2, 3, and 4, in response to 4 PRACH preambles within a PRACH occasion being associated with an SSB.

In some embodiments, the first circuitry 610 may be operable to generate a CSI comprising: a CSI part 1, and a CSI part 2. In some embodiments, the second circuitry 620 may be operable to generate a PUSCH transmission comprising a plurality of symbols, such that the CSI part 1 is embedded starting from a first symbol of the PUSCH transmission. The UE may comprise an interface to send the PUSCH transmission to a transmission circuitry, e.g., for transmission to the eNB. In an example, the first circuitry 610 may be operable to generate the PUSCH transmission such that: a hybrid automatic repeat request-acknowledgement (HARQ-ACK) embedded within the PUSCH transmission is to be transmitted subsequent to a transmission of a De-Modulation Reference Signal (DM-RS) symbol associated with the PUSCH transmission.

In some embodiments, the first circuitry 610 may be operable to process a message comprising information indicative of a subcarrier offset between: a subcarrier 0 in a common RB, and a subcarrier 0 of a SS/PBCH block. In some embodiments, the second circuitry 620 may be operable to monitor for the SS/PBCH block, based on the information indicative of the subcarrier offset. The UE may comprise an interface to receive the message and the SS/PBCH block from a reception circuitry. In an example, the information is first information, and wherein the first circuitry 610 may be operable to process the SS/PBCH block comprising second information indicative of a subcarrier spacing between: an RB index of the SS/PBCH block, and an RB index of an associated CORESET. In an example, the information is first information, and wherein the first circuitry 610 may be operable to process the SS/PBCH block comprising second information indicative of a number of RBs for an associated CORESET. In an example, the number of RBs for the associated CORESET is from a set comprising two or more of: 24 RBs, 48 RBs, or 96 RBs. In an example, the information is first information, and wherein the first circuitry 610 may be operable to process the SS/PBCH block comprising second information; determine, based on the second information, a slot index for an associated Control Resource Set (CORESET); and monitor for the CORESET at the slot index. In an example, the first circuitry 610 may be operable to process the SS/PBCH block comprising third information that is indicative of an identification of a symbol; and monitor for the CORESET at the symbol within the slot index.

In some embodiments, first circuitry 610 and the second circuitry 614 may be implemented as separate circuitries. In other embodiments, first circuitry 610 and the second circuitry 614 may be combined and implemented together in a circuitry without altering the essence of the embodiments.

Figure 7:
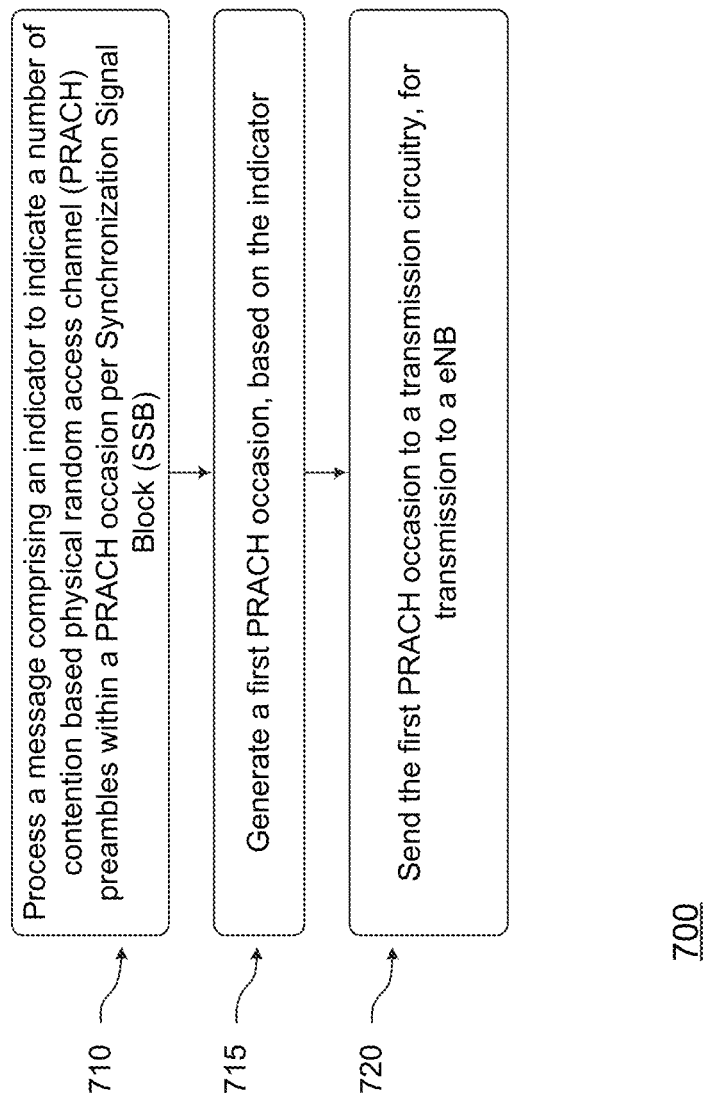
FIG. 7 illustrates a method for a UE for generating a PRACH occasion, based on configuration information associated with the PRACH occasion, according to some embodiments.

FIG. 7 illustrates a method 700 for a UE for generating a PRACH occasion, based on configuration information associated with the PRACH occasion, according to some embodiments. With reference to FIG. 4, the method 700 that may relate to UE 430 and hardware processing circuitry 440 are discussed herein. Although the actions in method 700 of FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, the method 700 may be in accordance with the various embodiments discussed herein. The method 700 may comprise, at 710, processing a message comprising an indicator to indicate a number of contention based PRACH preambles within a PRACH occasion per SSB (e.g., as discussed herein with respect to Table 9, e.g., the third row of the table). The method 70 comprises, at 715, generating a first PRACH occasion, based on the indicator. The method 70 comprises, at 720, sending the first PRACH occasion to a transmission circuitry, e.g., for transmission to an eNB.

In some embodiments, the indicator is a first indicator, and wherein the message comprises: a second indicator to indicate a number of SSBs per PRACH occasion. In some embodiments, an upper limit of the second indicator is based on the first indicator. In some embodiments, the indicator is a first indicator, and wherein the message comprises: a second one or more indicators to indicate a number of PRACH preambles within a PRACH occasion per SSB. In some embodiments, an upper limit of the second indicator is based on the first indicator. In some embodiments, the indicator has a value selected from a set consisting of: 4, 8, 12, 16, 20, 24, 28, 32, 36, 40, 44, 48, 52, 56, 50, and 64. In some embodiments, the indicator has a value selected from a set consisting of: 1, 2, 3, and 4. In some embodiments, the indicator has a value selected from a set consisting of 4, 8, 12, 16, 20, 24, 28, 32, 36, 40, 44, 48, 52, 56, 50, and 64, in response to 64 PRACH preambles within a PRACH occasion being associated with an SSB. In some embodiments, the indicator has a value selected from a set consisting of: 1, 2, 3, and 4, in response to 4 PRACH preambles within a PRACH occasion being associated with an SSB.

Figure 8A:
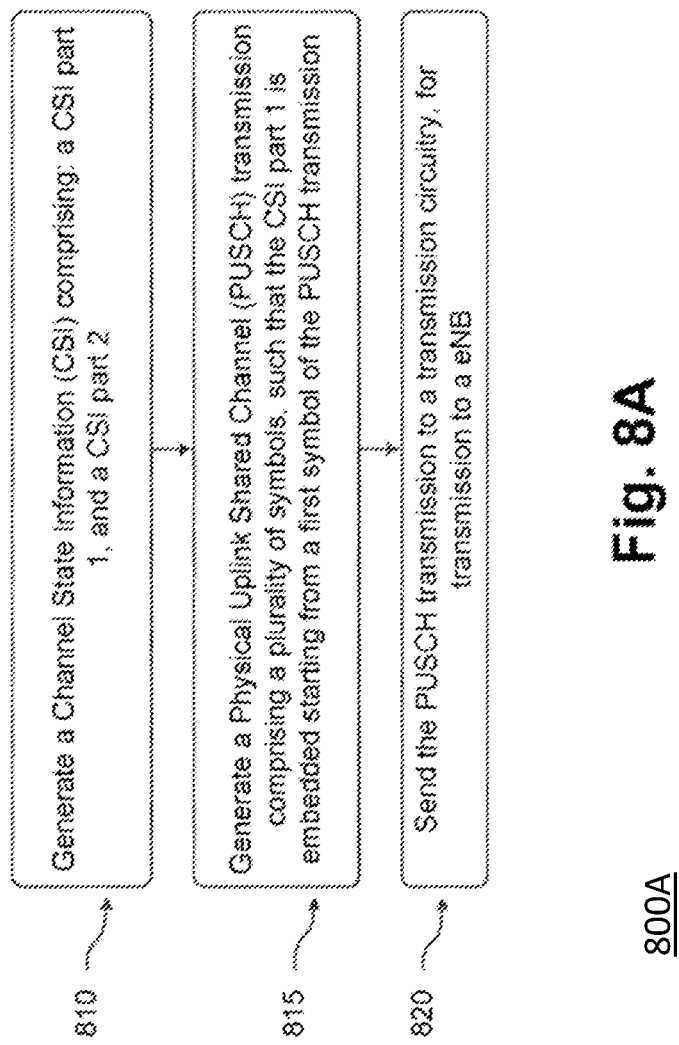
FIG. 8A illustrates a method for a UE for generating a Physical Uplink Shared Channel (PUSCH) transmission comprising a plurality of symbols, such that the CSI part 1 is embedded starting from a first symbol of the PUSCH transmission, according to some embodiments.

FIG. 8A illustrates a method 800A for a UE for generating a Physical Uplink Shared Channel (PUSCH) transmission comprising a plurality of symbols, such that the CSI part 1 is embedded starting from a first symbol of the PUSCH transmission, according to some embodiments. With reference to FIG. 4, the method 800A that may relate to UE 430 and hardware processing circuitry 440 are discussed herein. Although the actions in method 800A of FIG. 8A are shown in a particular order, the order of the actions can be modified. Thus, the illustrated embodiments can be performed in a different order, and some actions may be performed in parallel. Some of the actions and/or operations listed in FIG. 8A are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8A. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8A.

Returning to FIG. 8A, the method 800A may be in accordance with the various embodiments discussed herein. The method 800A may comprise, at 810, generating a Channel State Information (CSI) comprising: a CSI part 1, and a CSI part 2. The method 800A further comprises, at 815, generating a PUSCH transmission comprising a plurality of symbols, such that the CSI part 1 is embedded starting from a first symbol of the PUSCH transmission (e.g., as discussed herein at least with respect to FIG. 2A). The method 800A further comprises, at 820, sending the PUSCH transmission to a transmission circuitry, for transmission to an eNB. In some embodiments, the PUSCH transmission may be generated such that: a HARQ-ACK embedded within the PUSCH transmission is to be transmitted subsequent to a transmission of a De-Modulation Reference Signal (DM-RS) symbol associated with the PUSCH transmission.

Figure 8B:
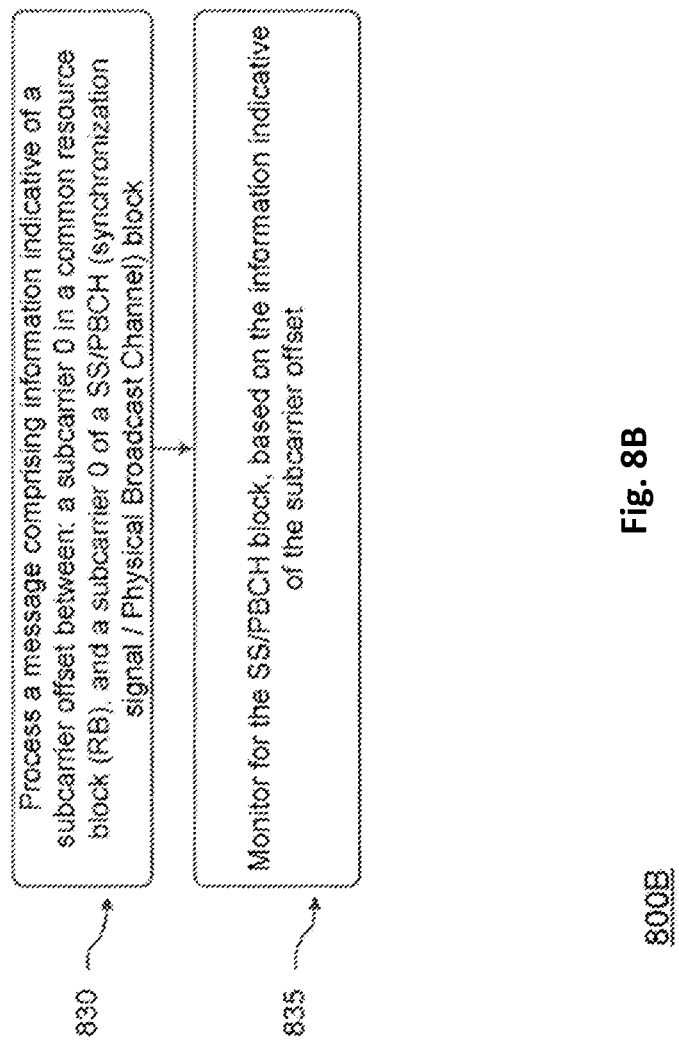
FIG. 8B illustrates a method for a UE for monitoring for SS/PBCH block, based on the information indicative of a subcarrier offset, according to some embodiments.

FIG. 8B illustrates a method 800B for a UE for monitoring for SS/PBCH block, based on the information indicative of a subcarrier offset, according to some embodiments. With reference to FIG. 4, the method 800B that may relate to UE 430 and hardware processing circuitry 440 are discussed herein. Although the actions in method 800B of FIG. 8B are shown in a particular order, the order of the actions can be modified. Thus, the illustrated embodiments can be performed in a different order, and some actions may be performed in parallel. Some of the actions and/or operations listed in FIG. 8B are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8B. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8B.

Returning to FIG. 8B, the method 800B may be in accordance with the various embodiments discussed herein. The method 800B may comprise, at 830, processing a message comprising information indicative of a subcarrier offset between: a subcarrier 0 in a common RB, and a subcarrier 0 of a SS/PBCH block, e.g., as discussed at least in part with respect to FIG. 1I. The method 800B further comprises, at 835, monitoring for the SS/PBCH block, based on the information indicative of the subcarrier offset.

In some embodiments, the method 800B further comprises processing the SS/PBCH block comprising second information indicative of a subcarrier spacing between: an RB index of the SS/PBCH block, and an RB index of an associated CORESET. In some embodiments, the information is first information, and the method 800B further comprises processing the SS/PBCH block comprising second information indicative of a number of RBs for an associated CORESET. In some embodiments, the number of RBs for the associated CORESET is from a set comprising two or more of: 24 RBs, 48 RBs, or 96 RBs. In some embodiments, the information is first information, and the method 800B further comprises processing the SS/PBCH block comprising second information; determining, based on the second information, a slot index for an associated CORESET; and monitoring for the CORESET at the slot index. In some embodiments, the method 800B further comprises processing the SS/PBCH block comprising third information that is indicative of an identification of a symbol; and monitoring for the CORESET at the symbol within the slot index.

Figure 9:
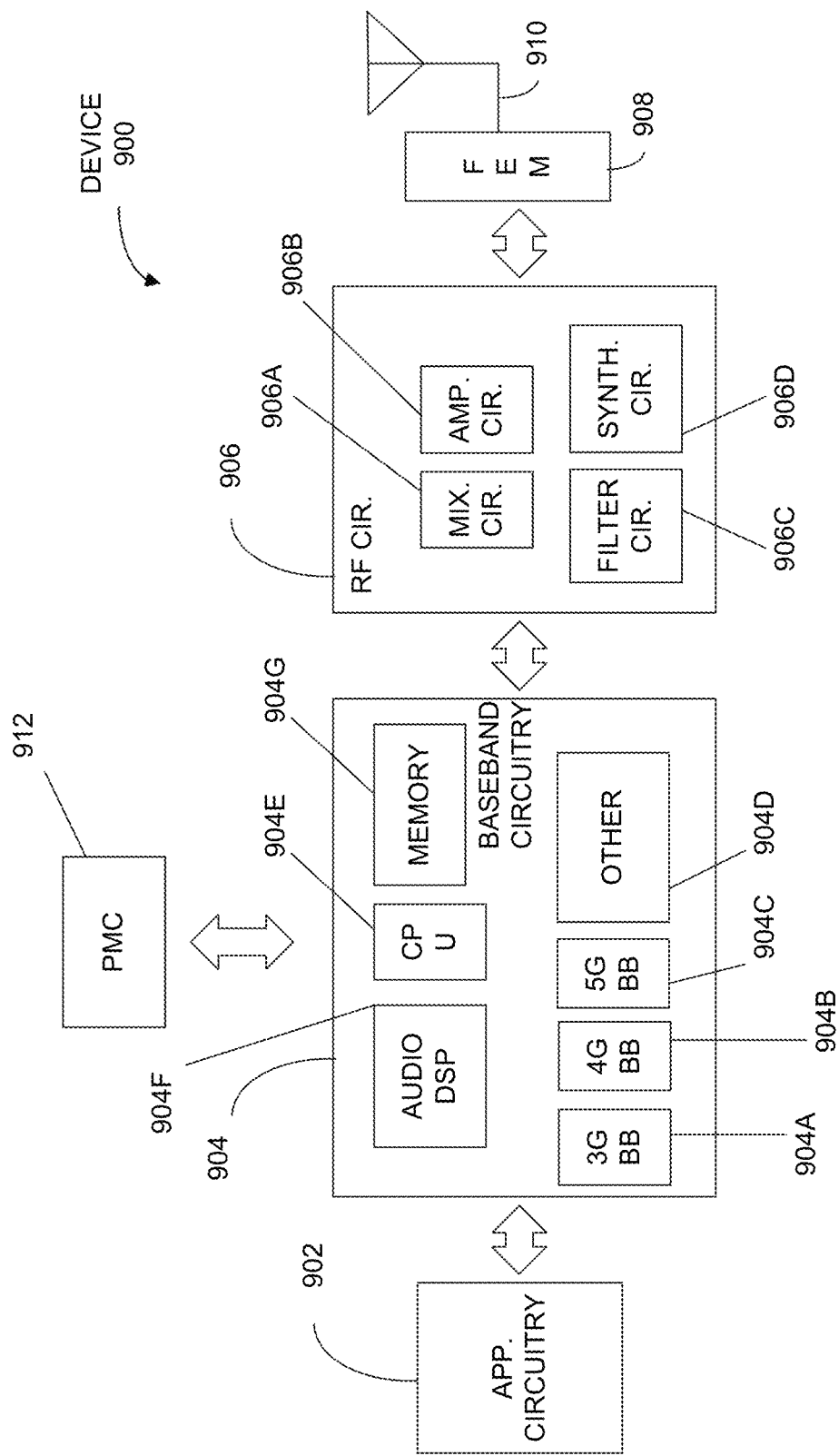
FIG. 9 illustrates example components of a device, according to some embodiments.
Figure 10:
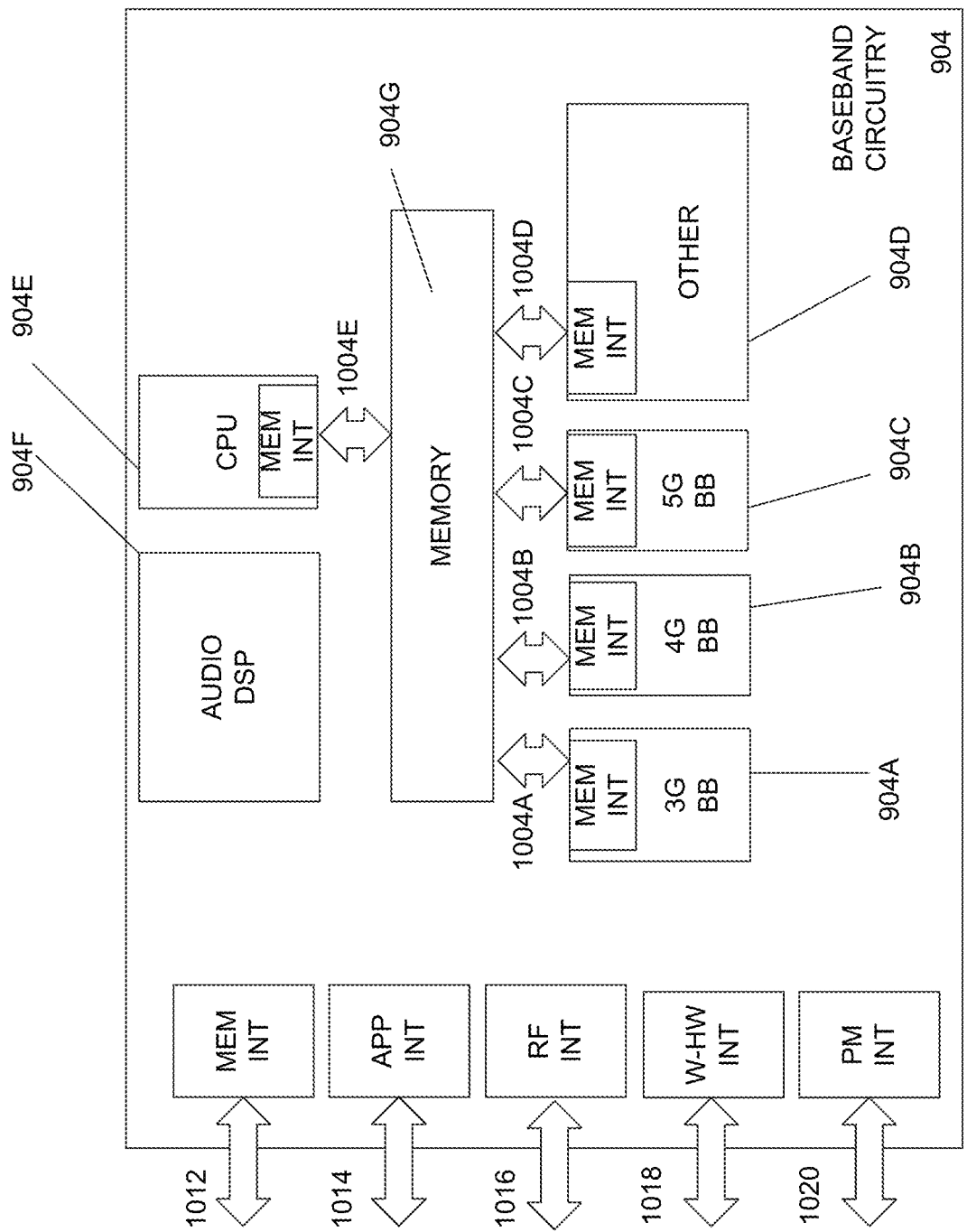

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
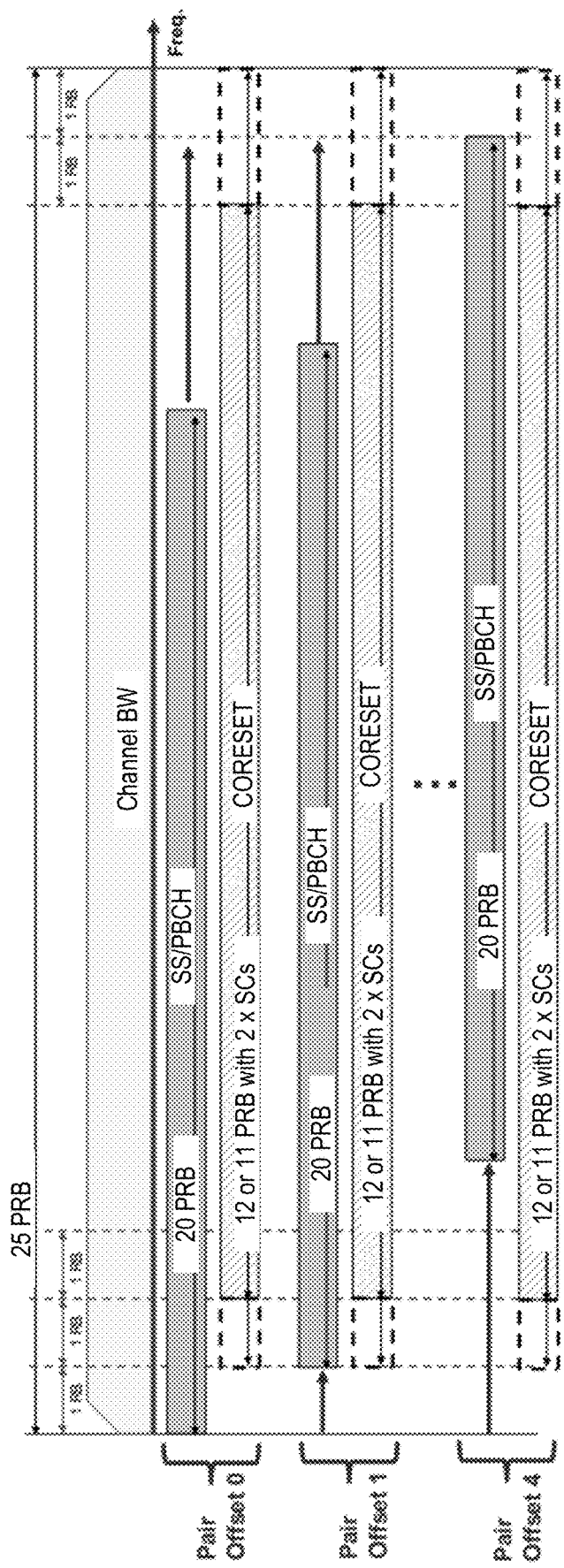
FIG. 10 illustrates example interfaces of baseband circuitry, according to some embodiments.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1. An apparatus of a User Equipment (UE) operable to communicate with a fifth-generation Evolved Node B (gNB) on a wireless network, comprising: one or more processors to: process a message carrying an indicator to indicate a number of contention-based physical random access channel (PRACH) preambles within a PRACH occasion per Synchronization Signal Block (SSB), and generate a first PRACH occasion, based on the indicator; and an interface for sending the first PRACH occasion to a transmission circuitry.

Example 2. The apparatus of example 1 or any other example, wherein: the indicator is a first indicator, and the message carries a second indicator to indicate a number of SSBs per PRACH occasion.

Example 3. The apparatus of example 2 or any other example, wherein an upper limit of the second indicator is based on the first indicator.

Example 4. The apparatus of example 1 or any other example, wherein: the indicator is a first indicator; and the message carries one or more second indicators to indicate a number of PRACH preambles within a PRACH occasion per SSB.

Example 5. The apparatus of example 4 or any other example, wherein an upper limit of the second indicator is based on the first indicator.

Example 6. The apparatus of example 1 or any other example, wherein the indicator has a value selected from a set consisting of: 4, 8, 12, 16, 20, 24, 28, 32, 36, 40, 44, 48, 52, 56, 50, and 64.

Example 7. The apparatus of example 1 or any other example, wherein the indicator has a value selected from a set consisting of: 1, 2, 3, and 4.

Example 8. The apparatus of example 1 or any other example, wherein, in response to 64 PRACH preambles within a PRACH occasion being associated with an SSB, the indicator has a value selected from a set consisting of: 4, 8, 12, 16, 20, 24, 28, 32, 36, 40, 44, 48, 52, 56, 50, and 64.

Example 9. The apparatus of example 1 or any other example, wherein, in response to 4 PRACH preambles within a PRACH occasion being associated with an SSB, the indicator has a value selected from a set consisting of: 1, 2, 3, and 4.

Example 10. A User Equipment (UE) device comprising an application processor, a memory, one or more antennas, a wireless interface for allowing the application processor to communicate with another device, and a touch-screen display, the UE device including the apparatus of example 1 or any other example.

Example 11. Machine readable storage media having machine executable instructions that, when executed, cause one or more processors of a User Equipment (UE) operable to communicate with a fifth-generation Evolved Node B (gNB) on a wireless network to perform an operation comprising: process a message carrying an indicator to indicate a number of contention-based physical random access channel (PRACH) preambles within a PRACH occasion per Synchronization Signal Block (SSB); and generate a first PRACH occasion, based on the indicator.

Example 12. The machine readable storage media of example 11 or any other example, wherein: the indicator is a first indicator; the message carries a second indicator to indicate a number of SSBs per PRACH occasion; and an upper limit of the second indicator is based on the first indicator.

Example 13. The machine readable storage media of example 11 or any other example, wherein: the indicator has a value selected from either a first set or a second set; the first set consists of: 4, 8, 12, 16, 20, 24, 28, 32, 36, 40, 44, 48, 52, 56, 50, and 64; and the second set consists of: 1, 2, 3, and 4.

Example 14. An apparatus of a User Equipment (UE) operable to communicate with a fifth-generation Evolved Node B (gNB) on a wireless network, comprising: one or more processors to: generate a Channel State Information (CSI) comprising a CSI part 1 and a CSI part 2, and generate a Physical Uplink Shared Channel (PUSCH) transmission comprising a plurality of symbols, the CSI part 1 being embedded in the PUSCH transmission starting from a first symbol of the PUSCH transmission; and an interface for sending the PUSCH transmission to a transmission circuitry.

Example 15. The apparatus of example 14 or any other example, wherein the one or more processors are to: generate the PUSCH transmission such that a Hybrid Automatic Repeat Request Acknowledgement (HARQ-ACK) is embedded within the PUSCH transmission for transmission subsequent to a transmission of a Demodulation Reference Signal (DM-RS) symbol associated with the PUSCH transmission.

Example 16. An apparatus of a User Equipment (UE) operable to communicate with a fifth-generation Evolved Node B (gNB) on a wireless network, comprising: one or more processors to: process a message carrying information indicative of a subcarrier offset between: a subcarrier 0 in a common resource block (RB), and a subcarrier 0 of a Synchronization Signal/Physical Broadcast Channel (SS/PBCH) block, and monitor for the SS/PBCH block, based on the information indicative of the subcarrier offset; and an interface to receive the message and the SS/PBCH block from a reception circuitry.

Example 17. The apparatus of example 16 or any other example, wherein the information is first information, and wherein the one or more processors are to: process the SS/PBCH block carrying second information indicative of a subcarrier spacing between: an RB index of the SS/PBCH block, and an RB index of an associated Control Resource Set (CORESET).

Example 18. The apparatus of example 16 or any other example, wherein the information is first information, and wherein the one or more processors are to: process the SS/PBCH block, the SS/PBCH block carrying second information indicative of a number of RBs for an associated Control Resource Set (CORESET).

Example 19. The apparatus of example 18 or any other example, wherein the number of RBs for the associated CORESET is from a set comprising two or more of: 24 RBs, 48 RBs, or 96 RBs.

Example 20. The apparatus of example 16 or any other example, wherein the information is first information, and wherein the one or more processors are to: process the SS/PBCH block, the SS/PBCH block carrying second information indicative of slot index; determine, based on the second information, a slot index for an associated Control Resource Set (CORESET); and monitor for the CORESET at the slot index for the associated CORESET.

Example 21. The apparatus of example 20 or any other example, wherein the one or more processors are to: process the SS/PBCH block carrying third information that is indicative of an identification of a symbol; and monitor for the CORESET at the symbol within the slot index.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station on a wireless network, comprising:
one or more processors to:
process a system message carrying a system indicator to indicate a total number of physical random access channel (PRACH) preambles for a PRACH occasion associated with a Synchronization Signal Block (SSB);
process a message carrying an indicator having a value selected from a set consisting of 1, 2, 3, and 4 to indicate a first number of contention-based PRACH preambles within the PRACH occasion, wherein the PRACH occasion includes a second number of contention free PRACH preambles, wherein the second number is a difference between the total number and the first number, and wherein the system message is different from the message; and
generate a first PRACH occasion, based on the indicator; and
an interface for sending the first PRACH occasion to a transmission circuitry.

2. The UE of claim 1, wherein:
the indicator is a first indicator, and
the message carries a second indicator comprising a second integer to indicate a number of SSBs per PRACH occasion.

3. The UE of claim 2, wherein an upper limit of the second indicator is based on the first indicator.

4. The UE of claim 1, wherein:
the indicator is a first indicator; and
the message carries one or more second indicators comprising one or more corresponding second integers to indicate a number of PRACH preambles within the PRACH occasion associated with the SSB.

5. The UE of claim 4, wherein an upper limit of the one or more second indicators are based on the first indicator.

6. The UE of claim 1, wherein 4 PRACH preambles within the PRACH occasion are associated with the SSB.

7. The UE of claim 1, comprising an application processor, a memory, one or more antennas, a wireless interface for allowing the application processor to communicate with another device, and a touch-screen display.

8. A non-transitory computer readable medium having machine executable instructions that, when executed, cause one or more processors of a User Equipment (UE) operable to communicate with a base station on a wireless network to perform an operation, the operation comprising:
processing a system message carrying a system indicator to indicate a total number of physical random access channel (PRACH) preambles for a PRACH occasion associated with a Synchronization Signal Block (SSB);
processing a message carrying an indicator having a value selected from a set consisting of 1, 2, 3, and 4 to indicate a first number of contention-based PRACH preambles within the PRACH occasion, wherein the PRACH occasion includes a second number of contention free PRACH preambles, wherein the second number is a difference between the total number and the first number, and wherein the system message is different from the message; and
generating a first PRACH occasion, based on the indicator.

9. The non-transitory computer readable medium of claim 8, wherein:
the indicator is a first indicator;
the message carries a second indicator that is a second integer to indicate a number of SSBs per PRACH occasion; and
an upper limit of the second indicator is based on the first indicator.

10. A User Equipment (UE) operable to communicate with a base station on a wireless network, comprising:
one or more processors to:
generate a Channel State Information (CSI) report comprising a CSI part 1 of the CSI report and a CSI part 2 of the CSI report, and generate a Physical Uplink Shared Channel (PUSCH) transmission comprising a plurality of symbols, wherein the CSI part 1 is embedded starting from a first symbol of the PUSCH transmission, and the CSI part 2 is mapped to a symbol transmitted in a Phase Tracking Reference Signal (PT-RS) of the PUSCH transmission, wherein the CSI part 2 is separated from the CSI part 1; and an interface for sending the PUSCH transmission to a transmission circuitry.

11. The UE of claim 10, wherein the one or more processors are to:

generate the PUSCH transmission such that a Hybrid Automatic Repeat Request Acknowledgement (HARQ-ACK) is embedded within the PUSCH transmission for transmission subsequent to a transmission of a Demodulation Reference Signal (DM-RS) symbol associated with the PUSCH transmission.

12. The UE of claim 10, wherein the PUSCH transmission includes a Hybrid Automatic Repeat Request Acknowledgement (HARQ-ACK) that is mapped in the symbol including the PT-RS or mapped around the PT-RS.

13. The UE of claim 12, wherein the HARQ-ACK and the CSI part 1 or the CSI part 2 are mapped to an antenna port that is quasi-co-location (QCL) with an antenna port of the PT-RS.

14. The UE of claim 12, wherein the HARQ-ACK, the CSI part 1 or the CSI part 2 are located in resource elements (REs) with different comb offsets.

15. The UE of claim 12, wherein a comb distance for the HARQ-ACK, the CSI part 1, the CSI part 2, and uplink data are configured by higher layers.

16. The UE of claim 10, wherein the CSI part 1, the CSI part 1, and uplink data are interleaved in frequency with equal comb distance.

\* \* \* \* \*